(12) United States Patent
Minor et al.

(10) Patent No.: US 7,694,306 B2
(45) Date of Patent: *Apr. 6, 2010

(54) BALANCING COMPUTATIONAL LOAD ACROSS A PLURALITY OF PROCESSORS

(75) Inventors: Barry L Minor, Austin, TX (US); Mark Richard Nutter, Austin, TX (US); VanDung Dang To, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 12/145,709

(22) Filed: Jun. 25, 2008

(65) Prior Publication Data

US 2008/0271003 A1 Oct. 30, 2008

Related U.S. Application Data

(63) Continuation of application No. 10/670,826, filed on Sep. 25, 2003, now Pat. No. 7,444,632.

(51) Int. Cl.
*G06F 9/46* (2006.01)
*G06F 9/44* (2006.01)
*G06F 9/45* (2006.01)

(52) U.S. Cl. .................... 718/105; 717/166; 717/151

(58) Field of Classification Search ................ 718/105; 717/166, 151
See application file for complete search history.

(56) References Cited

U.S. PATENT DOCUMENTS

| | | | |
|---|---|---|---|
| 4,394,727 A | 7/1983 | Hoffman et al. | 718/103 |
| 4,787,057 A | 11/1988 | Hammond | 708/607 |
| 4,862,354 A | 8/1989 | Fiacconi et al. | 709/216 |
| 4,945,479 A | 7/1990 | Rusterholz et al. | 712/3 |

(Continued)

FOREIGN PATENT DOCUMENTS

JP 05-242057 9/1993

(Continued)

OTHER PUBLICATIONS

Microsoft Computer Dictionary, Fifth Edition, Microsoft, 2002, pp. 49, 197, and 196.

(Continued)

*Primary Examiner*—Thomas Lee
*Assistant Examiner*—Camquy Truong
(74) *Attorney, Agent, or Firm*—VanLeeuwen & VanLeeuwen; Matthew B. Talpis

(57) ABSTRACT

Computational load is balanced across a plurality of processors. Source code subtasks are compiled into byte code subtasks whereby the byte code subtasks are translated into processor-specific object code subtasks at runtime. The processor-type selection is based upon one of three approaches which are 1) a brute force approach, 2) higher-level approach, or 3) processor availability approach. Each object code subtask is loaded in a corresponding processor type for execution. In one embodiment, a compiler stores a pointer in a byte code file that references the location of a byte code subtask. In this embodiment, the byte code subtask is stored in a shared library and, at runtime, a runtime loader uses the pointer to identify the location of the byte code subtask in order to translate the byte code subtask.

3 Claims, 51 Drawing Sheets

U.S. PATENT DOCUMENTS

| | | | |
|---|---|---|---|
| 5,179,702 A | 1/1993 | Spix et al. | 718/102 |
| 5,185,861 A | 2/1993 | Valencia | 711/120 |
| 5,307,495 A | 4/1994 | Seino et al. | 718/106 |
| 5,359,721 A | 10/1994 | Kempf et al. | 719/331 |
| 5,394,547 A | 2/1995 | Correnti et al. | 717/175 |
| 5,428,781 A | 6/1995 | Duault et al. | 718/102 |
| 5,448,732 A | 9/1995 | Matsumoto | 718/104 |
| 5,490,278 A | 2/1996 | Mochizuki | 708/446 |
| 5,548,798 A | 8/1996 | King | 710/68 |
| 5,560,030 A | 9/1996 | Guttag et al. | 712/16 |
| 5,630,128 A | 5/1997 | Farrell et al. | 718/103 |
| 5,649,184 A | 7/1997 | Hayashi et al. | 707/8 |
| 5,689,722 A | 11/1997 | Swarztrauber | 712/12 |
| 5,692,193 A | 11/1997 | Jagannathan et al. | 718/106 |
| 5,754,817 A | 5/1998 | Wells et al. | 711/203 |
| 5,790,855 A | 8/1998 | Faustini | 717/100 |
| 5,812,843 A | 9/1998 | Yamazaki et al. | 718/100 |
| 5,835,775 A | 11/1998 | Washington et al. | 717/153 |
| 5,842,020 A | 11/1998 | Faustini | 717/111 |
| 5,887,186 A | 3/1999 | Nakanishi | 712/28 |
| 5,913,065 A | 6/1999 | Faustini | 717/107 |
| 5,956,509 A * | 9/1999 | Kevner | 719/330 |
| 5,978,831 A | 11/1999 | Ahamed et al. | 718/105 |
| 6,026,485 A | 2/2000 | O'Connor et al. | 712/226 |
| 6,044,218 A | 3/2000 | Faustini | 717/107 |
| 6,049,668 A | 4/2000 | Smith et al. | 717/138 |
| 6,105,111 A | 8/2000 | Hammarlund et al. | 711/136 |
| 6,128,724 A | 10/2000 | Lee et al. | 712/32 |
| 6,195,676 B1 | 2/2001 | Spix et al. | 718/107 |
| 6,199,179 B1 | 3/2001 | Kauffman et al. | 714/26 |
| 6,292,822 B1 | 9/2001 | Hardwick | 718/105 |
| 6,292,935 B1 | 9/2001 | Lueh et al. | 717/148 |
| 6,381,659 B2 | 4/2002 | Proch et al. | 710/57 |
| 6,381,693 B2 | 4/2002 | Fish et al. | 713/1 |
| 6,446,218 B1 | 9/2002 | D'Souza | 714/4 |
| 6,463,521 B1 | 10/2002 | Long | 712/213 |
| 6,473,897 B1 | 10/2002 | Ansari et al. | 717/136 |
| 6,480,818 B1 | 11/2002 | Alverson et al. | 703/26 |
| 6,496,870 B1 | 12/2002 | Faustini | 719/316 |
| 6,513,057 B1 | 1/2003 | McCrory | 718/102 |
| 6,526,491 B2 | 2/2003 | Suzuoki et al. | 711/164 |
| 6,532,531 B1 | 3/2003 | O'Connor et al. | 712/202 |
| 6,542,926 B2 | 4/2003 | Zalewski et al. | 709/213 |
| 6,557,164 B1 | 4/2003 | Faustini | 717/107 |
| 6,559,854 B2 | 5/2003 | Oka et al. | 345/619 |
| 6,567,502 B2 | 5/2003 | Zellner et al. | 379/45 |
| 6,578,068 B1 | 6/2003 | Bowman-Amuah | 709/203 |
| 6,601,233 B1 | 7/2003 | Underwood | 717/102 |
| 6,622,219 B2 | 9/2003 | Tramblay et al. | 711/147 |
| 6,665,700 B1 | 12/2003 | Takayama et al. | 718/104 |
| 6,684,390 B1 | 1/2004 | Goff | 717/148 |
| 6,704,926 B1 | 3/2004 | Blandy et al. | 717/148 |
| 6,718,535 B1 | 4/2004 | Underwood | 717/101 |
| 6,728,961 B1 | 4/2004 | Velasco | 718/105 |
| 6,789,252 B1 | 9/2004 | Burke et al. | 717/100 |
| 6,820,258 B1 | 11/2004 | Fink et al. | 717/158 |
| 6,862,608 B2 | 3/2005 | Buhlman et al. | 709/213 |
| 6,892,298 B2 | 5/2005 | West | 713/2 |
| 6,895,479 B2 | 5/2005 | Reimer et al. | 711/152 |
| 6,950,848 B1 | 9/2005 | Yousefi'zadeh | 709/203 |
| 6,966,015 B2 | 11/2005 | Steinberg et al. | 714/47 |
| 6,966,057 B2 | 11/2005 | Lueh | 717/158 |
| 6,981,072 B2 | 12/2005 | Day et al. | 710/22 |
| 6,981,074 B2 | 12/2005 | Oner et al. | 710/32 |
| 6,990,653 B1 | 1/2006 | Burd et al. | 717/108 |
| 7,043,579 B2 | 5/2006 | Dhong et al. | 710/107 |
| 7,047,534 B2 | 5/2006 | Sadovsky et al. | 719/322 |
| 7,062,768 B2 | 6/2006 | Kubo et al. | 718/105 |
| 7,080,242 B2 | 7/2006 | Morris | 713/1 |
| 7,093,258 B1 | 8/2006 | Miller et al. | 718/105 |
| 7,103,664 B1 | 9/2006 | Novaes et al. | 709/226 |
| 7,124,170 B1 | 10/2006 | Sibert | 709/216 |
| 7,127,709 B2 | 10/2006 | Demsey et al. | 717/148 |
| 7,133,978 B1 | 11/2006 | James-Roxby et al. | 711/152 |
| 7,134,007 B2 | 11/2006 | Zimmer et al. | 713/1 |
| 7,137,115 B2 | 11/2006 | Sakamoto et al. | 718/102 |
| 7,143,419 B2 | 11/2006 | Fischer et al. | 719/328 |
| 7,146,613 B2 | 12/2006 | Chauvel et al. | 718/1 |
| 7,165,108 B2 | 1/2007 | Matena et al. | 709/226 |
| 7,167,916 B2 | 1/2007 | Willen et al. | 709/226 |
| 7,174,544 B2 | 2/2007 | Zee | 717/148 |
| 7,210,148 B2 | 4/2007 | Arnold et al. | 719/330 |
| 7,320,123 B2 | 1/2008 | Govindaragapuram et al. | 717/124 |
| 7,321,958 B2 | 1/2008 | Hofstee et al. | 711/153 |
| 2001/0002130 A1 | 5/2001 | Suzuoki | 345/420 |
| 2002/0046229 A1 | 4/2002 | Yutaka et al. | 709/102 |
| 2002/0060690 A1 | 5/2002 | Tanaka et al. | 345/619 |
| 2002/0095523 A1 | 7/2002 | Shimakawa et al. | 709/316 |
| 2002/0120886 A1 | 8/2002 | Nguyen et al. | 714/39 |
| 2002/0135582 A1 | 9/2002 | Suzuoki et al. | 345/502 |
| 2002/0138637 A1 | 9/2002 | Suzuoki et al. | 709/230 |
| 2002/0138701 A1 | 9/2002 | Suzuoki et al. | 711/154 |
| 2002/0138707 A1 | 9/2002 | Suzuoki et al. | 711/163 |
| 2002/0156993 A1 | 10/2002 | Suzuoki et al. | 712/30 |
| 2003/0009651 A1 | 1/2003 | Najam et al. | 712/34 |
| 2003/0018691 A1 | 1/2003 | Bono | 709/106 |
| 2003/0045612 A1 | 3/2003 | Misura et al. | 523/456 |
| 2003/0055984 A1 | 3/2003 | Shimakawa et al. | 709/316 |
| 2003/0071840 A1 | 4/2003 | Huang et al. | 345/736 |
| 2003/0074650 A1 | 4/2003 | Akgul et al. | 717/129 |
| 2003/0188045 A1 | 10/2003 | Jacobson | 710/1 |
| 2004/0123188 A1 | 6/2004 | Srinivasan et al. | 714/44 |
| 2004/0181785 A1 | 9/2004 | Zwirner et al. | 717/140 |
| 2004/0236914 A1 | 11/2004 | Day et al. | 711/152 |
| 2004/0260685 A1 | 12/2004 | Pfleiger et al. | 707/3 |
| 2005/0028148 A1 | 2/2005 | Civlin | 717/145 |
| 2005/0081187 A1 | 4/2005 | Odinak et al. | 717/101 |
| 2005/0081202 A1 | 4/2005 | Brokenshire et al. | 718/100 |
| 2006/0047754 A1 | 3/2006 | Subramanian et al. | 709/206 |

FOREIGN PATENT DOCUMENTS

| | | |
|---|---|---|
| JP | 06-044110 | 2/1994 |
| JP | 08-095757 | 4/1996 |
| JP | 08-147171 | 6/1996 |
| JP | 10-269165 | 10/1998 |
| JP | 2002-342165 | 11/2002 |
| JP | 2002-366534 | 12/2002 |
| JP | 2003-140912 | 5/2003 |

OTHER PUBLICATIONS

Richard M. Stallman, Using and Porting the GNU Compiler Collection for GCC 3.1, Jun. 22, 2001, Published by the Free Software Foundation, pp. 1-18, 75, and 269-275.

Oram et al., "Managing Projects with make," O'Reilly & Associates, Inc., ISBN 0-937175-90-0, Oct. 1995, pp. 78-80.

IBM Dictionary of Computing, George McDaniel, 1994, p. 692.

Per Bothner, "Compiling Java with GCJ," Linux Journal, Jan. 2003, http:linuxjournal.com/article/4860, pp. 1-7.

Kent, "The Co-Design of Virtual Machine Using Reconfigurable Hardware," Submission 2003, University of Victoria, pp. 1-185.

Du Bois, et al., "Distributed Execution of Functional Programs Using JVM," Eurocast 2001, pp. 570-582.

Antoniu et al., "The Hyperion System: Compiling multithread Java bytecode for Distributed Execution," Parellel Computing 27, 2001, pp. 1279-1297.

Sirer et al., "Design and Implementation of a Distributed Virtual Machine for Networked Computers," University of Washington, ACM, 1999, pp. 202-216.

Notice of Allowance for co-pending U.S. Appl. No. 12/042,254, mailed Sep. 11, 2009, 18 pages.

* cited by examiner

Key Control Table

3304 — ID
3306 — SPU Key
3308 — Key Mask
3302

| ID | SPU Key | Key Mask |
|---|---|---|
| 0 | SPU Key | Key Mask |
| 1 | SPU Key | Key Mask |
| 2 | SPU Key | Key Mask |
| ⋮ | | |
| 7 | SPU Key | Key Mask |

*Figure 33*

BALANCING COMPUTATIONAL LOAD ACROSS A PLURALITY OF PROCESSORS

This application is a continuation application of co-pending U.S. Non-Provisional patent application Ser. No. 10/670,826, entitled "Balancing Computational Load Across a Plurality of Processors," filed on Sep. 25, 2003.

BACKGROUND OF THE INVENTION

1. Technical Field

The present invention relates in general to a system and method for balancing computational load across a plurality of processors. More particularly, the present invention relates to a system and method for translating byte code into processor-specific object code at runtime based upon a computer system's environment.

2. Description of the Related Art

Computer systems are becoming more and more complex. The computer industry typically doubles the performance of a computer system every 18 months (i.e. personal computer, PDA, gaming console). In order for the computer industry to accomplish this task, the semiconductor industry produces integrated circuits that double in performance every 18 months. A computer system uses integrated circuits for particular functions based upon the integrated circuits' architecture. Two fundamental architectures are 1) microprocessor-based and 2) digital signal processor-based.

An integrated circuit with a microprocessor-based architecture is typically used to handle control operations whereas an integrated circuit with a digital signal processor-based architecture is typically designed to handle signal-processing manipulations (i.e. mathematical operations). As technology evolves, the computer industry and the semiconductor industry realize the importance of using both architectures, or processor types, in a computer system design.

Software is another element in a computer system that has been evolving alongside integrated circuit evolution. A software developer writes code in a manner that corresponds to the processor type that executes the code. For example, a processor has a particular number of registers and a particular number of arithmetic logic units (ALUs) whereby the software developer designs his code to most effectively use the registers and the ALUs.

As the semiconductor industry incorporates multiple processor types onto a single device, a challenge found for the software developer is to write code based upon a multiple processor type architecture. A software developer's code includes a plurality of subtasks whereby each subtask may be designed to run on a particular processor type. For example, a subtask that manages "control" operations is better suited to run on a microprocessor.

However, there are many subtasks that run adequately on either processor type. In this case, the subtask would be best run on a processor that is not heavily loaded at a particular time. A challenge found, however, is that existing art requires a software developer to identify a processor type at compilation, not at runtime.

Another challenge found in writing code is partitioning a set of tasks among a set of heterogeneous processors depending upon the processor topology of a particular client. For example, a client may retrieve a file from a remote server using a computer network, such as the Internet. In this example, the file may include multiple subtasks, each of which is optimized to execute on a particular processor type. Existing art, however, does not allow each subtask to be individually translated in an optimum format to run on an architecture that includes heterogeneous processors.

What is needed, therefore, is a system and method to dynamically select a processor to run a particular subtask at runtime based upon a computer system's environment.

SUMMARY

It has been discovered that the aforementioned challenges are resolved by compiling source code into byte code and using a runtime loader to translate the byte code into processor-specific object code at runtime. A source code file includes a plurality of source code subtasks. During compilation, a compiler translates each source code subtask into byte code subtasks. Each byte code subtask may have a different format, such as Java, XML, Shader, or Script. At runtime, a runtime loader receives a byte code subtask, identifies a particular processor type for the byte code subtask, and translates the byte code subtask into a processor-specific object code subtask. The runtime loader uses one of three approaches to identify a processor type to associate with each byte code subtasks.

The first approach that the runtime loader may use to identify an appropriate processor type is a brute-force approach whereby the runtime loader identifies one or more operations within the byte code subtask and selects a processor type that is best suited to perform the identified operations. For example, the runtime loader may analyze subtask X and identify a plurality of control operations included in subtask X. In this example, the runtime loader may translate subtask X into an object code subtask that runs on a processor type with a microprocessor-based architecture.

The second approach that the runtime loader may use to identify an appropriate processor type is a higher-level approach whereby the runtime loader identifies a program directive within a byte code subtask and selects a processor type corresponding to the program directive. For example, "procA" may be a line in subtask X that instructs runtime loader to translate subtask X in a format to run on a processor type "A".

The third approach that the runtime loader may use to identify an appropriate processor type is based upon processor availability. For example, the runtime loader may analyze loading factors of processor types and determine that a first processor type is heavily loaded. In this example, the runtime loader determines that a byte code subtask is better suited to run on a second processor type and, therefore, translates the byte code subtask into a format that runs on the second processor type.

In one embodiment, the compiler stores a pointer in a byte code file that references the location of a byte code subtask. In this embodiment, the byte code subtask is stored in a shared library and, at runtime, the runtime loader uses the pointer to identify the location of the byte code subtask in order to translate the byte code subtask into a processor-specific object code subtask.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 33 illustrates the structure of a key control table for a hardware sandbox in accordance with the present invention;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
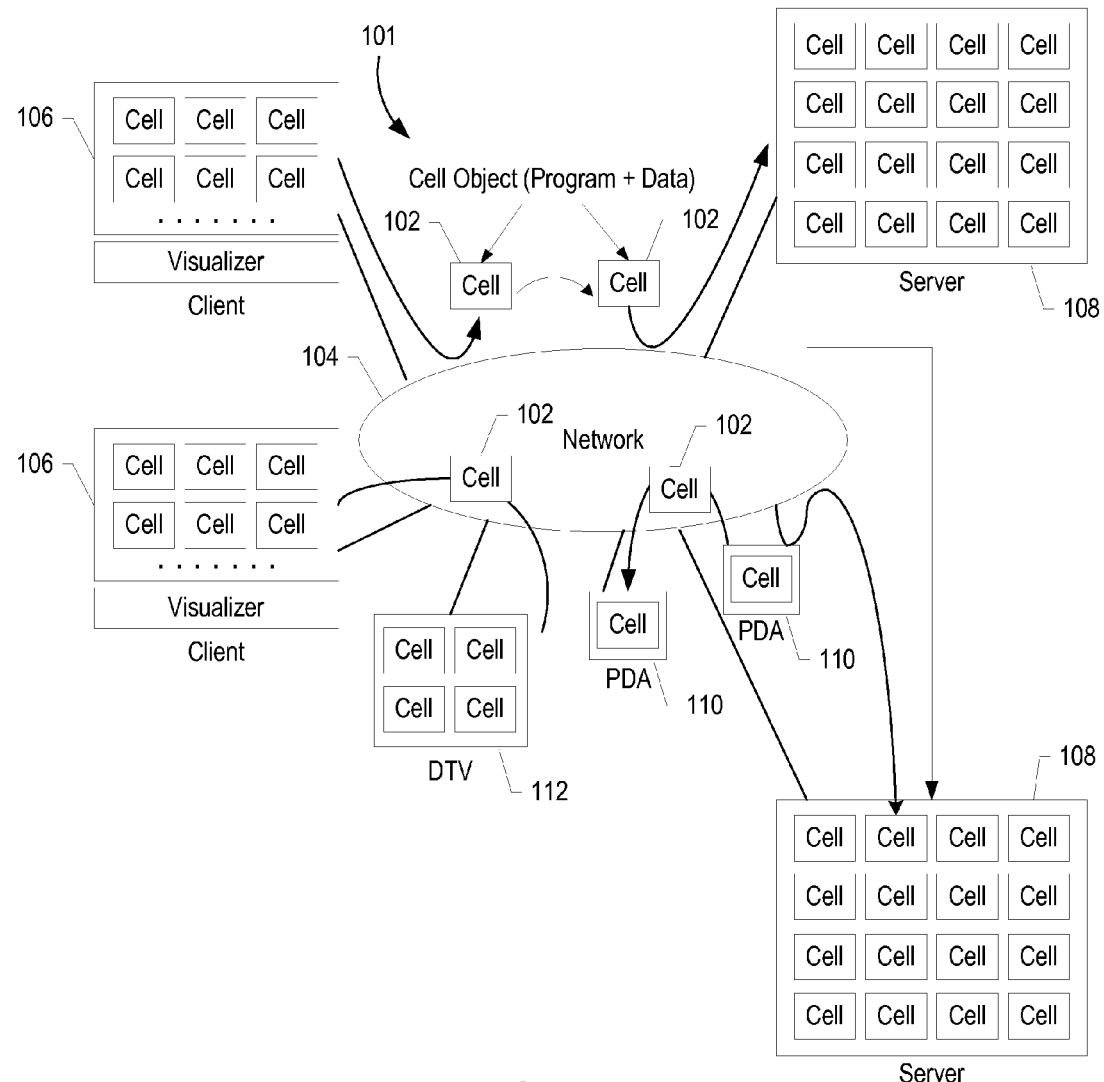
FIG. 1 illustrates—the overall architecture of a computer network in accordance with the present invention.

The overall architecture for a computer system 101 in accordance with the present invention is shown in FIG. 1.

As illustrated in this figure, system 101 includes network 104 to which is connected a plurality of computers and computing devices. Network 104 can be a LAN, a global network, such as the Internet, or any other computer network.

The computers and computing devices connected to network 104 (the network's "members") include, e.g., client computers 106, server computers 108, personal digital assistants (PDAs) 110, digital television (DTV) 112 and other wired or wireless computers and computing devices. The processors employed by the members of network 104 are constructed from the same common computing module. These processors also preferably all have the same ISA and perform processing in accordance with the same instruction set. The number of modules included within any particular processor depends upon the processing power required by that processor.

For example, since servers 108 of system 101 perform more processing of data and applications than clients 106, servers 108 contain more computing modules than clients 106. PDAs 110, on the other hand, perform the least amount of processing. PDAs 110, therefore, contain the smallest number of computing modules. DTV 112 performs a level of processing between that of clients 106 and servers 108. DTV 112, therefore, contains a number of computing modules between that of clients 106 and servers 108. As discussed below, each computing module contains a processing controller and a plurality of identical processing units for performing parallel processing of the data and applications transmitted over network 104.

This homogeneous configuration for system 101 facilitates adaptability, processing speed and processing efficiency. Because each member of system 101 performs processing using one or more (or some fraction) of the same computing module, the particular computer or computing device performing the actual processing of data and applications is unimportant. The processing of a particular application and data, moreover, can be shared among the network's members. By uniquely identifying the cells comprising the data and applications processed by system 101 throughout the system, the processing results can be transmitted to the computer or computing device requesting the processing regardless of where this processing occurred. Because the modules performing this processing have a common structure and employ a common ISA, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by system 101, the data and applications processed by this system are packaged into uniquely identified, uniformly formatted software cells 102. Each software cell 102 contains, or can contain, both applications and data. Each software cell also contains an ID to globally identify the cell throughout network 104 and system 101. This uniformity of structure for the software cells, and the software cells' unique identification throughout the network, facilitates the processing of applications and data on any computer or computing device of the network. For example, a client 106 may formulate a software cell 102 but, because of the limited processing capabilities of client 106, transmit this software cell to a server 108 for processing. Software cells can migrate, therefore, throughout network 104 for processing on the basis of the availability of processing resources on the network.

The homogeneous structure of processors and software cells of system 101 also avoids many of the problems of today's heterogeneous networks. For example, inefficient programming models which seek to permit processing of applications on any ISA using any instruction set, e.g., virtual machines such as the Java virtual machine, are avoided. System 101, therefore, can implement broadband processing far more effectively and efficiently than today's networks.

Figure 2:
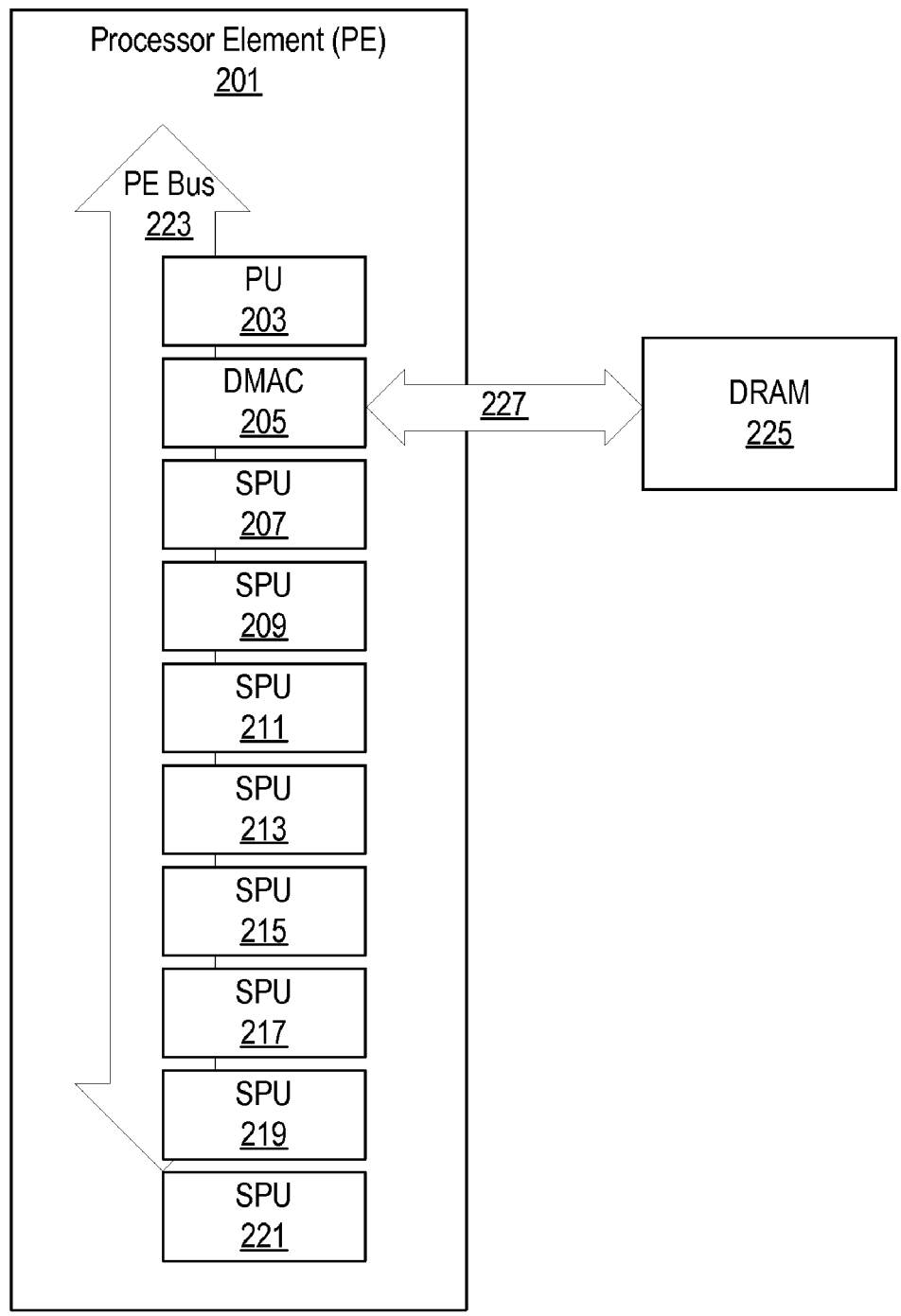
FIG. 2 is a diagram illustrating the structure of a processing unit (PU) in accordance with the present invention.

The basic processing module for all members of network 104 is the processing unit (PU). FIG. 2 illustrates the structure of a PU. As shown in this figure, PE 201 comprises a processing unit (PU) 203, a direct memory access controller (DMAC) 205 and a plurality of synergistic processing units (SPUs), namely, SPU 207, SPU 209, SPU 211, SPU 213, SPU 215, SPU 217, SPU 219 and SPU 221. A local PE bus 223 transmits data and applications among the SPUs, DMAC 205 and PU 203. Local PE bus 223 can have, e.g., a conventional architecture or be implemented as a packet switch network. Implementation as a packet switch network, while requiring more hardware, increases available bandwidth.

PE 201 can be constructed using various methods for implementing digital logic. PE 201 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. PE 201 also could be implemented using superconducting material, e.g., rapid single-flux-quantum (RSFQ) logic.

PE 201 is closely associated with a dynamic random access memory (DRAM) 225 through a high bandwidth memory connection 227. DRAM 225 functions as the main memory for PE 201. Although a DRAM 225 preferably is a dynamic random access memory, DRAM 225 could be implemented using other means, e.g., as a static random access memory (SRAM), a magnetic random access memory (MRAM), an optical memory or a holographic memory. DMAC 205 facilitates the transfer of data between DRAM 225 and the SPUs and PU of PE 201. As further discussed below, DMAC 205 designates for each SPU an exclusive area in DRAM 225 into which only the SPU can write data and from which only the SPU can read data. This exclusive area is designated a "sandbox."

PU 203 can be, e.g., a standard processor capable of stand-alone processing of data and applications. In operation, PU 203 schedules and orchestrates the processing of data and applications by the SPUs. The SPUs preferably are single instruction, multiple data (SIMD) processors. Under the control of PU 203, the SPUs perform the processing of these data and applications in a parallel and independent manner. DMAC 205 controls accesses by PU 203 and the SPUs to the data and applications stored in the shared DRAM 225. Although PE 201 preferably includes eight SPUs, a greater or lesser number of SPUs can be employed in a PU depending upon the processing power required. Also, a number of PUs, such as PE 201, may be joined or packaged together to provide enhanced processing power.

Figure 3:
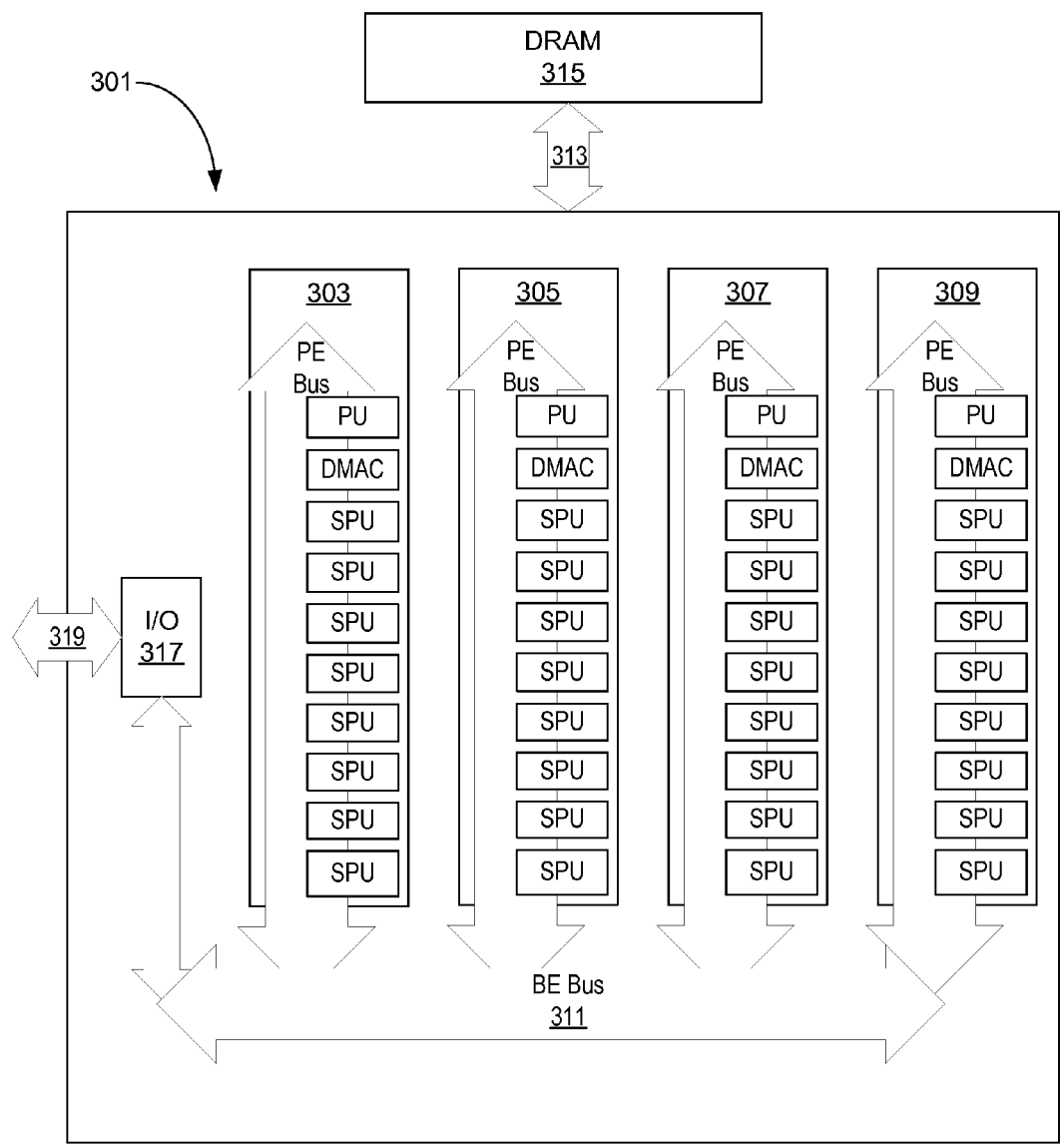
FIG. 3 is a diagram illustrating the structure of a broadband engine (BE) in accordance with the present invention.

For example, as shown in FIG. 3, four PUs may be packaged or joined together, e.g., within one or more chip packages, to form a single processor for a member of network 104. This configuration is designated a broadband engine (BE). As shown in FIG. 3, BE 301 contains four PUs, namely, PE 303, PE 305, PE 307 and PE 309. Communications among these PUs are over BE bus 311. Broad bandwidth memory connection 313 provides communication between shared DRAM 315 and these PUs. In lieu of BE bus 311, communications among the PUs of BE 301 can occur through DRAM 315 and this memory connection.

Input/output (I/O) interface 317 and external bus 319 provide communications between broadband engine 301 and the other members of network 104. Each PU of BE 301 performs processing of data and applications in a parallel and independent manner analogous to the parallel and independent processing of applications and data performed by the SPUs of a PU.

Figure 4:
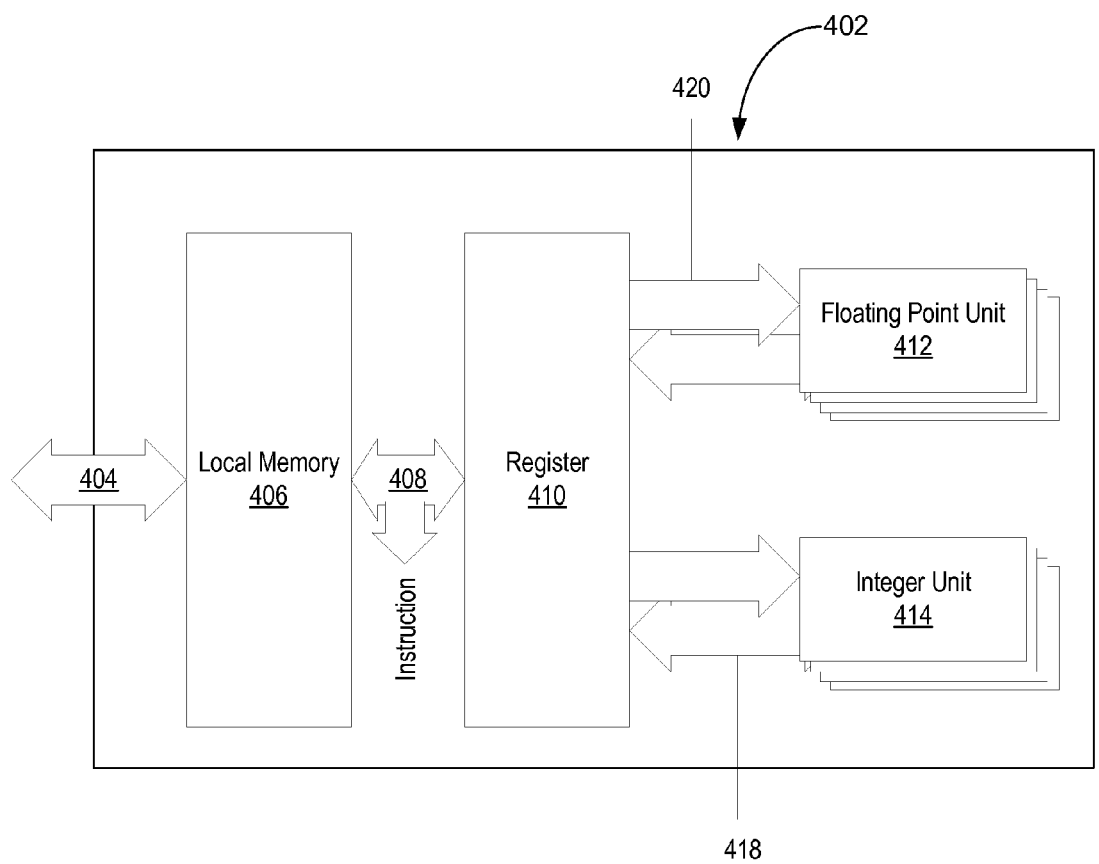
FIG. 4 is a diagram illustrating the structure of an synergistic processing unit (SPU) in accordance with the present invention.

FIG. 4 illustrates the structure of an SPU. SPU 402 includes local memory 406, registers 410, four floating point units 412 and four integer units 414. Again, however, depending upon the processing power required, a greater or lesser number of floating points units 412 and integer units 414 can be employed. In a preferred embodiment, local memory 406 contains 128 kilobytes of storage, and the capacity of registers 410 is 128.times.128 bits. Floating point units 412 preferably operate at a speed of 32 billion floating point operations per second (32 GFLOPS), and integer units 414 preferably operate at a speed of 32 billion operations per second (32 GOPS).

Local memory 406 is not a cache memory. Local memory 406 is preferably constructed as an SRAM. Cache coherency support for an SPU is unnecessary. A PU may require cache coherency support for direct memory accesses initiated by the PU. Cache coherency support is not required, however, for direct memory accesses initiated by an SPU or for accesses from and to external devices.

SPU 402 further includes bus 404 for transmitting applications and data to and from the SPU. In a preferred embodiment, this bus is 1,024 bits wide. SPU 402 further includes internal busses 408, 420 and 418. In a preferred embodiment, bus 408 has a width of 256 bits and provides communications between local memory 406 and registers 410. Busses 420 and 418 provide communications between, respectively, registers 410 and floating point units 412, and registers 410 and integer units 414. In a preferred embodiment, the width of busses 418 and 420 from registers 410 to the floating point or integer units is 384 bits, and the width of busses 418 and 420 from the floating point or integer units to registers 410 is 128 bits. The larger width of these busses from registers 410 to the floating point or integer units than from these units to registers 410 accommodates the larger data flow from registers 410 during processing. A maximum of three words are needed for each calculation. The result of each calculation, however, normally is only one word.

Figure 5:
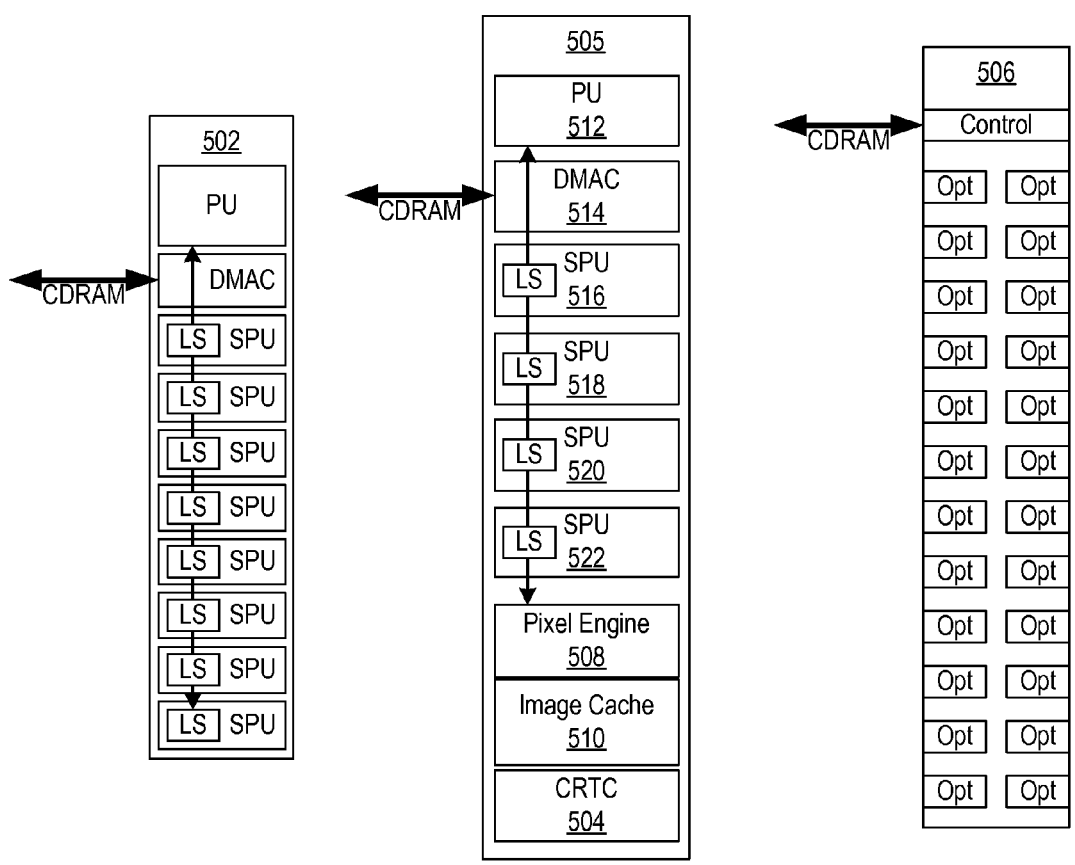
FIG. 5 is a diagram illustrating the structure of a processing unit, visualizer (VS) and an optical interface in accordance with the present invention.
Figure 6:
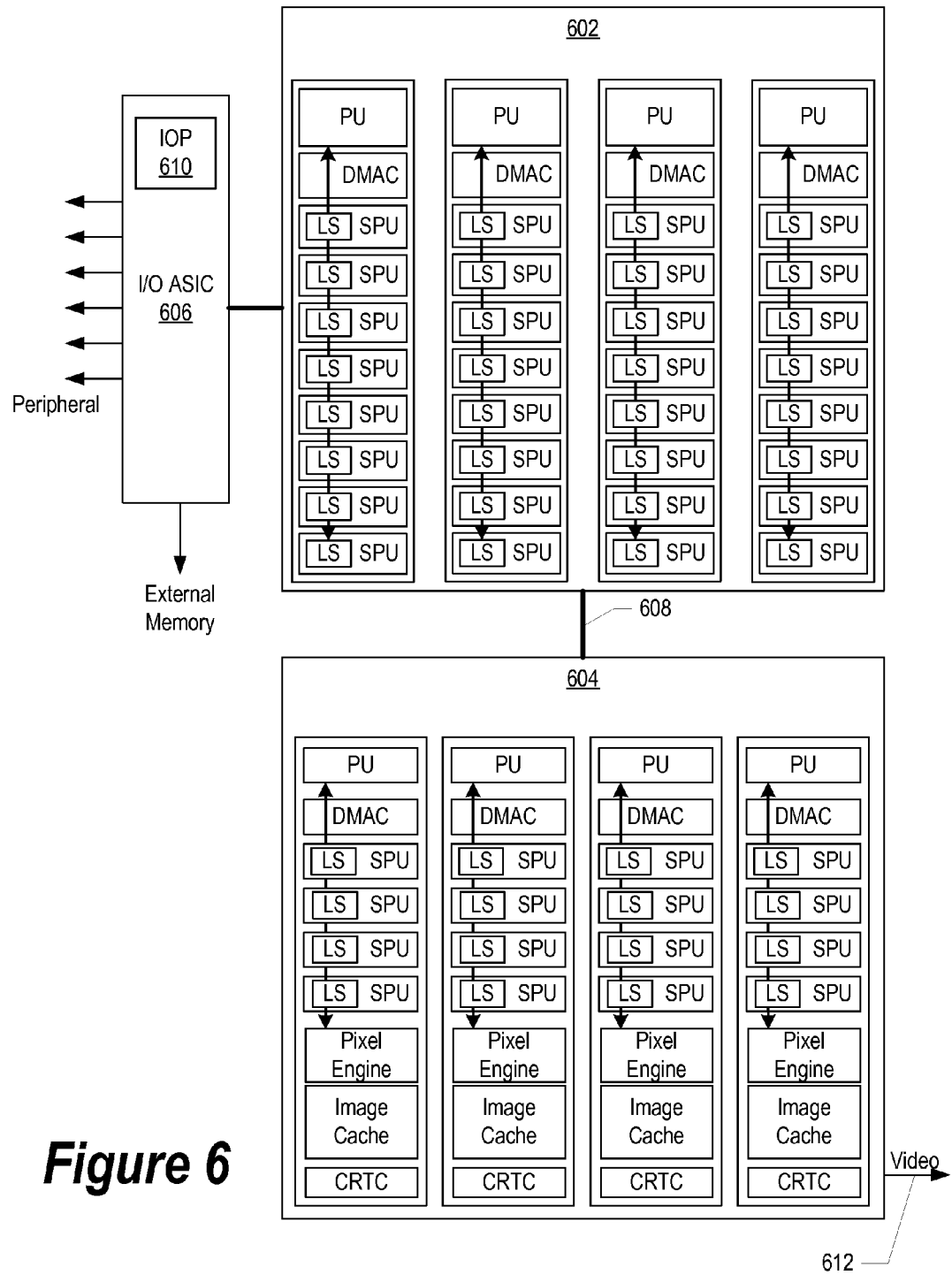
FIG. 6 is a diagram illustrating one combination of processing units in accordance with the present invention.

FIGS. 5-10 further illustrate the modular structure of the processors of the members of network 104. For example, as shown in FIG. 5, a processor may comprise a single PU 502. As discussed above, this PU typically comprises a PU, DMAC and eight SPUs. Each SPU includes local storage (LS). On the other hand, a processor may comprise the structure of visualizer (VS) 505. As shown in FIG. 5, VS 505 comprises PU 512, DMAC 514 and four SPUs, namely, SPU 516, SPU 518, SPU 520 and SPU 522. The space within the chip package normally occupied by the other four SPUs of a PU is occupied in this case by pixel engine 508, image cache 510 and cathode ray tube controller (CRTC) 504. Depending upon the speed of communications required for PU 502 or VS 505, optical interface 506 also may be included on the chip package.

Using this standardized, modular structure, numerous other variations of processors can be constructed easily and efficiently. For example, the processor shown in FIG. 6 comprises two chip packages, namely, chip package 602 comprising a BE and chip package 604 comprising four VSs. Input/output (I/O) 606 provides an interface between the BE of chip package 602 and network 104. Bus 608 provides communications between chip package 602 and chip package 604. Input output processor (IOP) 610 controls the flow of data into and out of I/O 606. I/O 606 may be fabricated as an application specific integrated circuit (ASIC). The output from the VSs is video signal 612.

Figure 7:
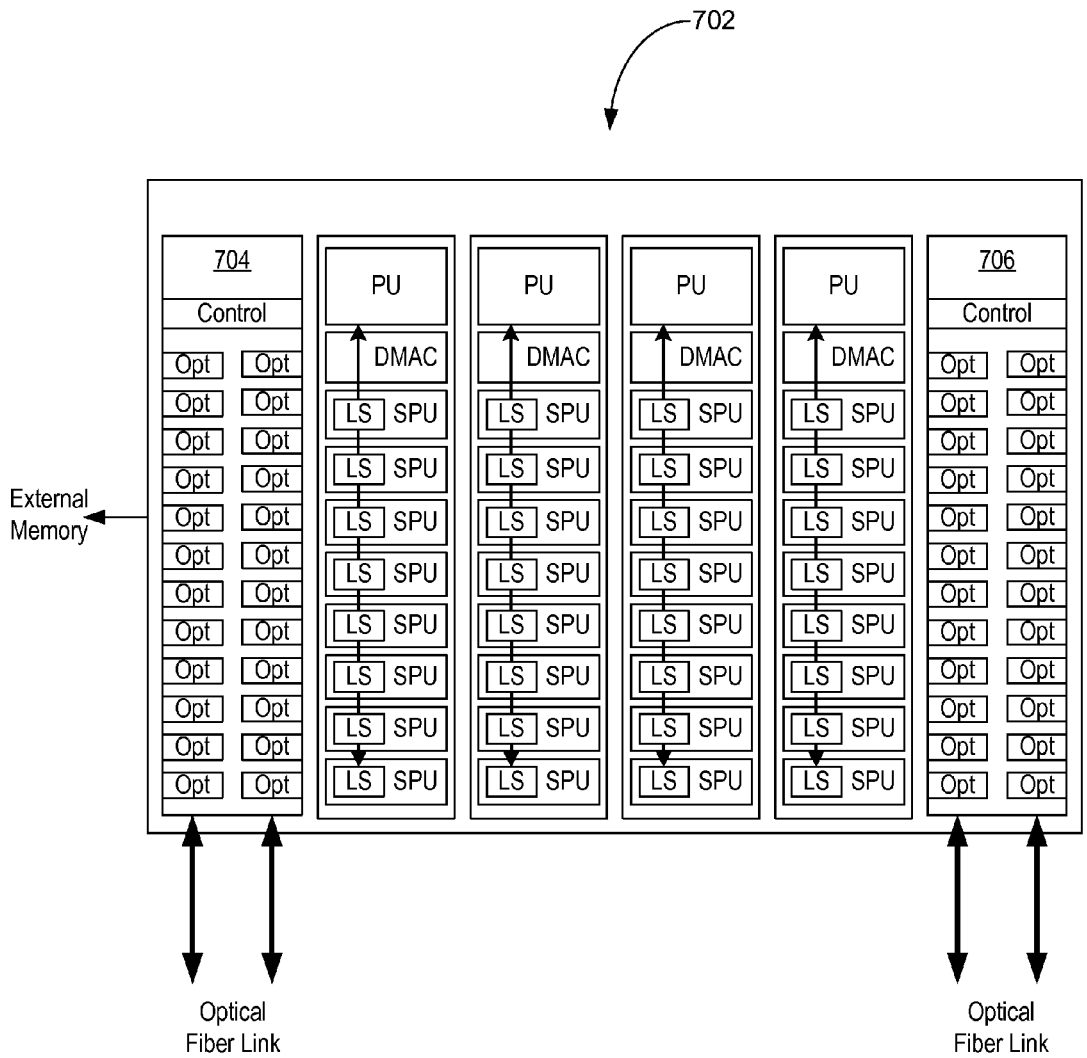
FIG. 7 illustrates another combination of processing units in accordance with the present invention.

FIG. 7 illustrates a chip package for a BE 702 with two optical interfaces 704 and 706 for providing ultra high speed communications to the other members of network 104 (or other chip packages locally connected). BE 702 can function as, e.g., a server on network 104.

Figure 8:
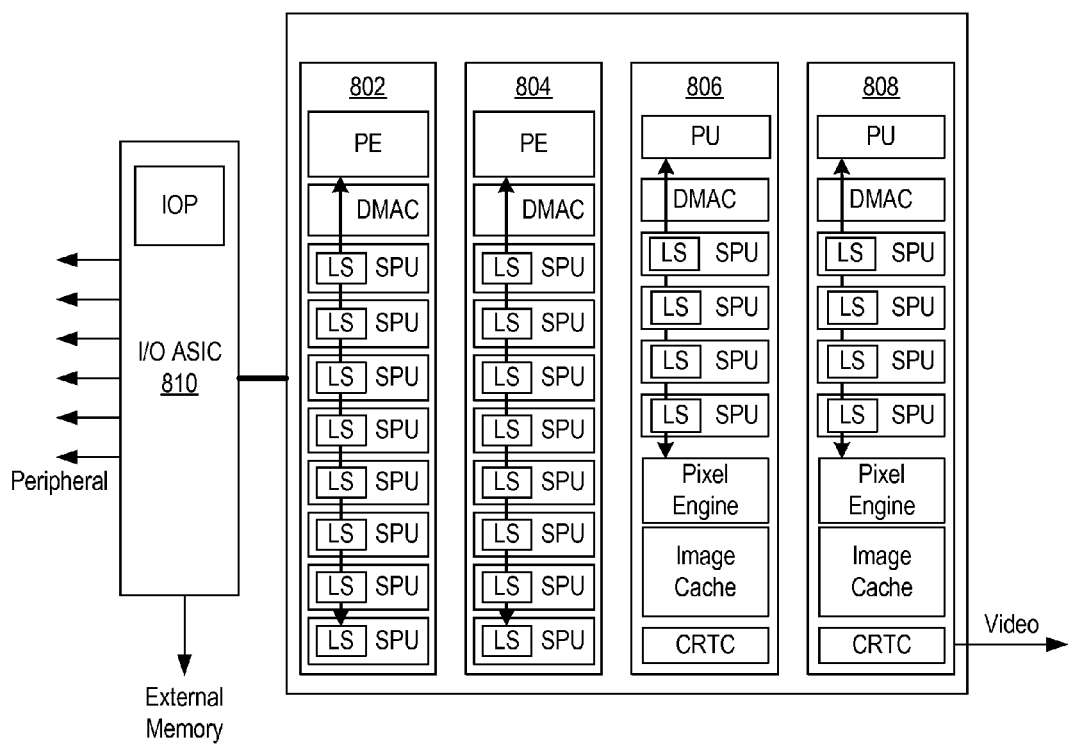
FIG. 8 illustrates yet another combination of processing units in accordance with the present invention.

The chip package of FIG. 8 comprises two PEs 802 and 804 and two VSs 806 and 808. An I/O 810 provides an interface between the chip package and network 104. The output from the chip package is a video signal. This configuration may function as, e.g., a graphics work station.

Figure 9:
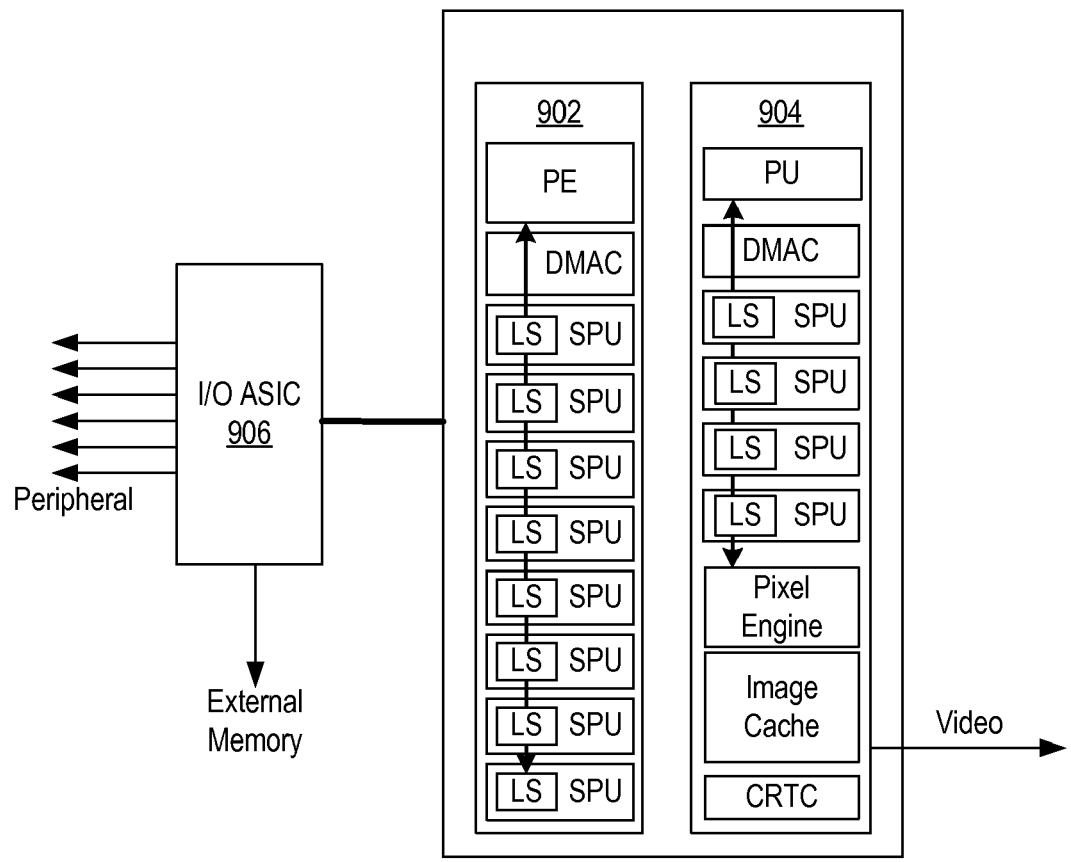
FIG. 9 illustrates yet another combination of processing units in accordance with the present invention.

FIG. 9 illustrates yet another configuration. This configuration contains one-half of the processing power of the configuration illustrated in FIG. 8. Instead of two PUs, one PE 902 is provided, and instead of two VSs, one VS 904 is provided. I/O 906 has one-half the bandwidth of the I/O illustrated in FIG. 8. Such a processor also may function, however, as a graphics work station.

Figure 10:
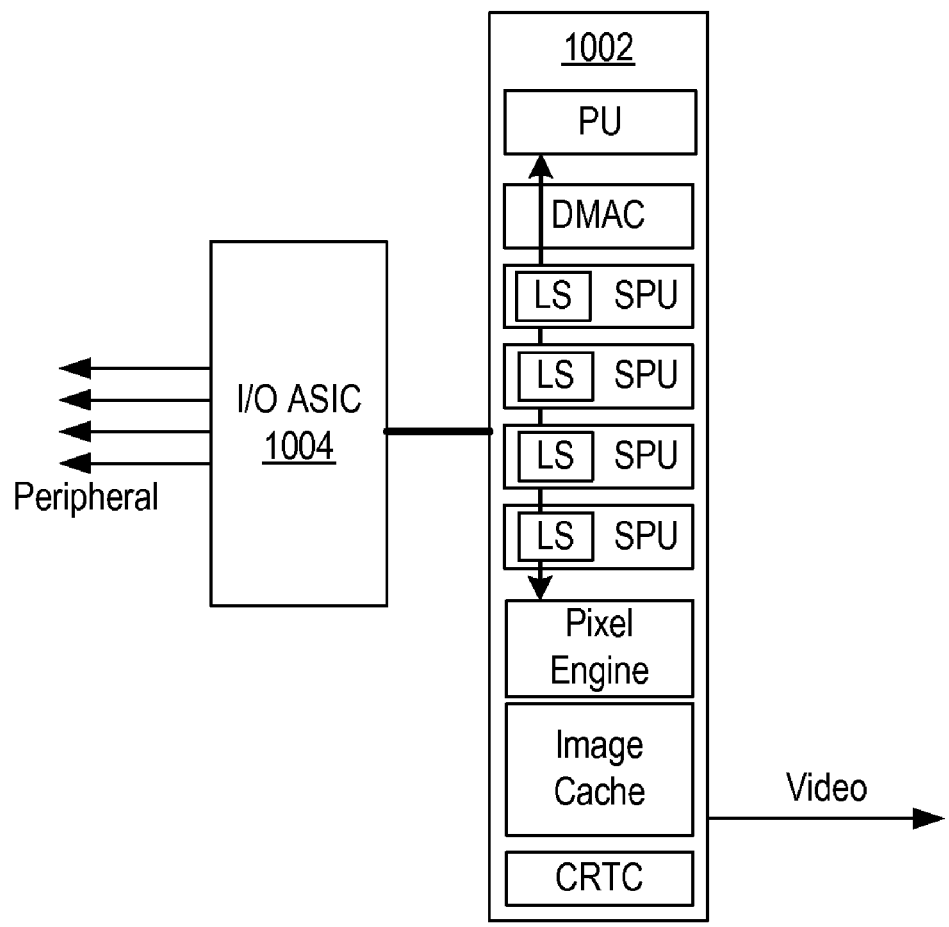
FIG. 10 illustrates yet another combination of processing units in accordance with the present invention.

A final configuration is shown in FIG. 10. This processor consists of only a single VS 1002 and an I/O 1004. This configuration may function as, e.g., a PDA.

Figure 11A:
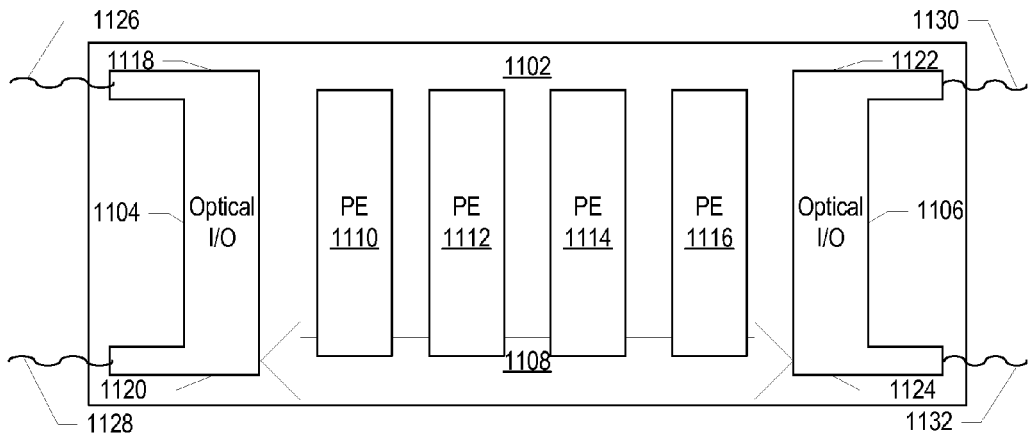
FIG. 11A illustrates the integration of optical interfaces within a chip package in accordance with the present invention.

FIG. 11A illustrates the integration of optical interfaces into a chip package of a processor of network 104. These optical interfaces convert optical signals to electrical signals and electrical signals to optical signals and can be constructed from a variety of materials including, e.g., gallium arsinide, aluminum gallium arsinide, germanium and other elements or compounds. As shown in this figure, optical interfaces 1104 and 1106 are fabricated on the chip package of BE 1102. BE bus 1108 provides communication among the PUs of BE 1102, namely, PE 1110, PE 1112, PE 1114, PE 1116, and these optical interfaces. Optical interface 1104 includes two ports, namely, port 1118 and port 1120, and optical interface 1106 also includes two ports, namely, port 1122 and port 1124. Ports 1118, 1120, 1122 and 1124 are connected to, respectively, optical wave guides 1126, 1128, 1130 and 1132. Optical signals are transmitted to and from BE 1102 through these optical wave guides via the ports of optical interfaces 1104 and 1106.

Figure 11B:
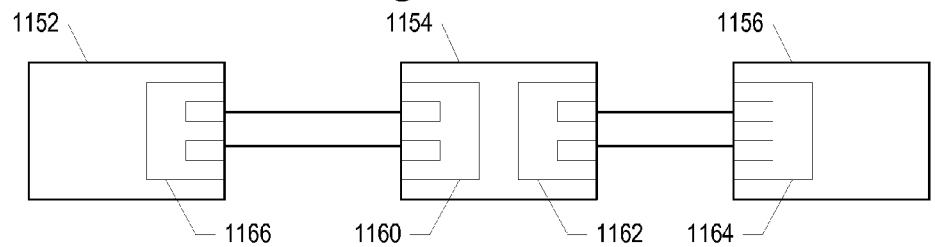
FIG. 11B is a diagram of one configuration of processors using the optical interfaces of FIG. 11A.

A plurality of BEs can be connected together in various configurations using such optical wave guides and the four optical ports of each BE. For example, as shown in FIG. 11B, two or more BEs, e.g., BE 1152, BE 1154 and BE 1156, can be connected serially through such optical ports. In this example, optical interface 1166 of BE 1152 is connected through its optical ports to the optical ports of optical interface 1160 of BE 1154. In a similar manner, the optical ports of optical interface 1162 on BE 1154 are connected to the optical ports of optical interface 1164 of BE 1156.

Figure 11C:
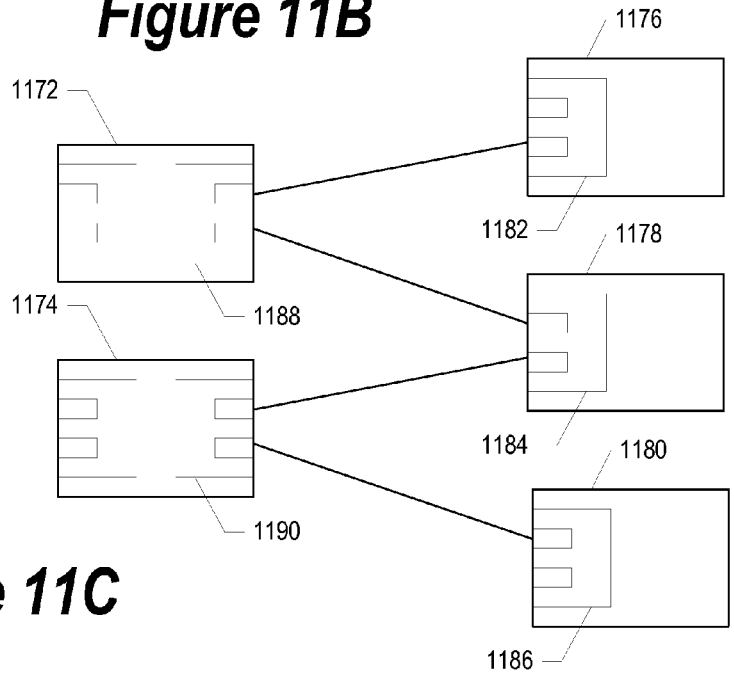
FIG. 11C is a diagram of another configuration of processors using the optical interfaces of FIG. 11A.

A matrix configuration is illustrated in FIG. 11C. In this configuration, the optical interface of each BE is connected to two other BEs. As shown in this figure, one of the optical ports of optical interface 1188 of BE 1172 is connected to an optical port of optical interface 1182 of BE 1176. The other optical port of optical interface 1188 is connected to an optical port of optical interface 1184 of BE 1178. In a similar manner, one optical port of optical interface 1190 of BE 1174 is connected to the other optical port of optical interface 1184 of BE 1178. The other optical port of optical interface 1190 is connected to an optical port of optical interface 1186 of BE 1180. This matrix configuration can be extended in a similar manner to other BEs.

Using either a serial configuration or a matrix configuration, a processor for network 104 can be constructed of any desired size and power. Of course, additional ports can be added to the optical interfaces of the BEs, or to processors having a greater or lesser number of PUs than a BE, to form other configurations.

Figure 12A:
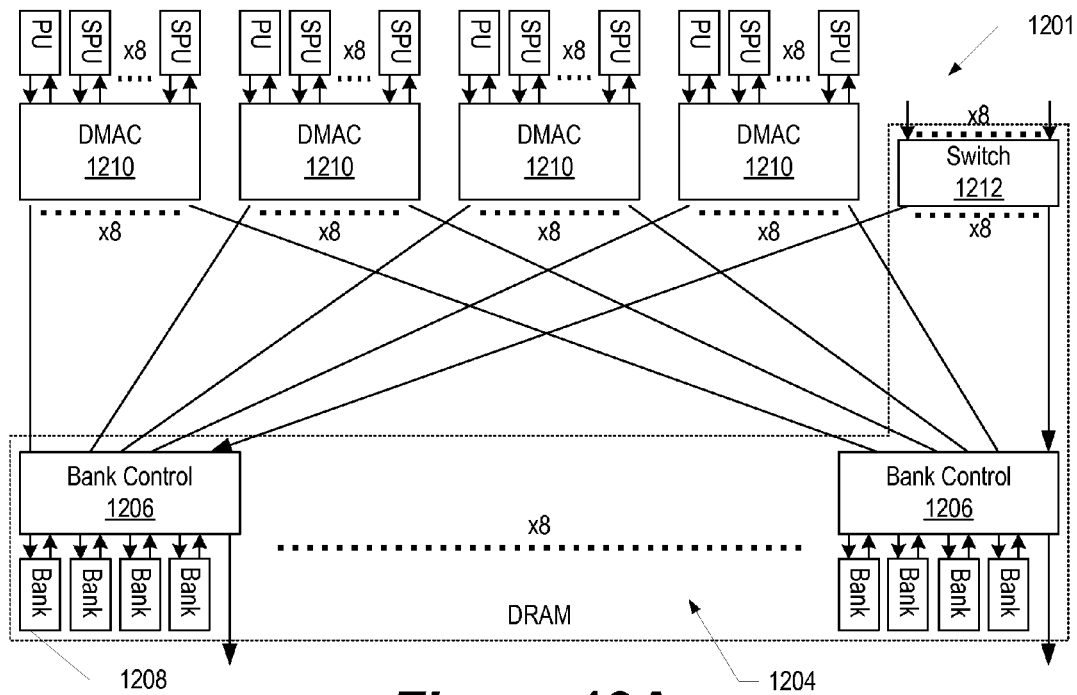
FIG. 12A illustrates the structure of a memory system in accordance with the present invention.

FIG. 12A illustrates the control system and structure for the DRAM of a BE. A similar control system and structure is employed in processors having other sizes and containing more or less PUs. As shown in this figure, a cross-bar switch connects each DMAC 1210 of the four PUs comprising BE 1201 to eight bank controls 1206. Each bank control 1206 controls eight banks 1208 (only four are shown in the figure) of DRAM 1204. DRAM 1204, therefore, comprises a total of sixty-four banks. In a preferred embodiment, DRAM 1204 has a capacity of 64 megabytes, and each bank has a capacity of 1 megabyte. The smallest addressable unit within each bank, in this preferred embodiment, is a block of 1024 bits.

BE 1201 also includes switch unit 1212. Switch unit 1212 enables other SPUs on BEs closely coupled to BE 1201 to access DRAM 1204. A second BE, therefore, can be closely coupled to a first BE, and each SPU of each BE can address twice the number of memory locations normally accessible to an SPU. The direct reading or writing of data from or to the DRAM of a first BE from or to the DRAM of a second BE can occur through a switch unit such as switch unit 1212.

Figure 12B:
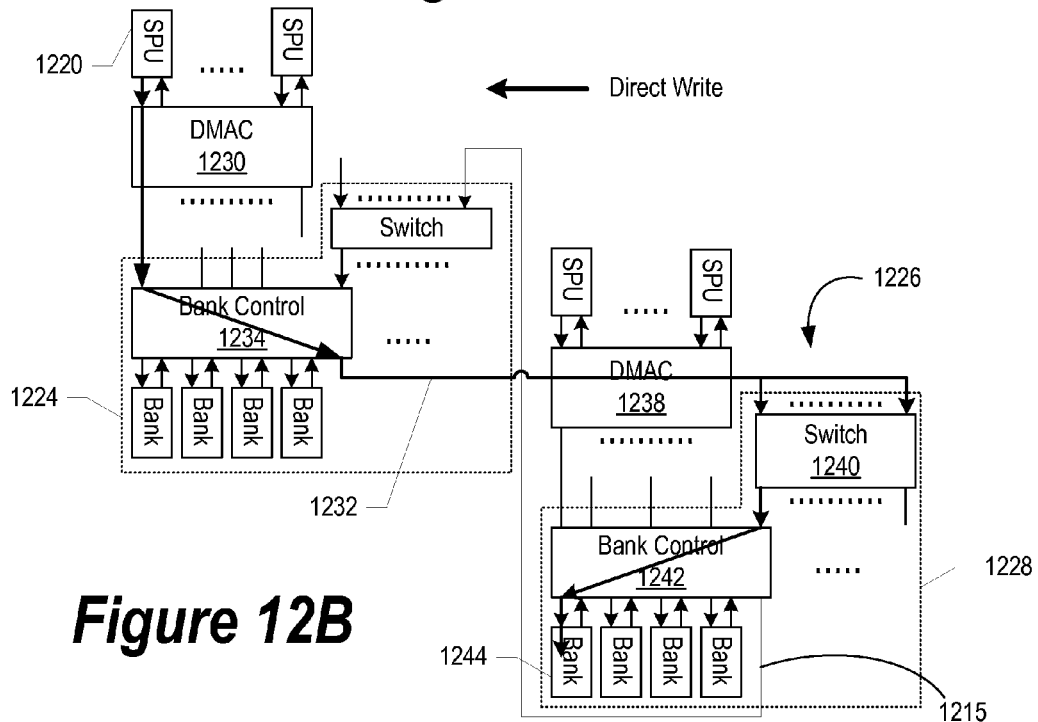
FIG. 12B illustrates the writing of data from a first broadband engine to a second broadband engine in accordance with the present invention.

For example, as shown in FIG. 12B, to accomplish such writing, the SPU of a first BE, e.g., SPU 1220 of BE 1222, issues a write command to a memory location of a DRAM of a second BE, e.g., DRAM 1228 of BE 1226 (rather than, as in the usual case, to DRAM 1224 of BE 1222). DMAC 1230 of BE 1222 sends the write command through cross-bar switch 1221 to bank control 1234, and bank control 1234 transmits the command to an external port 1232 connected to bank control 1234. DMAC 1238 of BE 1226 receives the write command and transfers this command to switch unit 1240 of BE 1226. Switch unit 1240 identifies the DRAM address contained in the write command and sends the data for storage in this address through bank control 1242 of BE 1226 to bank 1244 of DRAM 1228. Switch unit 1240, therefore, enables both DRAM 1224 and DRAM 1228 to function as a single memory space for the SPUs of BE 1226.

Figure 13:
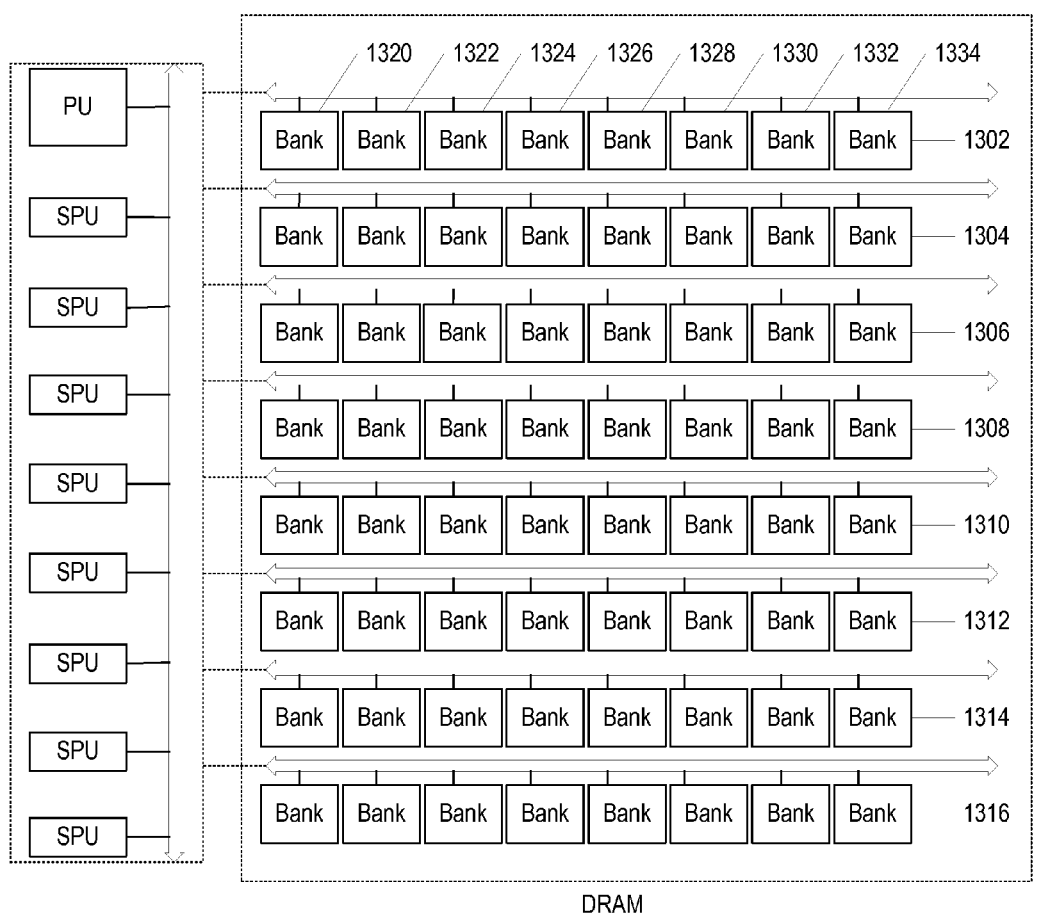
FIG. 13 is a diagram of the structure of a shared memory for a processing unit in accordance with the present invention.

FIG. 13 shows the configuration of the sixty-four banks of a DRAM. These banks are arranged into eight rows, namely, rows 1302, 1304, 1306, 1308, 1310, 1312, 1314 and 1316 and eight columns, namely, columns 1320, 1322, 1324, 1326, 1328, 1330, 1332 and 1334. Each row is controlled by a bank controller. Each bank controller, therefore, controls eight megabytes of memory.

Figure 14A:
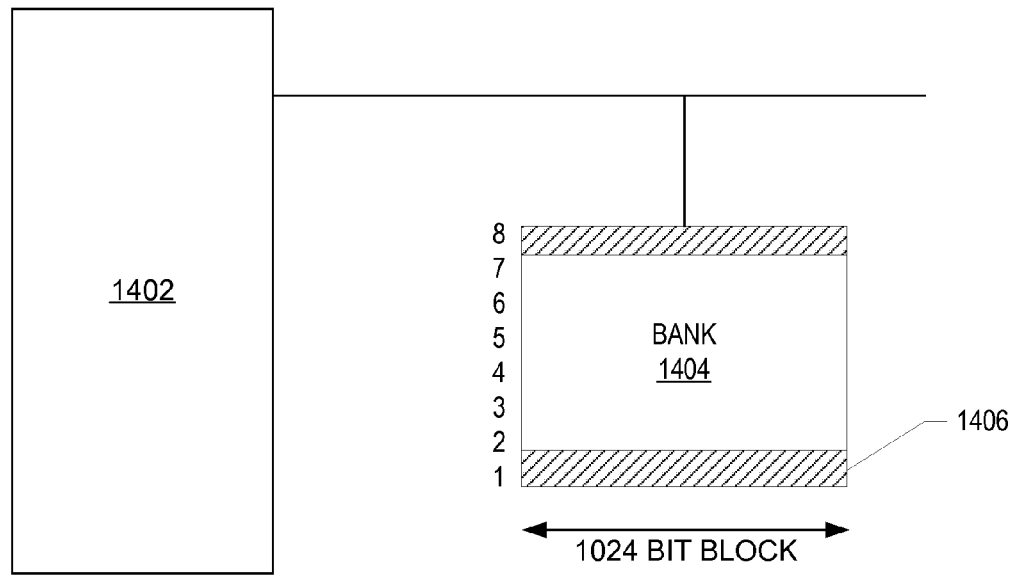
FIG. 14A illustrates one structure for a bank of the memory shown in FIG. 13.
Figure 14B:
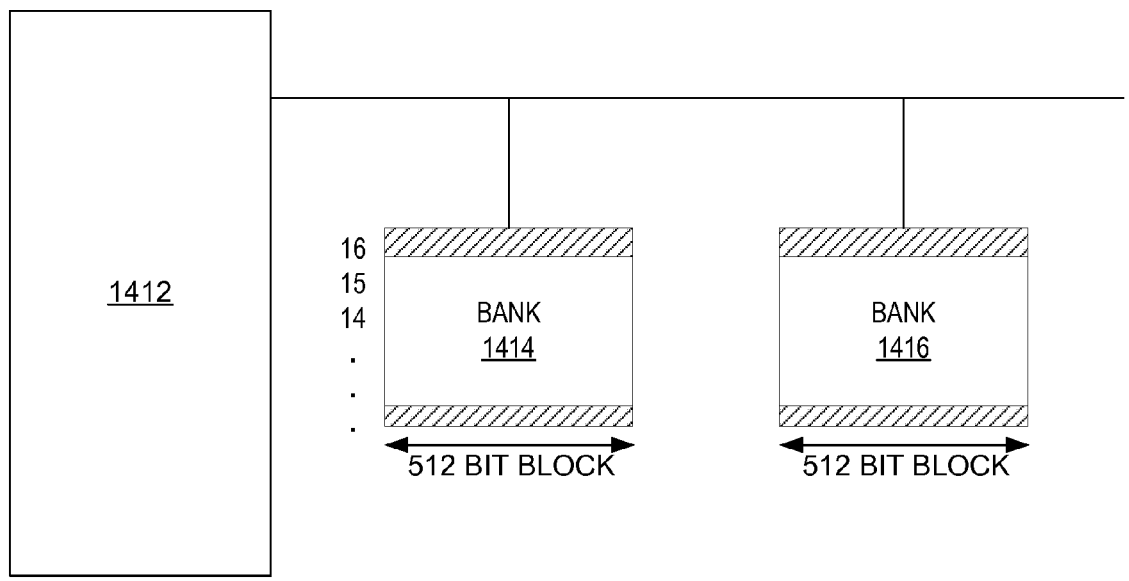
FIG. 14B illustrates another structure for a bank of the memory shown in FIG. 13.

FIGS. 14A and 14B illustrate different configurations for storing and accessing the smallest addressable memory unit of a DRAM, e.g., a block of 1024 bits. In FIG. 14A, DMAC 1402 stores in a single bank 1404 eight 1024 bit blocks 1406. In FIG. 14B, on the other hand, while DMAC 1412 reads and writes blocks of data containing 1024 bits, these blocks are interleaved between two banks, namely, bank 1414 and bank 1416. Each of these banks, therefore, contains sixteen blocks of data, and each block of data contains 512 bits. This interleaving can facilitate faster accessing of the DRAM and is useful in the processing of certain applications.

Figure 15:
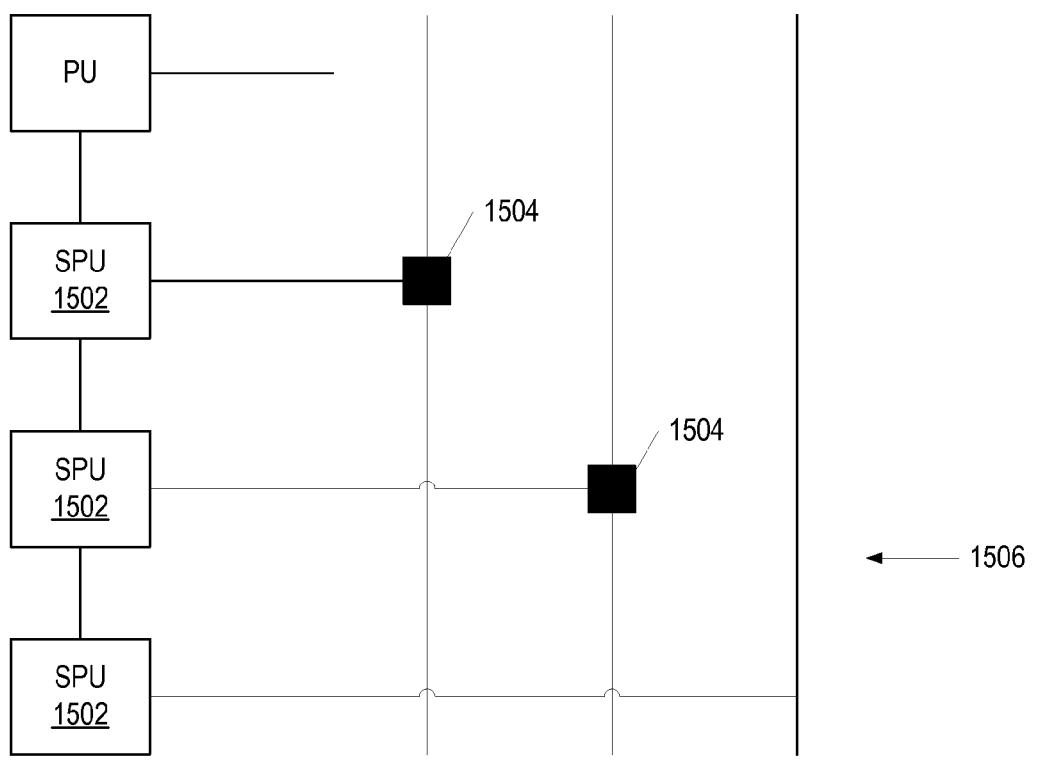
FIG. 15 illustrates a structure for a direct memory access controller in accordance with the present invention.

FIG. 15 illustrates the architecture for a DMAC 1504 within a PE. As illustrated in this figure, the structural hardware comprising DMAC 1506 is distributed throughout the PE such that each SPU 1502 has direct access to a structural node 1504 of DMAC 1506. Each node executes the logic appropriate for memory accesses by the SPU to which the node has direct access.

Figure 16:
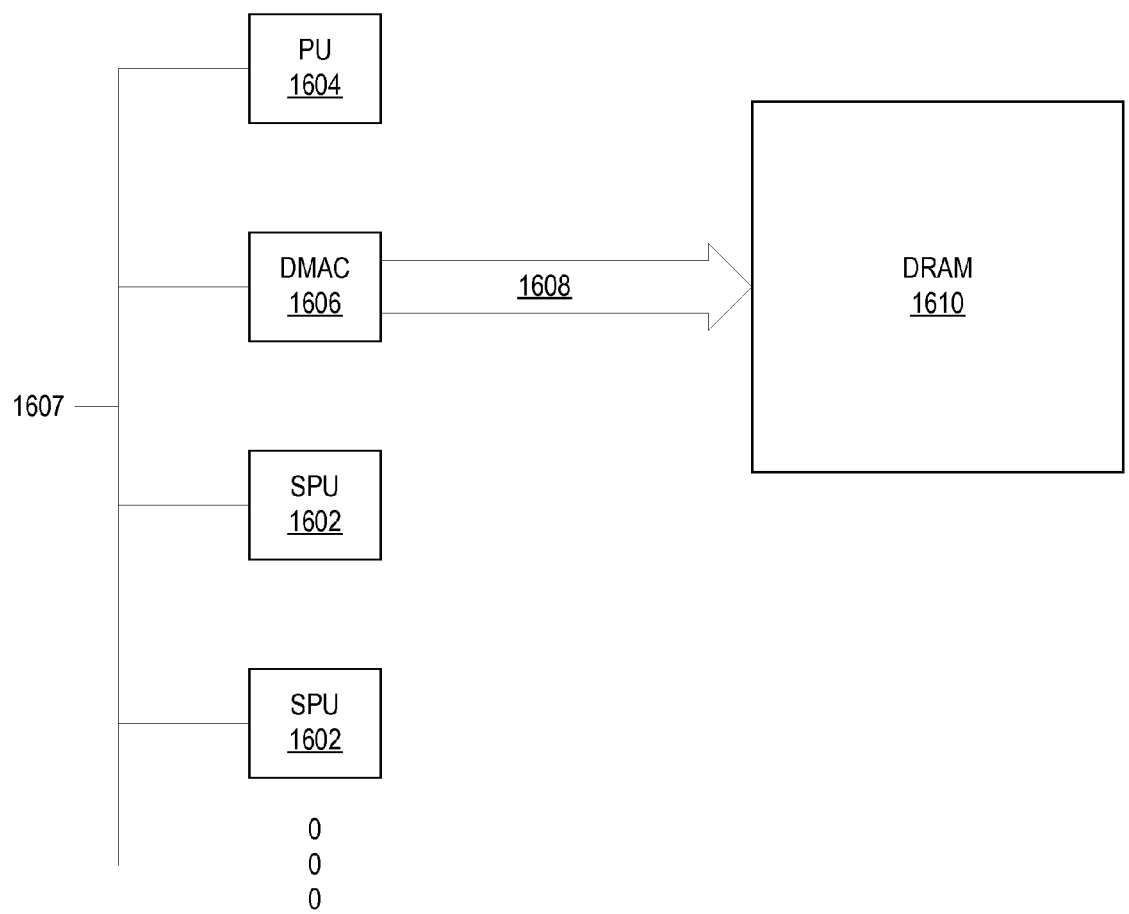
FIG. 16 illustrates an alternative structure for a direct memory access controller in accordance with the present invention.

FIG. 16 shows an alternative embodiment of the DMAC, namely, a non-distributed architecture. In this case, the structural hardware of DMAC 1606 is centralized. SPUs 1602 and PU 1604 communicate with DMAC 1606 via local PE bus 1607. DMAC 1606 is connected through a cross-bar switch to a bus 1608. Bus 1608 is connected to DRAM 1610.

As discussed above, all of the multiple SPUs of a PU can independently access data in the shared DRAM. As a result, a first SPU could be operating upon particular data in its local storage at a time during which a second SPU requests these data. If the data were provided to the second SPU at that time from the shared DRAM, the data could be invalid because of the first SPU's ongoing processing which could change the data's value. If the second processor received the data from the shared DRAM at that time, therefore, the second processor could generate an erroneous result. For example, the data could be a specific value for a global variable. If the first processor changed that value during its processing, the second processor would receive an outdated value. A scheme is necessary, therefore, to synchronize the SPUs' reading and writing of data from and to memory locations within the shared DRAM. This scheme must prevent the reading of data from a memory location upon which another SPU currently is operating in its local storage and, therefore, which are not current, and the writing of data into a memory location storing current data.

To overcome these problems, for each addressable memory location of the DRAM, an additional segment of memory is allocated in the DRAM for storing status information relating to the data stored in the memory location. This status information includes a full/empty (F/E) bit, the identification of an SPU (SPU ID) requesting data from the memory location and the address of the SPU's local storage (LS address) to which the requested data should be read. An addressable memory location of the DRAM can be of any size. In a preferred embodiment, this size is 1024 bits.

The setting of the F/E bit to 1 indicates that the data stored in the associated memory location are current. The setting of the F/E bit to 0, on the other hand, indicates that the data stored in the associated memory location are not current. If an SPU requests the data when this bit is set to 0, the SPU is prevented from immediately reading the data. In this case, an SPU ID identifying the SPU requesting the data, and an LS address identifying the memory location within the local storage of this SPU to which the data are to be read when the data become current, are entered into the additional memory segment.

An additional memory segment also is allocated for each memory location within the local storage of the SPUs. This additional memory segment stores one bit, designated the "busy bit." The busy bit is used to reserve the associated LS memory location for the storage of specific data to be retrieved from the DRAM. If the busy bit is set to 1 for a particular memory location in local storage, the SPU can use this memory location only for the writing of these specific data. On the other hand, if the busy bit is set to 0 for a particular memory location in local storage, the SPU can use this memory location for the writing of any data.

Examples of the manner in which the F/E bit, the SPU ID, the LS address and the busy bit are used to synchronize the reading and writing of data from and to the shared DRAM of a PU are illustrated in FIGS. 17-31.

Figure 17:
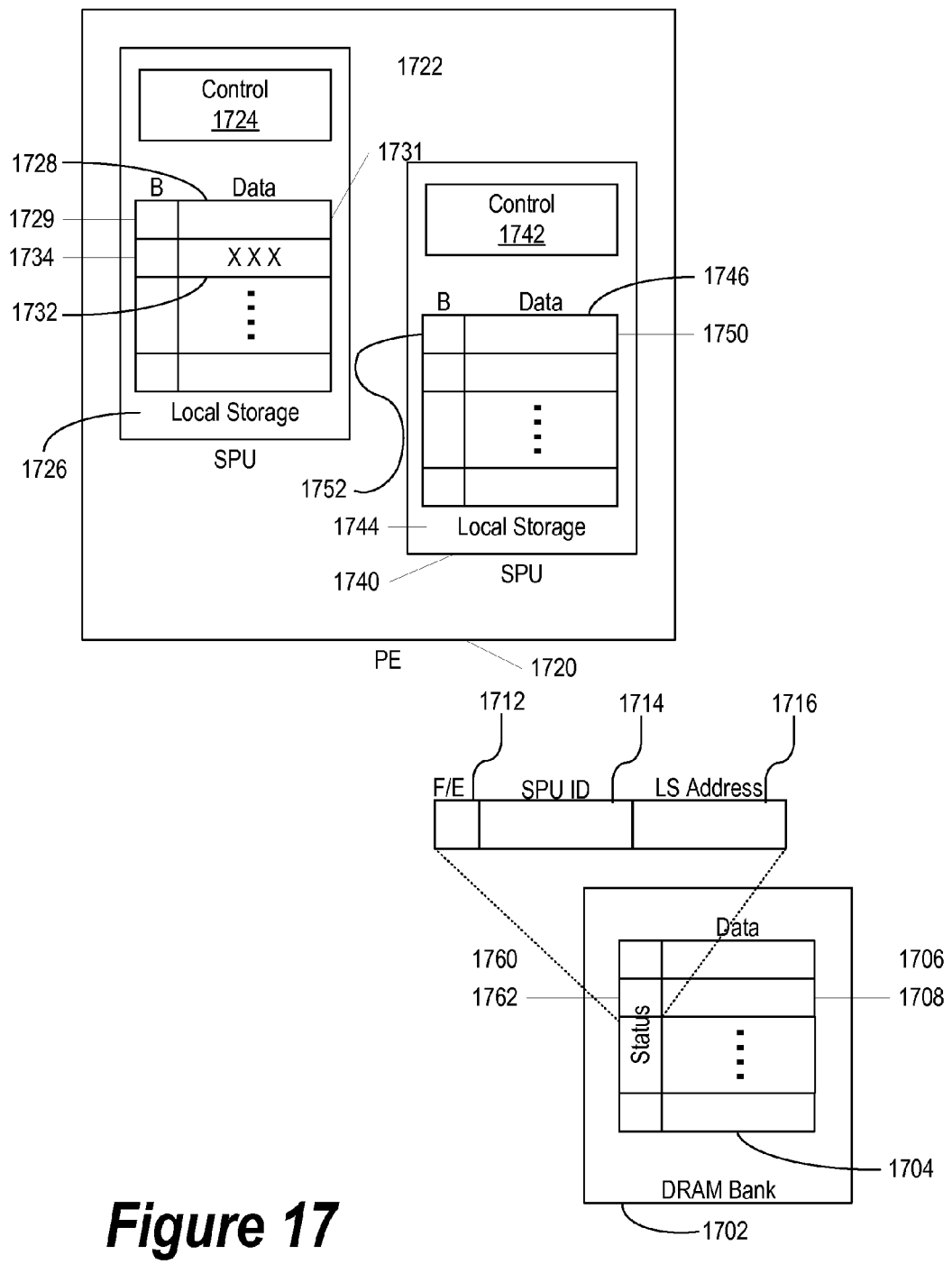
FIGS. 17-31 illustrate the operation of data synchronization in accordance with the present invention.

As shown in FIG. 17, one or more PUs, e.g., PE 1720, interact with DRAM 1702. PE 1720 includes SPU 1722 and SPU 1740. SPU 1722 includes control logic 1724, and SPU 1740 includes control logic 1742. SPU 1722 also includes local storage 1726. This local storage includes a plurality of addressable memory locations 1728. SPU 1740 includes local storage 1744, and this local storage also includes a plurality of addressable memory locations 1746. All of these addressable memory locations preferably are 1024 bits in size.

An additional segment of memory is associated with each LS addressable memory location. For example, memory segments 1729 and 1734 are associated with, respectively, local memory locations 1731 and 1732, and memory segment 1752 is associated with local memory location 1750. A "busy bit," as discussed above, is stored in each of these additional memory segments. Local memory location 1732 is shown with several Xs to indicate that this location contains data.

DRAM 1702 contains a plurality of addressable memory locations 1704, including memory locations 1706 and 1708. These memory locations preferably also are 1024 bits in size. An additional segment of memory also is associated with each of these memory locations. For example, additional memory segment 1760 is associated with memory location 1706, and additional memory segment 1762 is associated with memory location 1708. Status information relating to the data stored in each memory location is stored in the memory segment associated with the memory location. This status information includes, as discussed above, the F/E bit, the SPU ID and the LS address. For example, for memory location 1708, this status information includes F/E bit 1712, SPU ID 1714 and LS address 1716.

Using the status information and the busy bit, the synchronized reading and writing of data from and to the shared DRAM among the SPUs of a PU, or a group of PUs, can be achieved.

Figure 18:
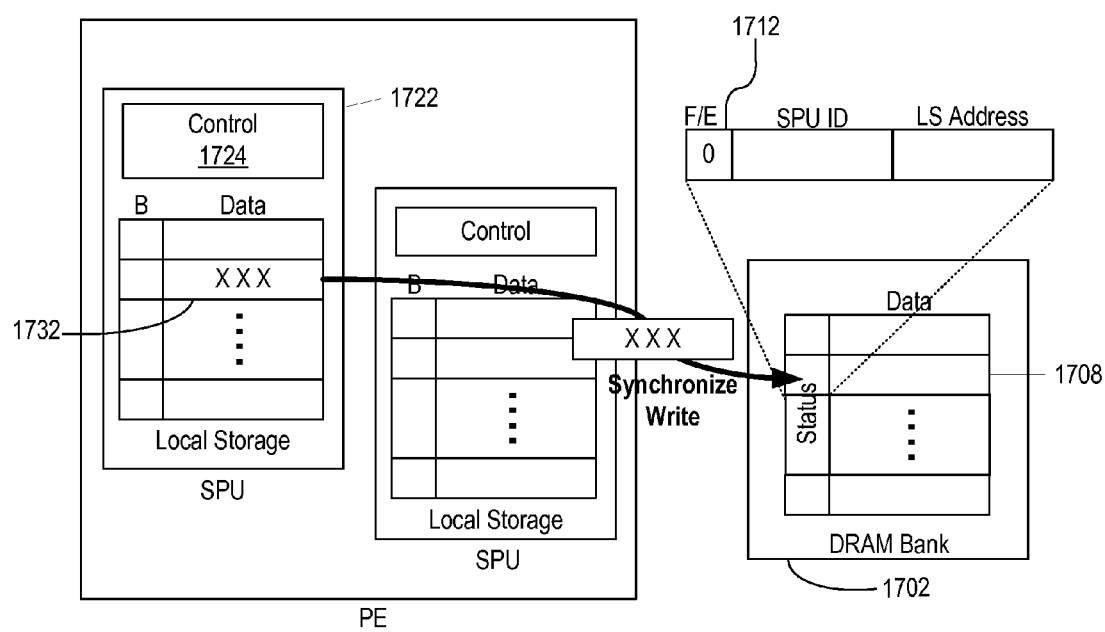

FIG. 18 illustrates the initiation of the synchronized writing of data from LS memory location 1732 of SPU 1722 to memory location 1708 of DRAM 1702. Control 1724 of SPU 1722 initiates the synchronized writing of these data. Since memory location 1708 is empty, F/E bit 1712 is set to 0. As a result, the data in LS location 1732 can be written into memory location 1708. If this bit were set to 1 to indicate that memory location 1708 is full and contains current, valid data, on the other hand, control 1722 would receive an error message and be prohibited from writing data into this memory location.

Figure 19:
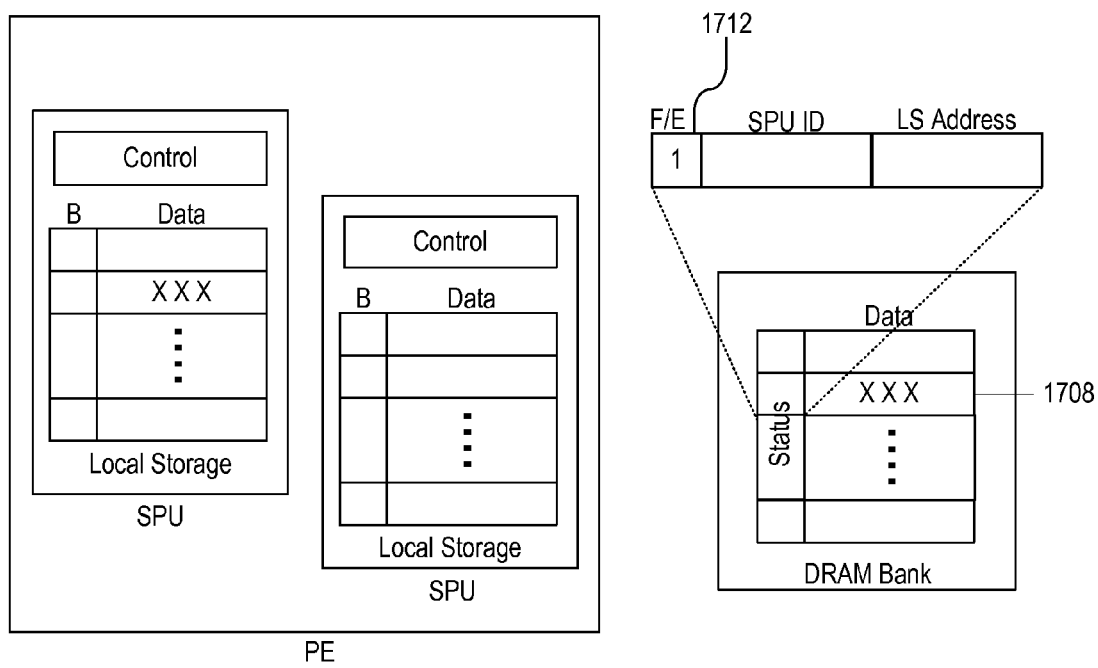

The result of the successful synchronized writing of the data into memory location 1708 is shown in FIG. 19. The written data are stored in memory location 1708, and F/E bit 1712 is set to 1. This setting indicates that memory location 1708 is full and that the data in this memory location are current and valid.

Figure 20:
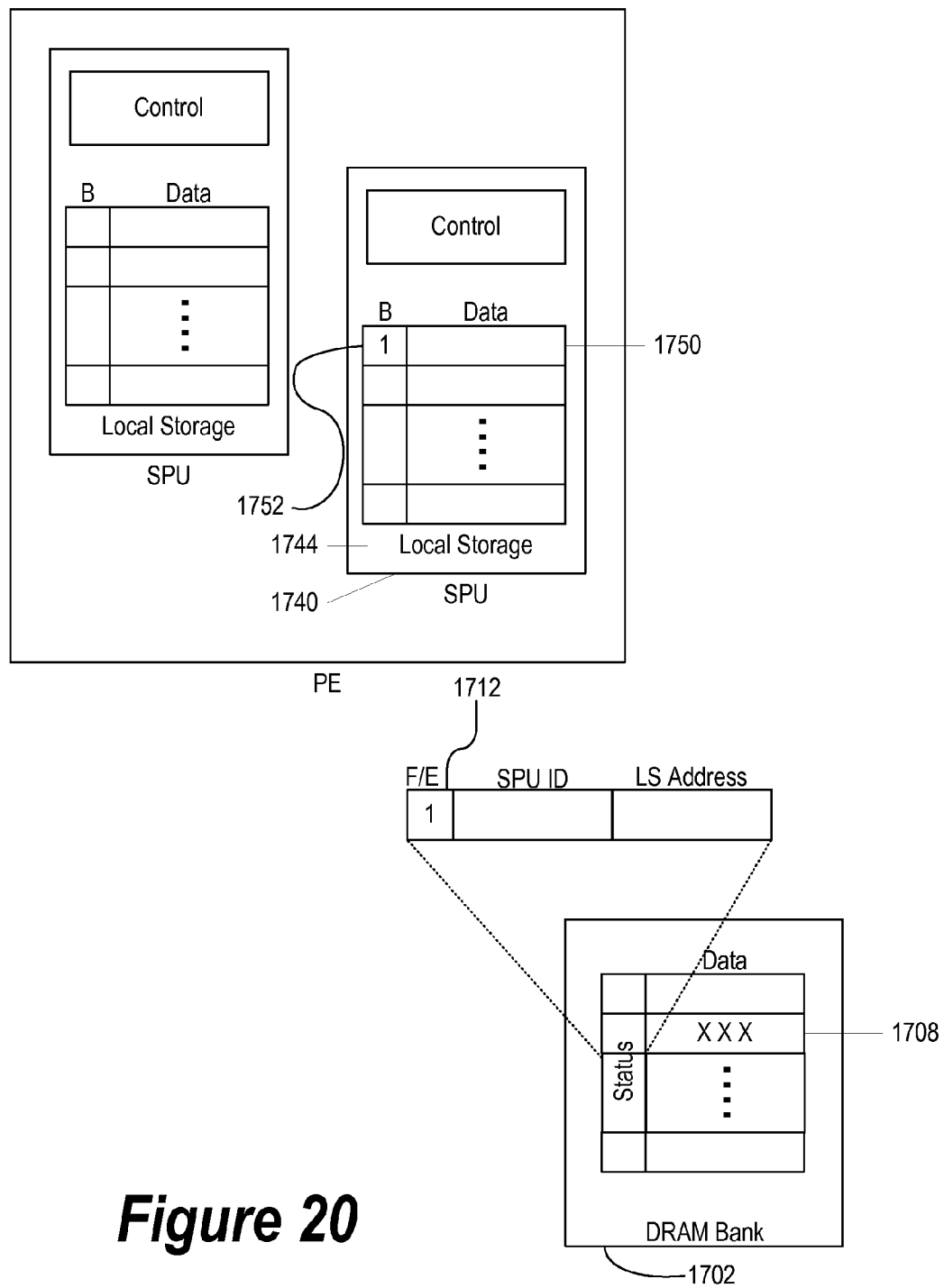

FIG. 20 illustrates the initiation of the synchronized reading of data from memory location 1708 of DRAM 1702 to LS memory location 1750 of local storage 1744. To initiate this reading, the busy bit in memory segment 1752 of LS memory location 1750 is set to 1 to reserve this memory location for these data. The setting of this busy bit to 1 prevents SPU 1740 from storing other data in this memory location.

Figure 21:
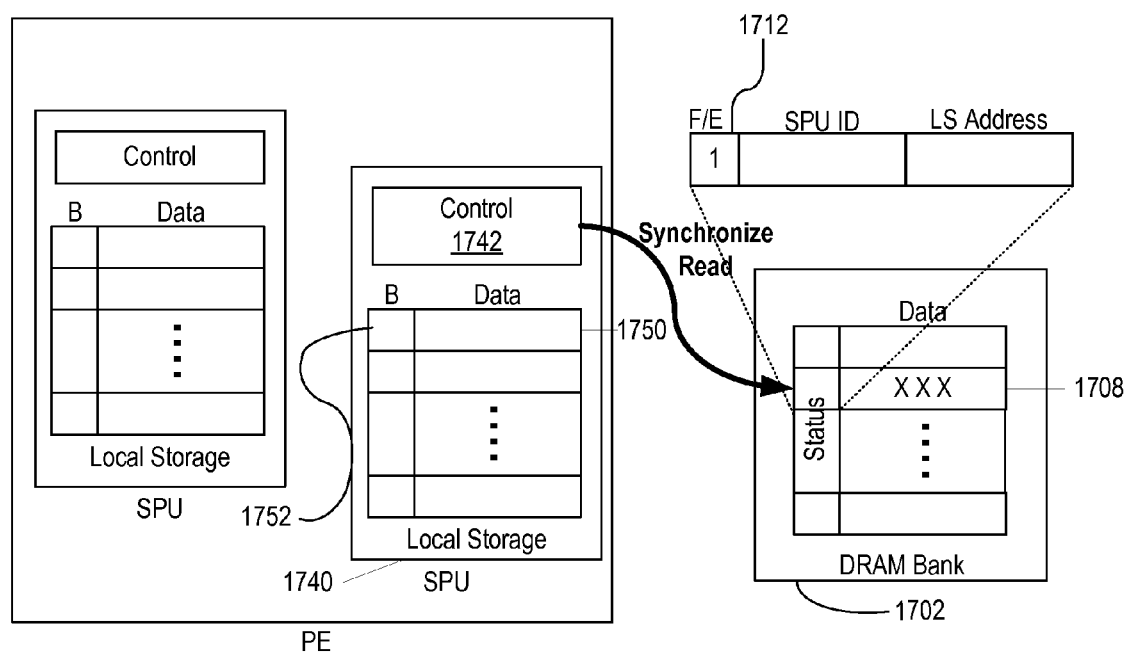
Figure 22:
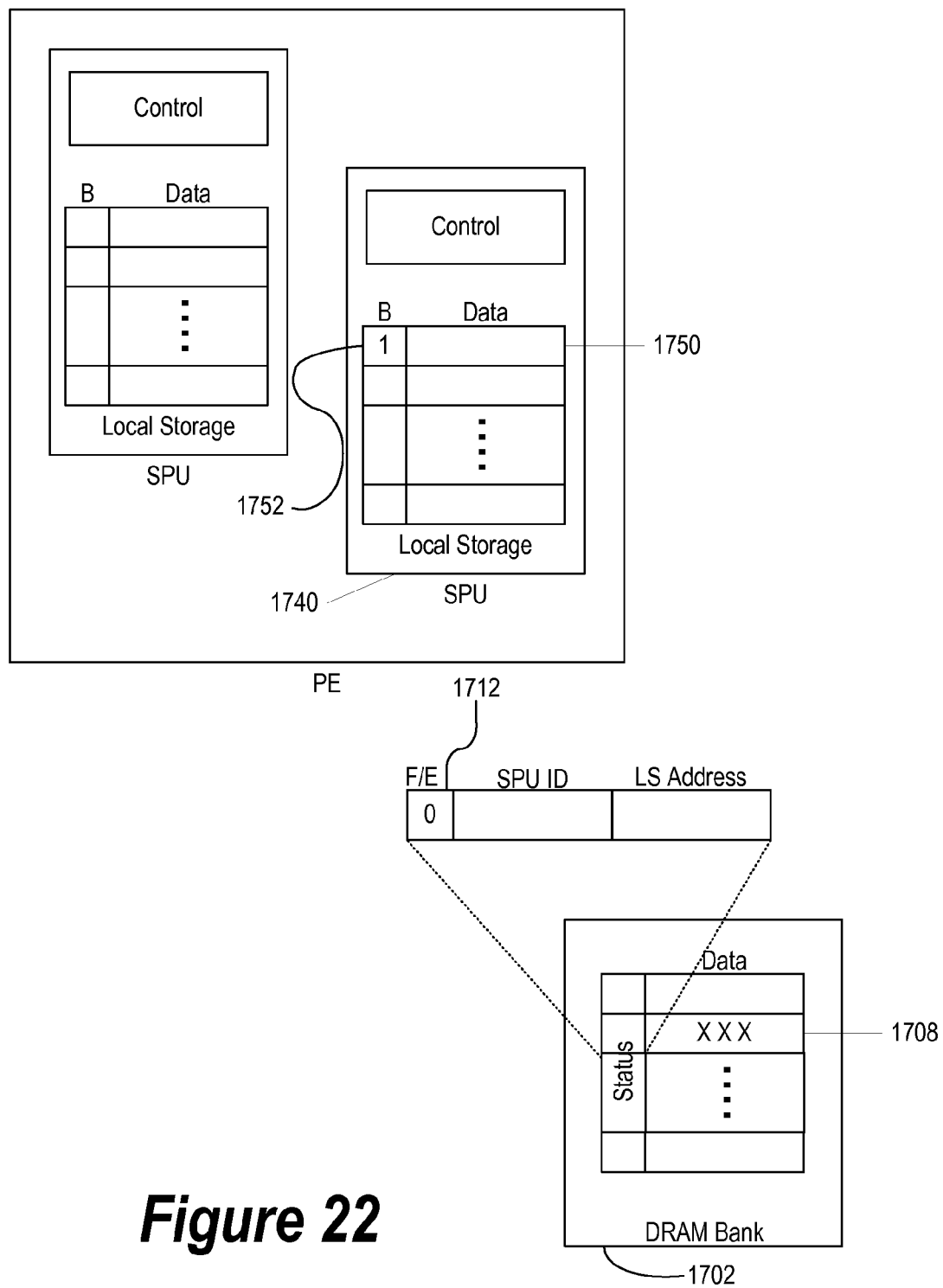

As shown in FIG. 21, control logic 1742 next issues a synchronize read command for memory location 1708 of DRAM 1702. Since F/E bit 1712 associated with this memory location is set to 1, the data stored in memory location 1708 are considered current and valid. As a result, in preparation for transferring the data from memory location 1708 to LS memory location 1750, F/E bit 1712 is set to 0. This setting is shown in FIG. 22. The setting of this bit to 0 indicates that, following the reading of these data, the data in memory location 1708 will be invalid.

Figure 23:
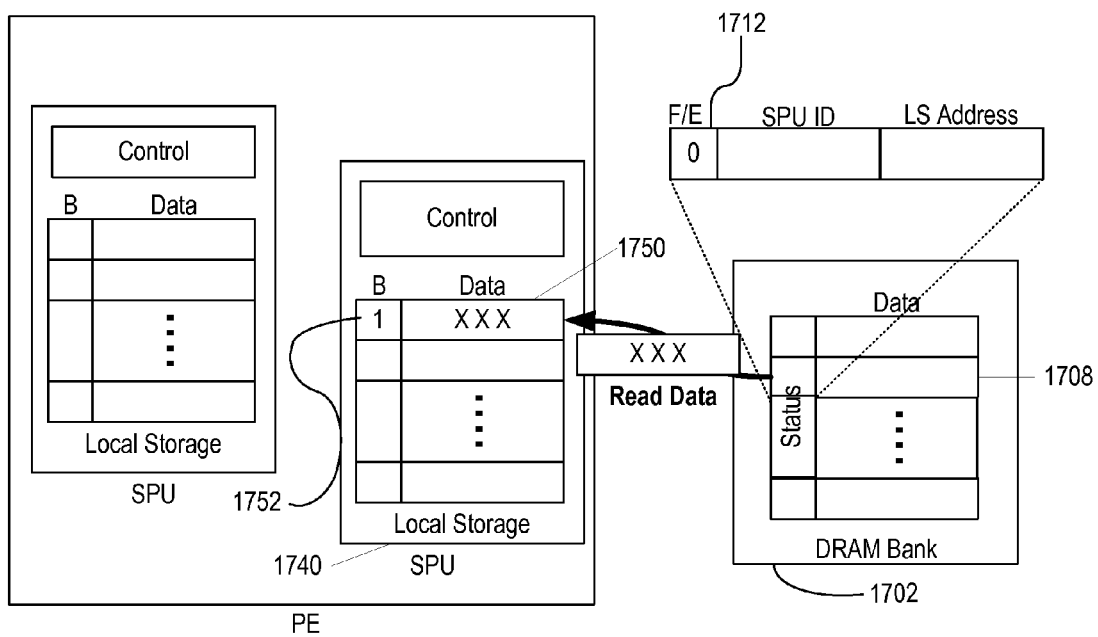
Figure 24:
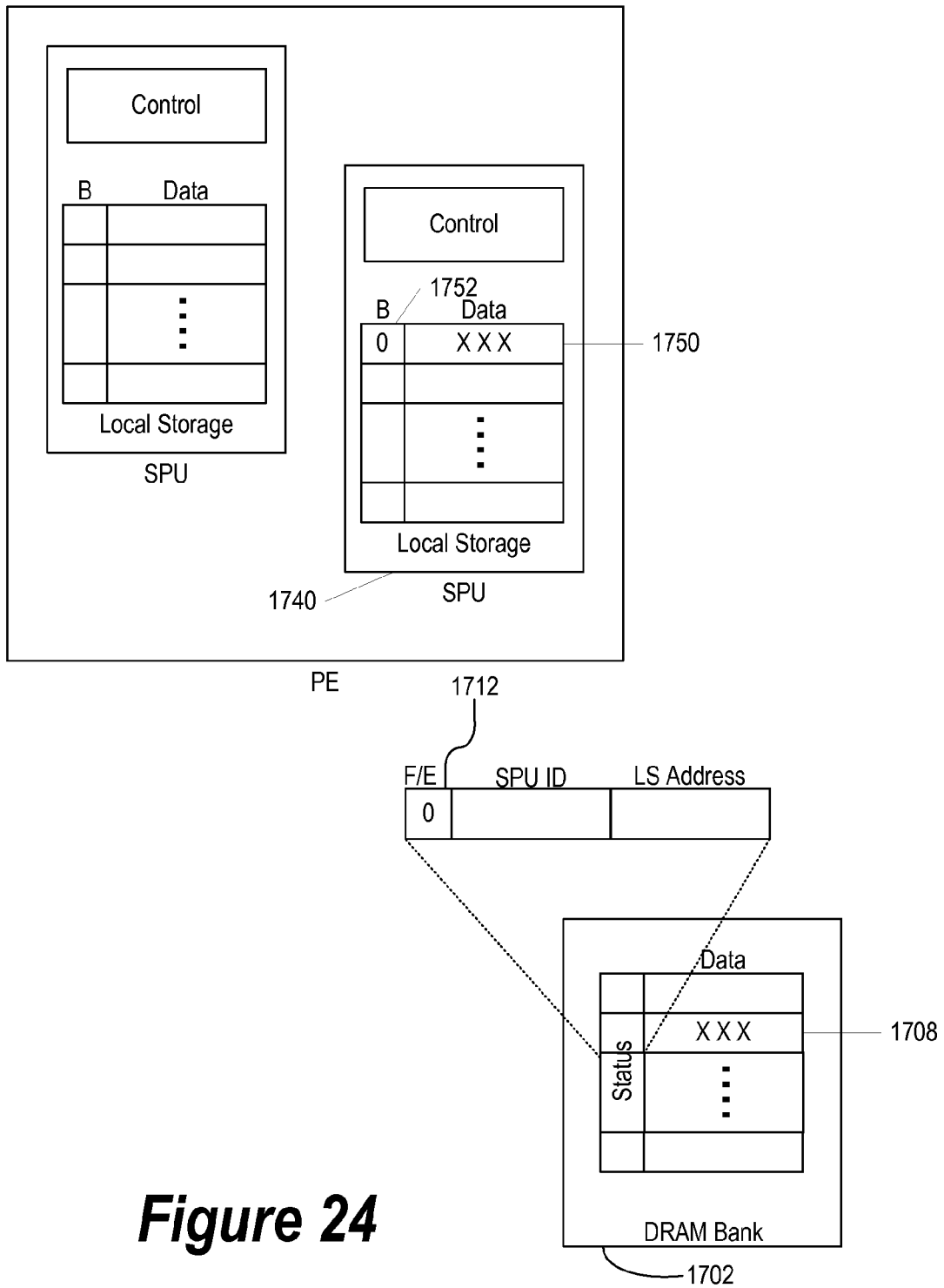

As shown in FIG. 23, the data within memory location 1708 next are read from memory location 1708 to LS memory location 1750. FIG. 24 shows the final state. A copy of the data in memory location 1708 is stored in LS memory location 1750. F/E bit 1712 is set to 0 to indicate that the data in memory location 1708 are invalid. This invalidity is the result of alterations to these data to be made by SPU 1740. The busy bit in memory segment 1752 also is set to 0. This setting indicates that LS memory location 1750 now is available to SPU 1740 for any purpose, i.e., this LS memory location no longer is in a reserved state waiting for the receipt of specific data. LS memory location 1750, therefore, now can be accessed by SPU 1740 for any purpose.

Figure 25:
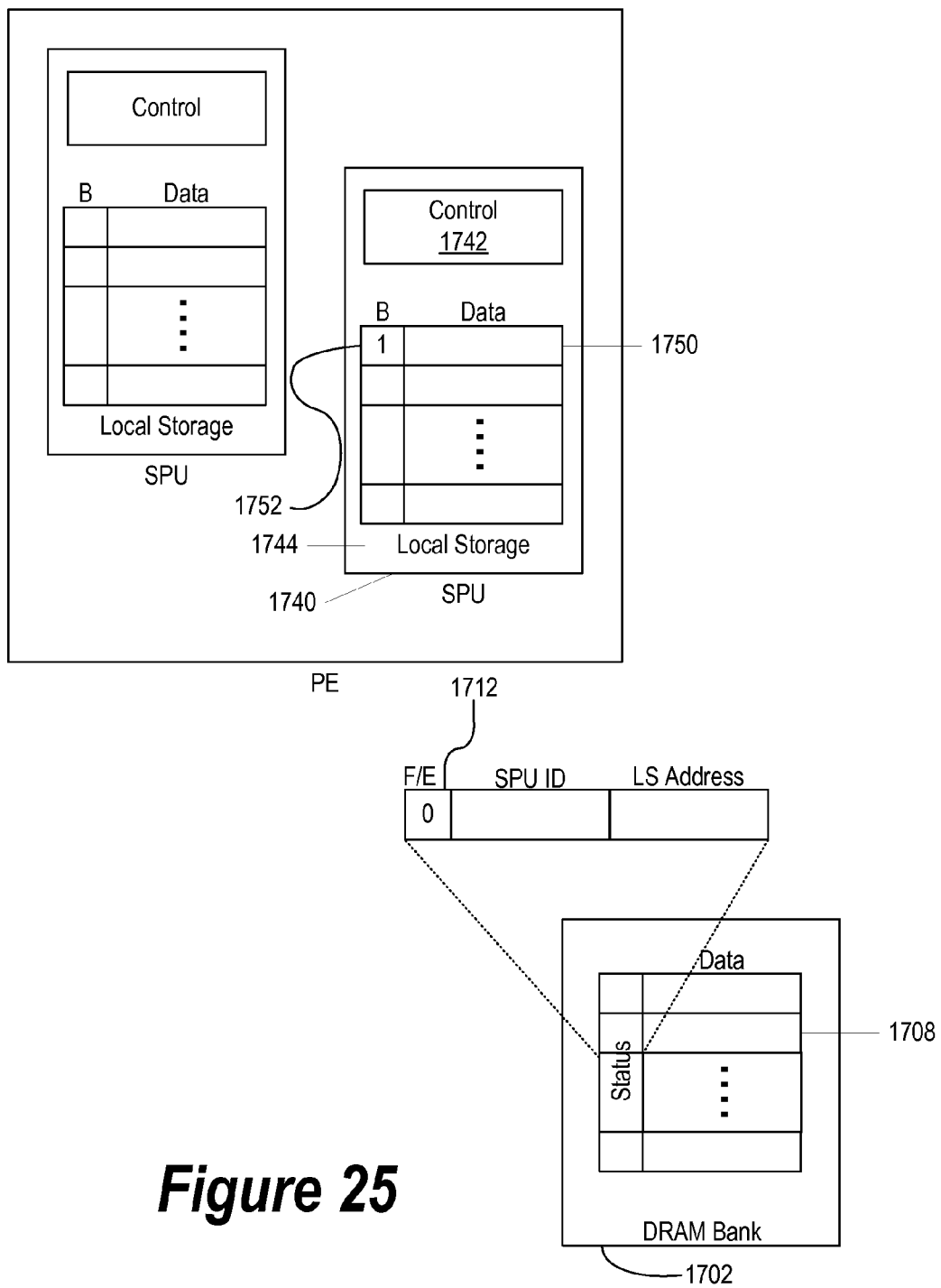
Figure 26:
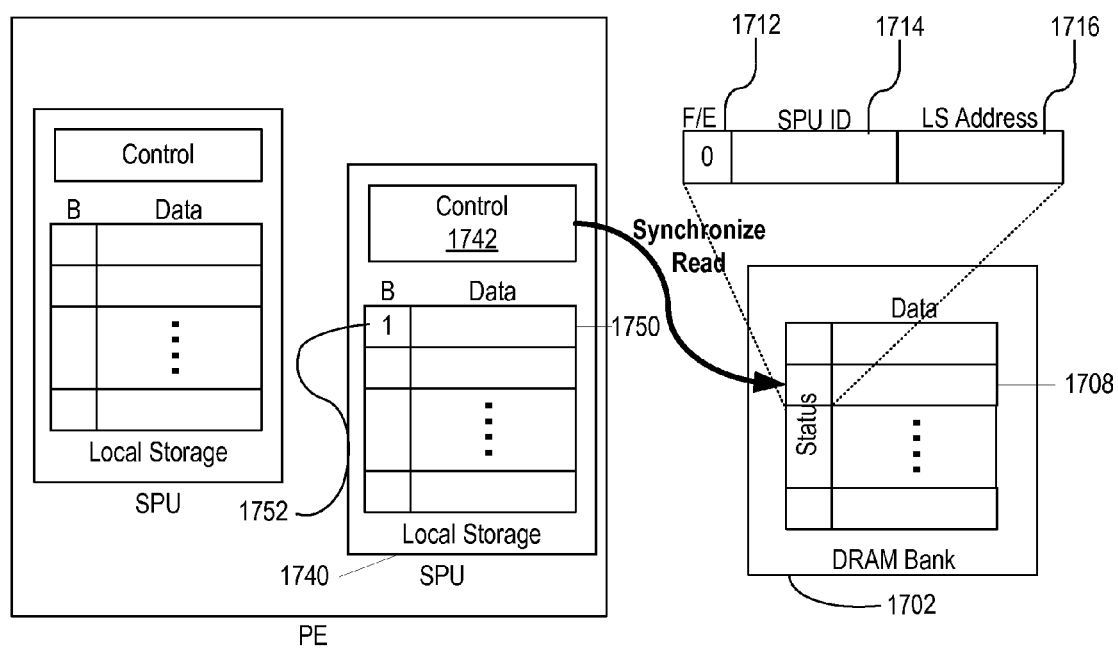

FIGS. 25-31 illustrate the synchronized reading of data from a memory location of DRAM 1702, e.g., memory location 1708, to an LS memory location of an SPU's local storage, e.g., LS memory location 1752 of local storage 1744, when the F/E bit for the memory location of DRAM 1702 is set to 0 to indicate that the data in this memory location are not current or valid. As shown in FIG. 25, to initiate this transfer, the busy bit in memory segment 1752 of LS memory location 1750 is set to 1 to reserve this LS memory location for this transfer of data. As shown in FIG. 26, control logic 1742 next issues a synchronize read command for memory location 1708 of DRAM 1702. Since the F/E bit associated with this memory location, F/E bit 1712, is set to 0, the data stored in memory location 1708 are invalid. As a result, a signal is transmitted to control logic 1742 to block the immediate reading of data from this memory location.

Figure 27:
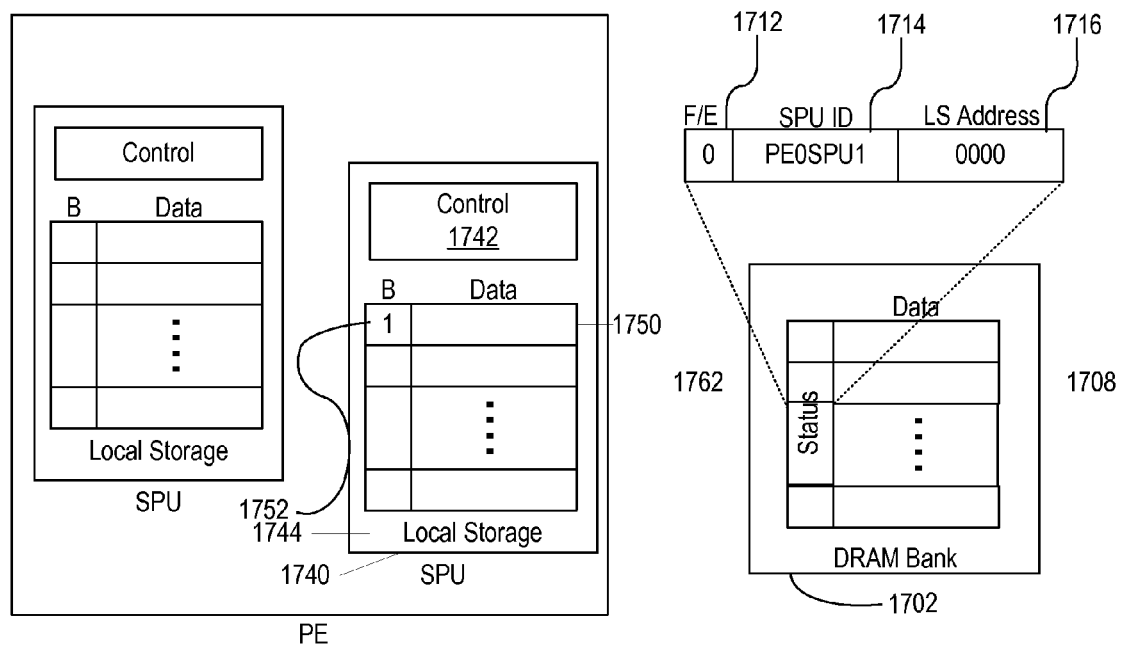

As shown in FIG. 27, the SPU ID 1714 and LS address 1716 for this read command next are written into memory segment 1762. In this case, the SPU ID for SPU 1740 and the LS memory location for LS memory location 1750 are written into memory segment 1762. When the data within memory location 1708 become current, therefore, this SPU ID and LS memory location are used for determining the location to which the current data are to be transmitted.

Figure 28:
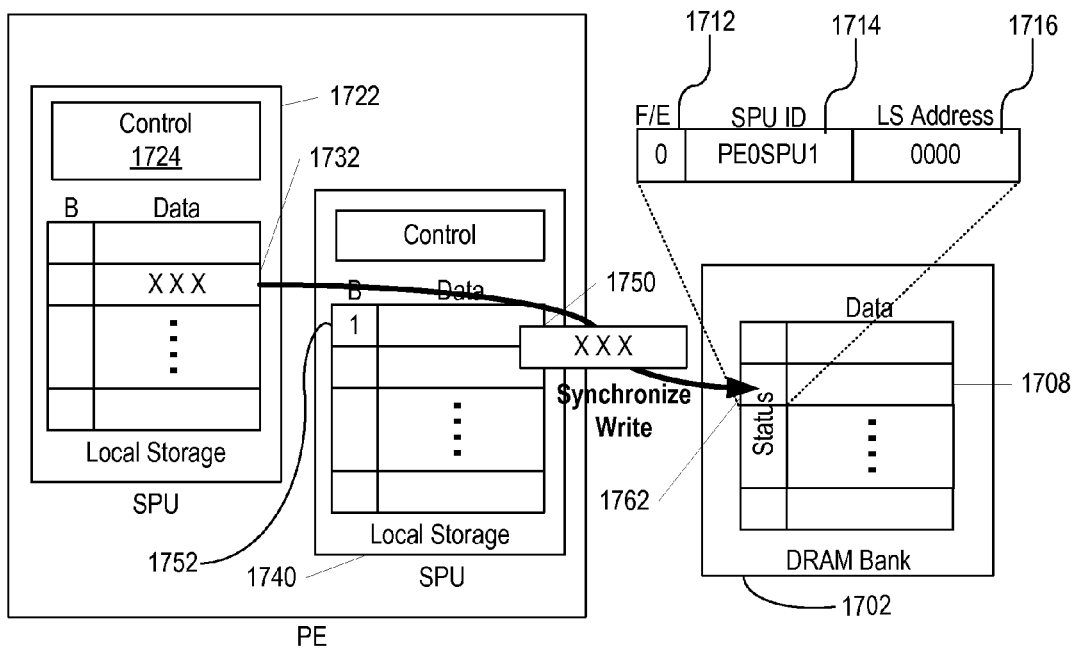

The data in memory location 1708 become valid and current when an SPU writes data into this memory location. The synchronized writing of data into memory location 1708 from, e.g., memory location 1732 of SPU 1722, is illustrated in FIG. 28. This synchronized writing of these data is permitted because F/E bit 1712 for this memory location is set to 0.

Figure 29:
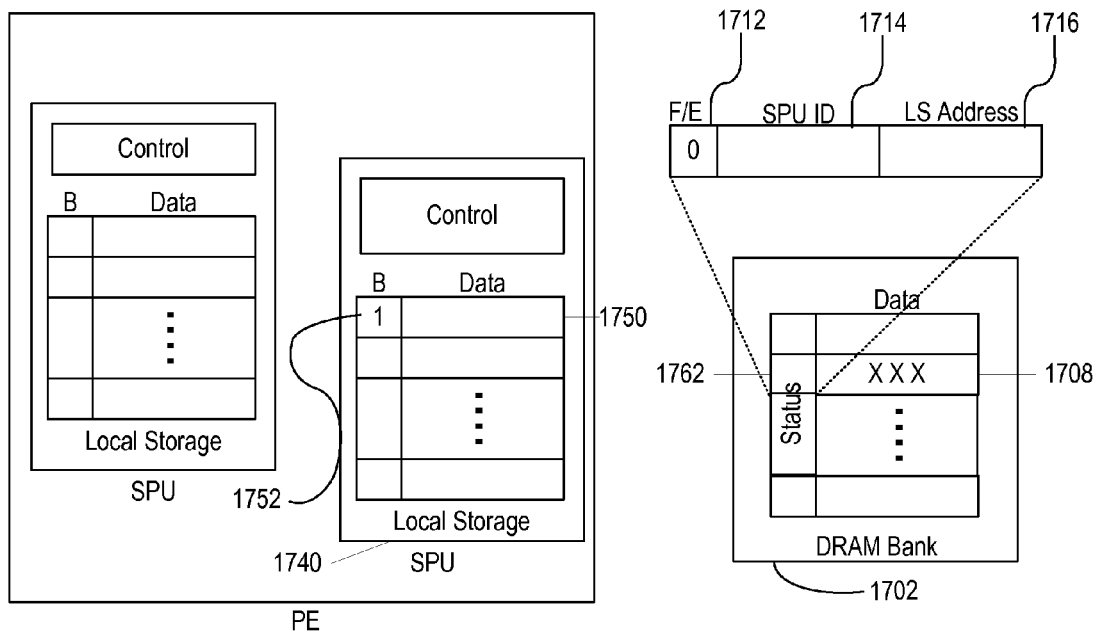
Figure 30:
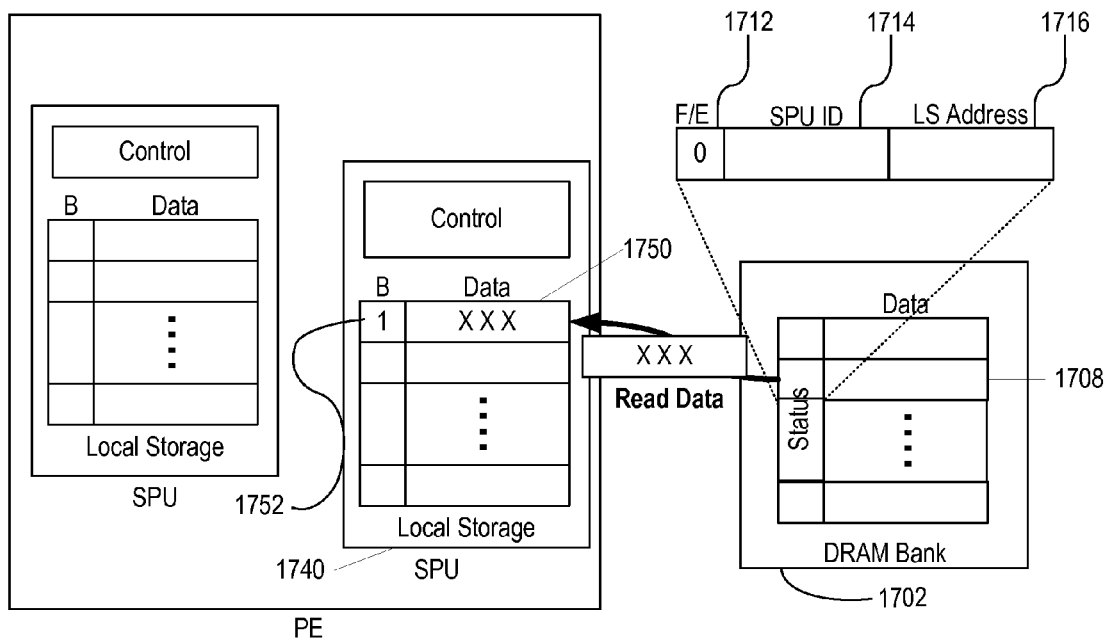
Figure 31:
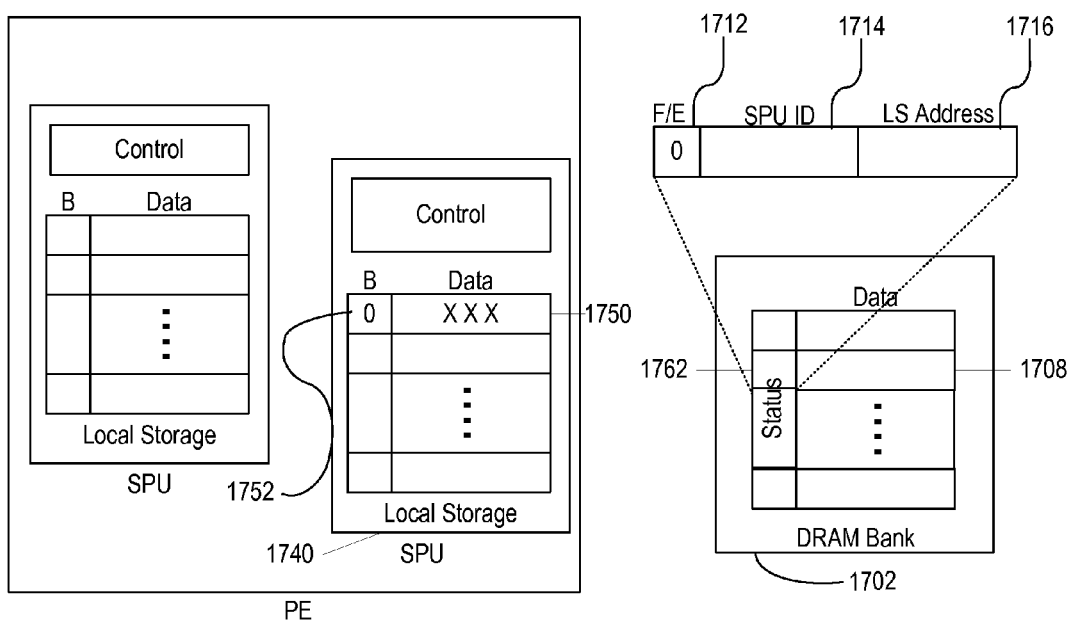

As shown in FIG. 29, following this writing, the data in memory location 1708 become current and valid. SPU ID 1714 and LS address 1716 from memory segment 1762, therefore, immediately are read from memory segment 1762, and this information then is deleted from this segment. F/E bit 1712 also is set to 0 in anticipation of the immediate reading of the data in memory location 1708. As shown in FIG. 30, upon reading SPU ID 1714 and LS address 1716, this information immediately is used for reading the valid data in memory location 1708 to LS memory location 1750 of SPU 1740. The final state is shown in FIG. 31. This figure shows the valid data from memory location 1708 copied to memory location 1750, the busy bit in memory segment 1752 set to 0 and F/E bit 1712 in memory segment 1762 set to 0. The setting of this busy bit to 0 enables LS memory location 1750 now to be accessed by SPU 1740 for any purpose. The setting of this F/E bit to 0 indicates that the data in memory location 1708 no longer are current and valid.

Figure 32:
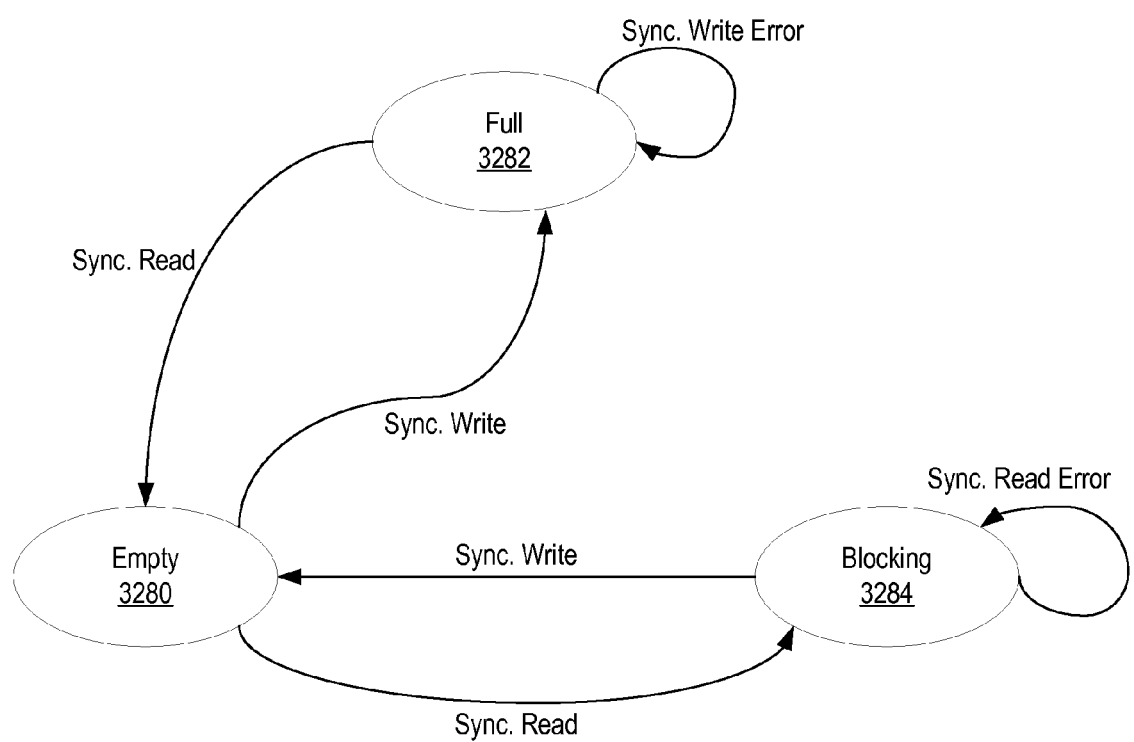
FIG. 32 is a three-state memory diagram illustrating the various states of a memory location in accordance with the data synchronization scheme of the-present invention.

FIG. 32 summarizes the operations described above and the various states of a memory location of the DRAM based upon the states of the F/E bit, the SPU ID and the LS address stored in the memory segment corresponding to the memory location. The memory location can have three states. These three states are an empty state 3280 in which the F/E bit is set to 0 and no information is provided for the SPU ID or the LS address, a full state 3282 in which the F/E bit is set to 1 and no information is provided for the SPU ID or LS address and a blocking state 3284 in which the F/E bit is set to 0 and information is provided for the SPU ID and LS address.

As shown in this figure, in empty state 3280, a synchronized writing operation is permitted and results in a transition to full state 3282. A synchronized reading operation, however, results in a transition to the blocking state 3284 because the data in the memory location, when the memory location is in the empty state, are not current.

In full state 3282, a synchronized reading operation is permitted and results in a transition to empty state 3280. On the other hand, a synchronized writing operation in full state 3282 is prohibited to prevent overwriting of valid data. If such a writing operation is attempted in this state, no state change occurs and an error message is transmitted to the SPU's corresponding control logic.

In blocking state 3284, the synchronized writing of data into the memory location is permitted and results in a transition to empty state 3280. On the other hand, a synchronized reading operation in blocking state 3284 is prohibited to prevent a conflict with the earlier synchronized reading operation which resulted in this state. If a synchronized reading operation is attempted in blocking state 3284, no state change occurs and an error message is transmitted to the SPU's corresponding control logic.

The scheme described above for the synchronized reading and writing of data from and to the shared DRAM also can be used for eliminating the computational resources normally dedicated by a processor for reading data from, and writing data to, external devices. This input/output (I/O) function could be performed by a PU. However, using a modification of this synchronization scheme, an SPU running an appropriate program can perform this function. For example, using this scheme, a PU receiving an interrupt request for the transmission of data from an I/O interface initiated by an external device can delegate the handling of this request to this SPU. The SPU then issues a synchronize write command to the I/O interface. This interface in turn signals the external device that data now can be written into the DRAM. The SPU next issues a synchronize read command to the DRAM to set the DRAM's relevant memory space into a blocking state. The SPU also sets to 1 the busy bits for the memory locations of the SPU's local storage needed to receive the data. In the blocking state, the additional memory segments associated with the DRAM's relevant memory space contain the SPU's ID and the address of the relevant memory locations of the SPU's local storage. The external device next issues a synchronize write command to write the data directly to the DRAM's relevant memory space. Since this memory space is in the blocking state, the data are immediately read out of this space into the memory locations of the SPU's local storage identified in the additional memory segments. The busy bits for these memory locations then are set to 0. When the external device completes writing of the data, the SPU issues a signal to the PU that the transmission is complete.

Using this scheme, therefore, data transfers from external devices can be processed with minimal computational load on the PU. The SPU delegated this function, however, should be able to issue an interrupt request to the PU, and the external device should have direct access to the DRAM.

The DRAM of each PU includes a plurality of "sandboxes." A sandbox defines an area of the shared DRAM beyond which a particular SPU, or set of SPUs, cannot read or write data. These sandboxes provide security against the corruption of data being processed by one SPU by data being processed by another SPU. These sandboxes also permit the downloading of software cells from network 104 into a particular sandbox without the possibility of the software cell corrupting data throughout the DRAM. In the present invention, the sandboxes are implemented in the hardware of the DRAMs and DMACs. By implementing these sandboxes in this hardware rather than in software, advantages in speed and security are obtained.

The PU of a PU controls the sandboxes assigned to the SPUs. Since the PU normally operates only trusted programs, such as an operating system, this scheme does not jeopardize security. In accordance with this scheme, the PU builds and maintains a key control table. This key control table is illustrated in FIG. 33. As shown in this figure, each entry in key control table 3302 contains an identification (ID) 3304 for an SPU, an SPU key 3306 for that SPU and a key mask 3308. The use of this key mask is explained below. Key control table 3302 preferably is stored in a relatively fast memory, such as a static random access memory (SRAM), and is associated with the DMAC. The entries in key control table 3302 are controlled by the PU. When an SPU requests the writing of data to, or the reading of data from, a particular storage location of the DRAM, the DMAC evaluates the SPU key 3306 assigned to that SPU in key control table 3302 against a memory access key associated with that storage location.

Figure 34:
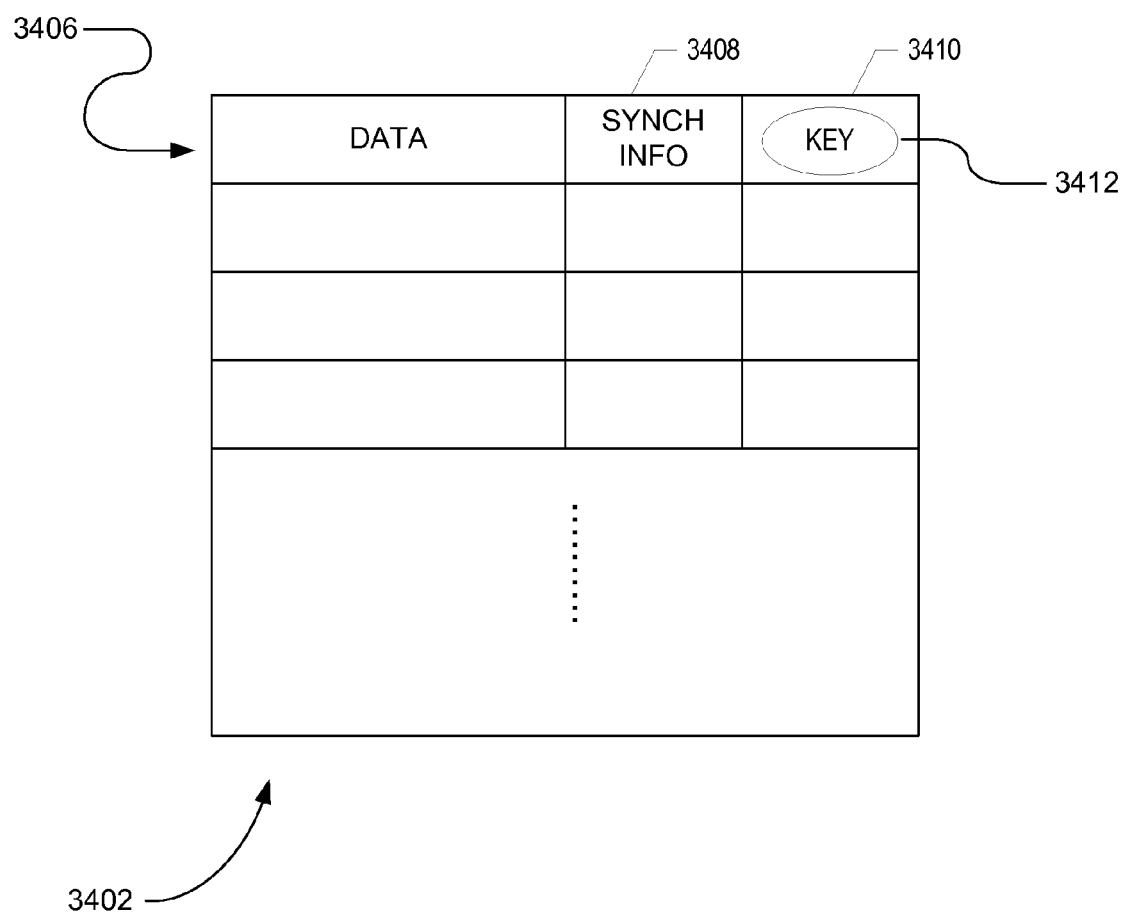
FIG. 34 illustrates a scheme for storing memory access keys for a hardware sandbox in accordance with the present invention.

As shown in FIG. 34, a dedicated memory segment 3410 is assigned to each addressable storage location 3406 of a DRAM 3402. A memory access key 3412 for the storage location is stored in this dedicated memory segment. As discussed above, a further additional dedicated memory segment 3408, also associated with each addressable storage location 3406, stores synchronization information for writing data to, and reading data from, the storage-location.

In operation, an SPU issues a DMA command to the DMAC. This command includes the address of a storage location 3406 of DRAM 3402. Before executing this command, the DMAC looks up the requesting SPU's key 3306 in key control table 3302 using the SPU's ID 3304. The DMAC then compares the SPU key 3306 of the requesting SPU to the memory access key 3412 stored in the dedicated memory segment 3410 associated with the storage location of the DRAM to which the SPU seeks access. If the two keys do not match, the DMA command is not executed. On the other hand, if the two keys match, the DMA command proceeds and the requested memory access is executed.

Figure 35:
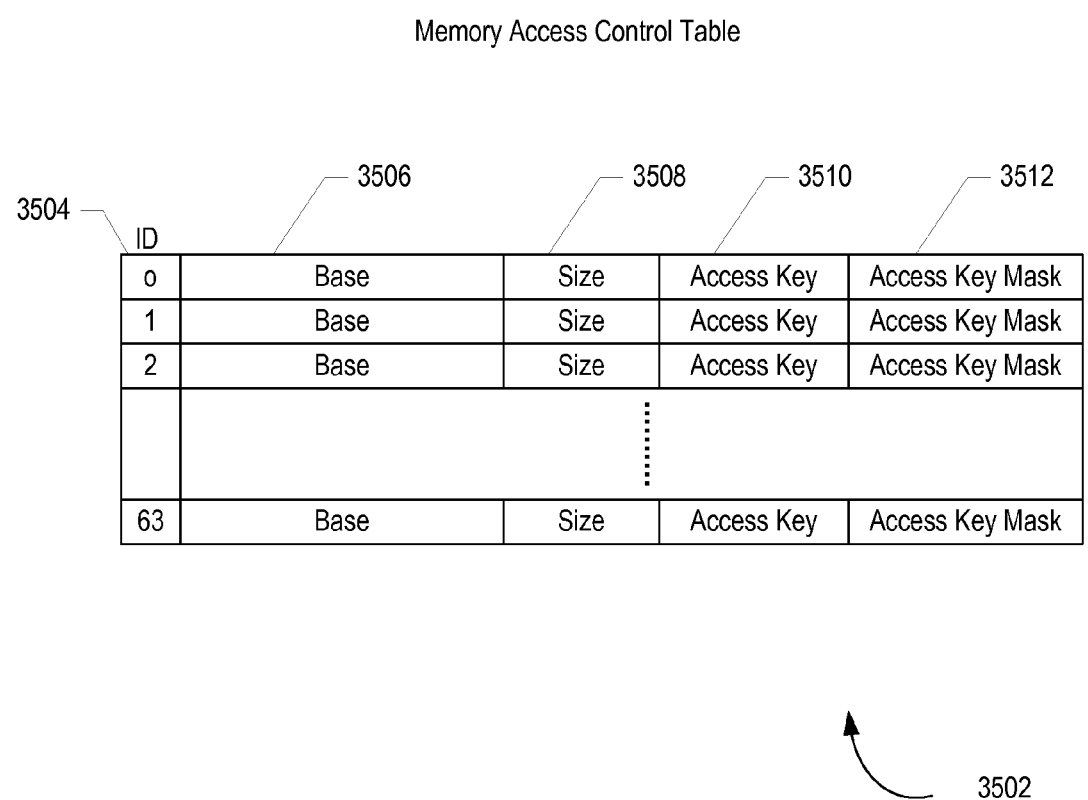
FIG. 35 illustrates the structure of a memory access control table for a hardware sandbox in accordance with the present invention.

An alternative embodiment is illustrated in FIG. 35. In this embodiment, the PU also maintains a memory access control table 3502. Memory access control table 3502 contains an entry for each sandbox within the DRAM. In the particular example of FIG. 35, the DRAM contains 64 sandboxes. Each entry in memory access control table 3502 contains an identification (ID) 3504 for a sandbox, a base memory address 3506, a sandbox size 3508, a memory access key 3510 and an access key mask 3512. Base memory address 3506 provides the address in the DRAM which starts a particular memory sandbox. Sandbox size 3508 provides the size of the sandbox and, therefore, the endpoint of the particular sandbox.

Figure 36:
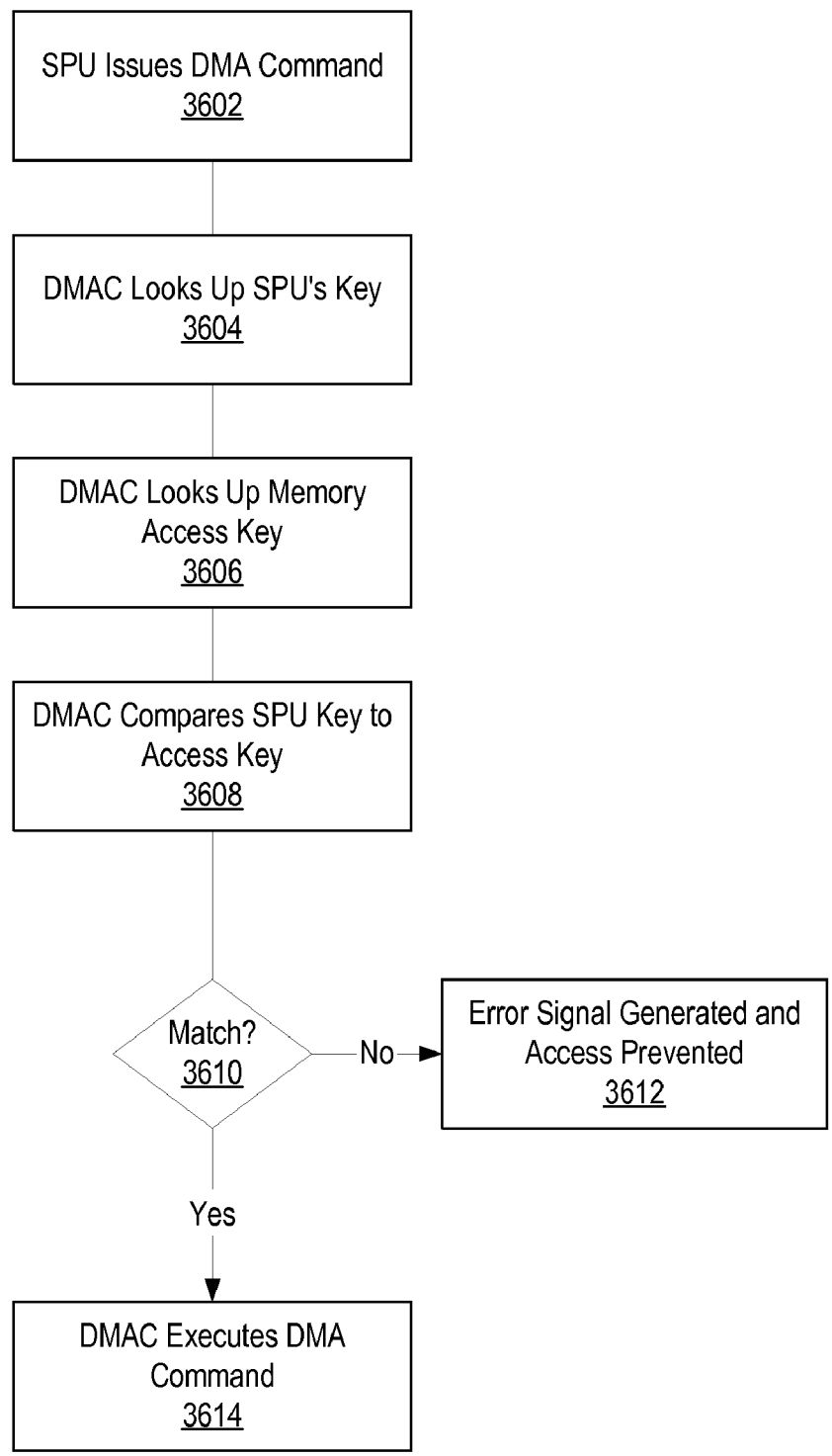
FIG. 36 is a flow diagram of the steps for accessing a memory sandbox using the key control table of FIG. 33 and the memory access control table of FIG. 35.

FIG. 36 is a flow diagram of the steps for executing a DMA command using key control table 3302 and memory access control table 3502. In step 3602, an SPU issues a DMA command to the DMAC for access to a particular memory location or locations within a sandbox. This command includes a sandbox ID 3504 identifying the particular sandbox for which access is requested. In step 3604, the DMAC looks up the requesting SPU's key 3306 in key control table 3302 using the SPU's ID 3304. In step 3606, the DMAC uses the sandbox ID 3504 in the command to look up in memory access control table 3502 the memory access key 3510 associated with that sandbox. In step 3608, the DMAC compares the SPU key 3306 assigned to the requesting SPU to the access key 3510 associated with the sandbox. In step 3610, a determination is made of whether the two keys match. If the two keys do not match, the process moves to step 3612 where the DMA command does not proceed and an error message is sent to either the requesting SPU, the PU or both. On the other hand, if at step 3610 the two keys are found to match, the process proceeds to step 3614 where the DMAC executes the DMA command.

The key masks for the SPU keys and the memory access keys provide greater flexibility to this system. A key mask for a key converts a masked bit into a wildcard. For example, if the key mask 3308 associated with an SPU key 3306 has its last two bits set to "mask," designated by, e.g., setting these bits in key mask 3308 to 1, the SPU key can be either a 1 or a 0 and still match the memory access key. For example, the SPU key might be 1010. This SPU key normally allows access only to a sandbox having an access key of 1010. If the SPU key mask for this SPU key is set to 0001, however, then this SPU key can be used to gain access to sandboxes having an access key of either 1010 or 1011. Similarly, an access key 1010 with a mask set to 0001 can be accessed by an SPU with an SPU key of either 1010 or 1011. Since both the SPU key mask and the memory key mask can be used simultaneously, numerous variations of accessibility by the SPUs to the sandboxes can be established.

The present invention also provides a new programming model for the processors of system 101. This programming model employs software cells 102. These cells can be transmitted to any processor on network 104 for processing. This new programming model also utilizes the unique modular architecture of system 101 and the processors of system 101.

Software cells are processed directly by the SPUs from the SPU's local storage. The SPUs do not directly operate on any data or programs in the DRAM. Data and programs in the DRAM are read into the SPU's local storage before the SPU processes these data and programs. The SPU's local storage, therefore, includes a program counter, stack and other software elements for executing these programs. The PU controls the SPUs by issuing direct memory access (DMA) commands to the DMAC.

Figure 37:
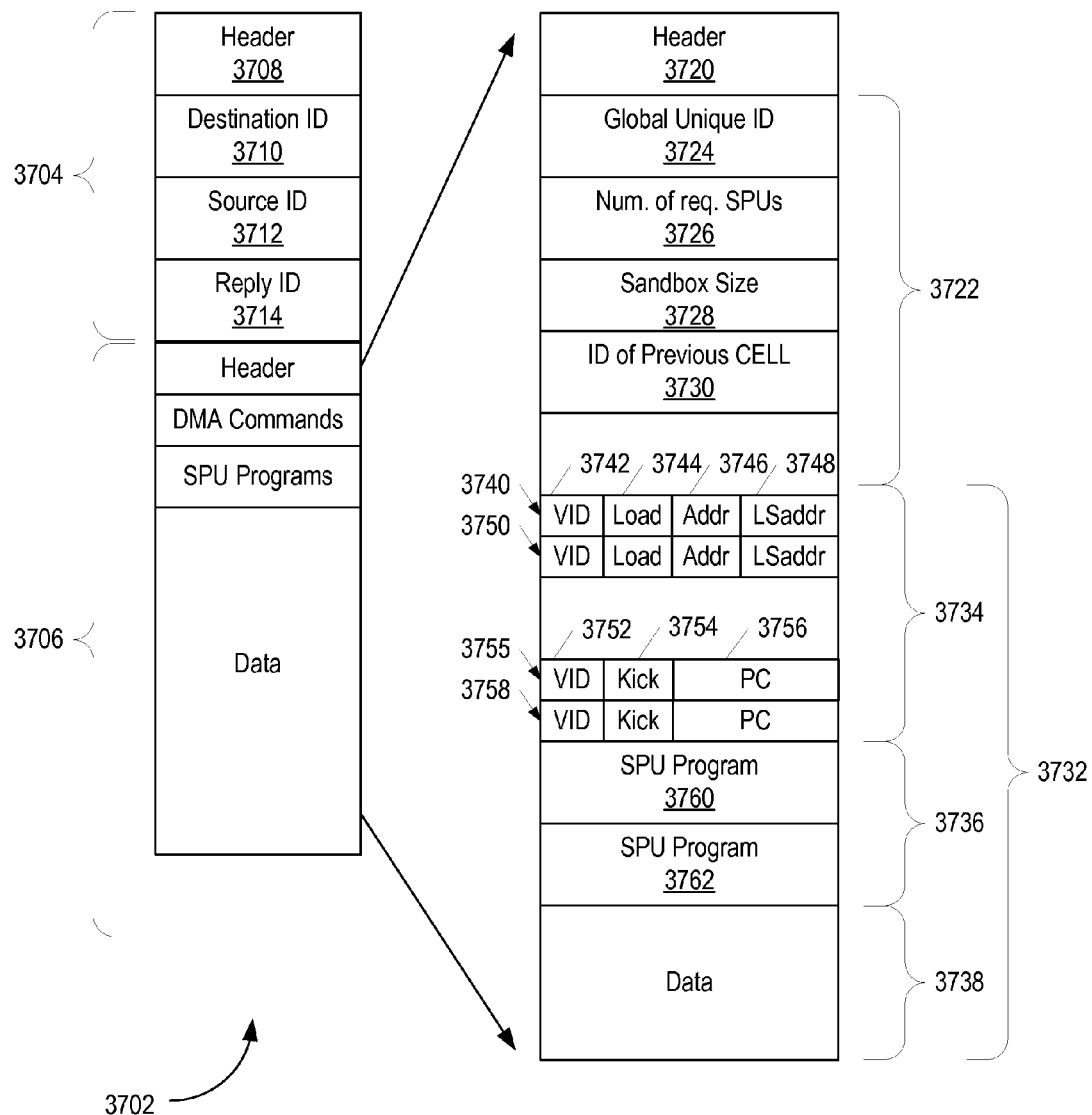
FIG. 37 illustrates the structure of a software cell in accordance with the present invention.

The structure of software cells 102 is illustrated in FIG. 37. As shown in this figure, a software cell, e.g., software cell 3702, contains routing information section 3704 and body 3706. The information contained in routing information section 3704 is dependent upon the protocol of network 104. Routing information section 3704 contains header 3708, destination ID 3710, source ID 3712 and reply ID 3714. The destination ID includes a network address. Under the TCP/IP protocol, e.g., the network address is an Internet protocol (IP) address. Destination ID 3710 further includes the identity of the PU and SPU to which the cell should be transmitted for processing. Source ID 3712 contains a network address and identifies the PU and SPU from which the cell originated to enable the destination PU and SPU to obtain additional information regarding the cell if necessary. Reply ID 3714 contains a network address and identifies the PU and SPU to which queries regarding the cell, and the result of processing of the cell, should be directed.

Cell body 3706 contains information independent of the network's protocol. The exploded portion of FIG. 37 shows the details of cell body 3706. Header 3720 of cell body 3706 identifies the start of the cell body. Cell interface 3722 contains information necessary for the cell's utilization. This information includes global unique ID 3724, required SPUs 3726, sandbox size 3728 and previous cell ID 3730.

Global unique ID 3724 uniquely identifies software cell 3702 throughout network 104. Global unique ID 3724 is generated on the basis of source ID 3712, e.g. the unique identification of a PU or SPU within source ID 3712, and the time and date of generation or transmission of software cell 3702. Required SPUs 3726 provides the minimum number of SPUs required to execute the cell. Sandbox size 3728 provides the amount of protected memory in the required SPUs' associated DRAM necessary to execute the cell. Previous cell ID 3730 provides the identity of a previous cell in a group of cells requiring sequential execution, e.g., streaming data.

Implementation section 3732 contains the cell's core information. This information includes DMA command list 3734, programs 3736 and data 3738. Programs 3736 contain the programs to be run by the SPUs (called "spulets"), e.g., SPU programs 3760 and 3762, and data 3738 contain the data to be processed with these programs. DMA command list 3734 contains a series of DMA commands needed to start the programs. These DMA commands include DMA commands 3740, 3750, 3755 and 3758. The PU issues these DMA commands to the DMAC.

DMA command 3740 includes VID 3742. VID 3742 is the virtual ID of an SPU which is mapped to a physical ID when the DMA commands are issued. DMA command 3740 also includes load command 3744 and address 3746. Load command 3744 directs the SPU to read particular information from the DRAM into local storage. Address 3746 provides the virtual address in the DRAM containing this information. The information can be, e.g., programs from programs section 3736, data from data section 3738 or other data. Finally, DMA command 3740 includes local storage address 3748. This address identifies the address in local storage where the information should be loaded. DMA commands 3750 contain similar information. Other DMA commands are also possible.

DMA command list 3734 also includes a series of kick commands, e.g., kick commands 3755 and 3758. Kick commands are commands issued by a PU to an SPU to initiate the processing of a cell. DMA kick command 3755 includes virtual SPU ID 3752, kick command 3754 and program counter 3756. Virtual SPU ID 3752 identifies the SPU to be kicked, kick command 3754 provides the relevant kick command and program counter 3756 provides the address for the program counter for executing the program. DMA kick command 3758 provides similar information for the same SPU or another SPU.

As noted, the PUs treat the SPUs as independent processors, not co-processors. To control processing by the SPUs, therefore, the PU uses commands analogous to remote procedure calls. These commands are designated "SPU Remote Procedure Calls" (SRPCs). A PU implements an SRPC by issuing a series of DMA commands to the DMAC. The DMAC loads the SPU program and its associated stack frame into the local storage of an SPU. The PU then issues an initial kick to the SPU to execute the SPU Program.

Figure 38:
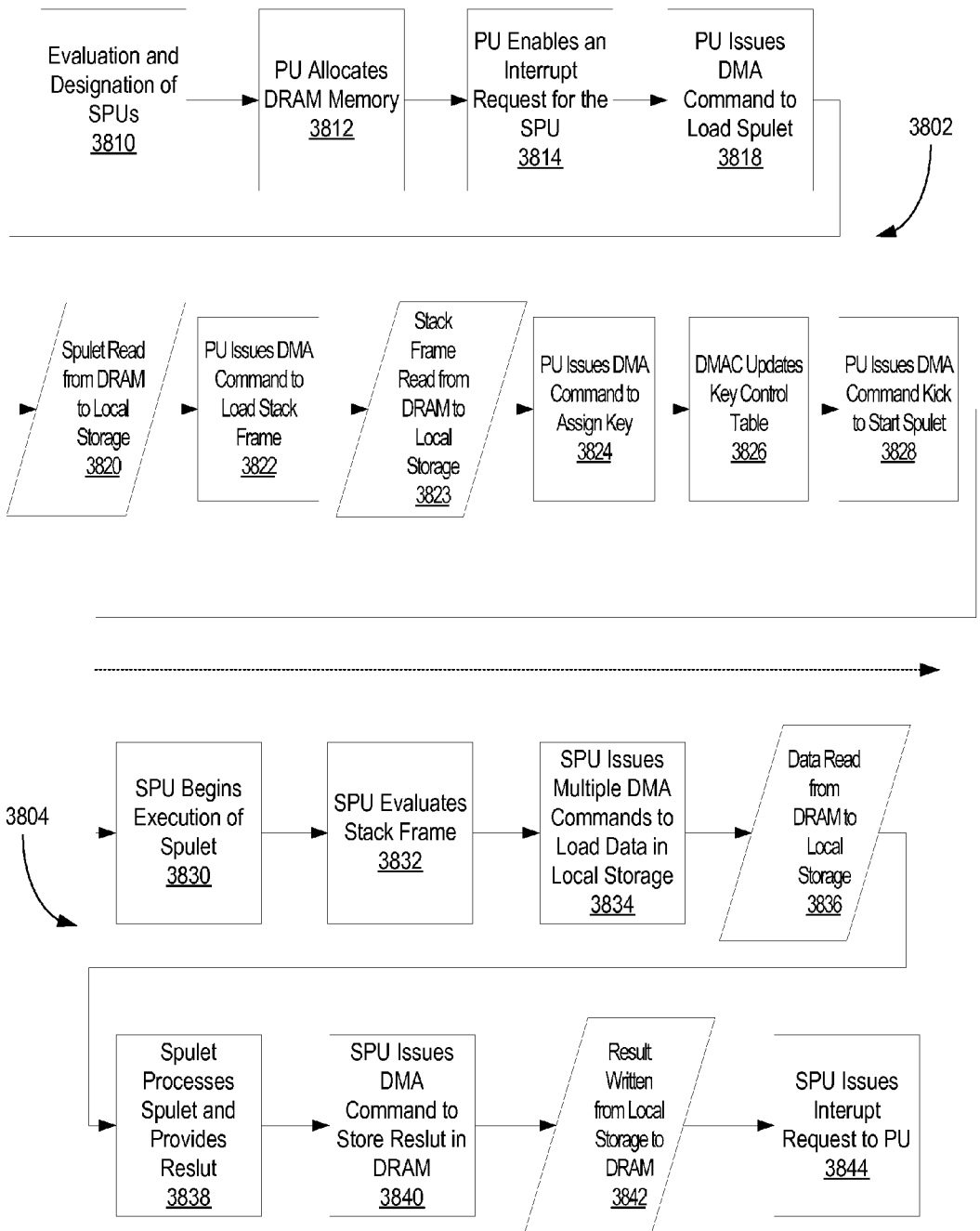
FIG. 38 is a flow diagram of the steps for issuing remote procedure calls to SPUs in accordance with the present invention.

FIG. 38 illustrates the steps of an SRPC for executing an spulet. The steps performed by the PU in initiating processing of the spulet by a designated SPU are shown in the first portion 3802 of FIG. 38, and the steps performed by the designated SPU in processing the spulet are shown in the second portion 3804 of FIG. 38.

In step 3810, the PU evaluates the spulet and then designates an SPU for processing the spulet. In step 3812, the PU allocates space in the DRAM for executing the spulet by issuing a DMA command to the DMAC to set memory access keys for the necessary sandbox or sandboxes. In step 3814, the PU enables an interrupt request for the designated SPU to signal completion of the spulet. In step 3818, the PU issues a DMA command to the DMAC to load the spulet from the DRAM to the local storage of the SPU. In step 3820, the DMA command is executed, and the spulet is read from the DRAM to the SPU's local storage. In step 3822, the PU issues a DMA command to the DMAC to load the stack frame associated with the spulet from the DRAM to the SPU's local storage. In step 3823, the DMA command is executed, and the stack frame is read from the DRAM to the SPU's local storage. In step 3824, the PU issues a DMA command for the DMAC to assign a key to the SPU to allow the SPU to read and write data from and to the hardware sandbox or sandboxes designated in step 3812. In step 3826, the DMAC updates the key control table (KTAB) with the key assigned to the SPU. In step 3828, the PU issues a DMA command "kick" to the SPU to start processing of the program. Other DMA commands may be issued by the PU in the execution of a particular SRPC depending upon the particular spulet.

As indicated above, second portion 3804 of FIG. 38 illustrates the steps performed by the SPU in executing the spulet. In step 3830, the SPU begins to execute the spulet in response to the kick command issued at step 3828. In step 3832, the SPU, at the direction of the spulet, evaluates the spulet's associated stack frame. In step 3834, the SPU issues multiple DMA commands to the DMAC to load data designated as needed by the stack frame from the DRAM to the SPU's local storage. In step 3836, these DMA commands are executed, and the data are read from the DRAM to the SPU's local storage. In step 3838, the SPU executes the spulet and generates a result. In step 3840, the SPU issues a DMA command to the DMAC to store the result in the DRAM. In step 3842, the DMA command is executed and the result of the spulet is written from the SPU's local storage to the DRAM. In step 3844, the SPU issues an interrupt request to the PU to signal that the SRPC has been completed.

The ability of SPUs to perform tasks independently under the direction of a PU enables a PU to dedicate a group of SPUs, and the memory resources associated with a group of SPUs, to performing extended tasks. For example, a PU can dedicate one or more SPUs, and a group of memory sandboxes associated with these one or more SPUs, to receiving data transmitted over network 104 over an extended period and to directing the data received during this period to one or more other SPUs and their associated memory sandboxes for further processing. This ability is particularly advantageous to processing streaming data transmitted over network 104, e.g., streaming MPEG or streaming ATRAC audio or video data. A PU can dedicate one or more SPUs and their associated memory sandboxes to receiving these data and one or more other SPUs and their associated memory sandboxes to decompressing and further processing these data. In other words, the PU can establish a dedicated pipeline relationship among a group of SPUs and their associated memory sandboxes for processing such data.

In order for such processing to be performed efficiently, however, the pipeline's dedicated SPUs and memory sandboxes should remain dedicated to the pipeline during periods in which processing of spulets comprising the data stream does not occur. In other words, the dedicated SPUs and their associated sandboxes should be placed in a reserved state during these periods. The reservation of an SPU and its associated memory sandbox or sandboxes upon completion of processing of an spulet is called a "resident termination." A resident termination occurs in response to an instruction from a PU.

Figure 39:
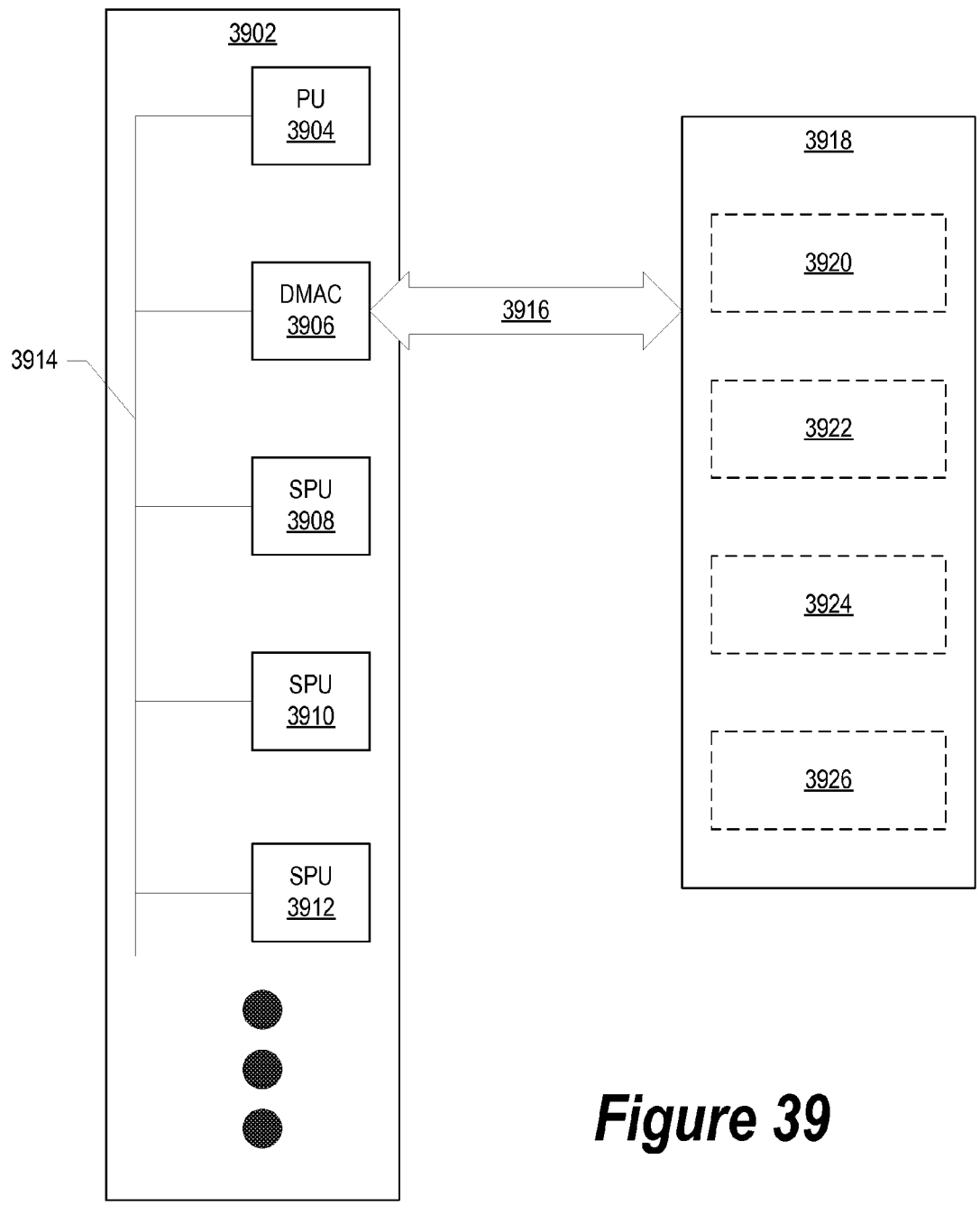
FIG. 39 illustrates the structure of a dedicated pipeline for processing streaming data in accordance with the present invention.
Figure 40A:
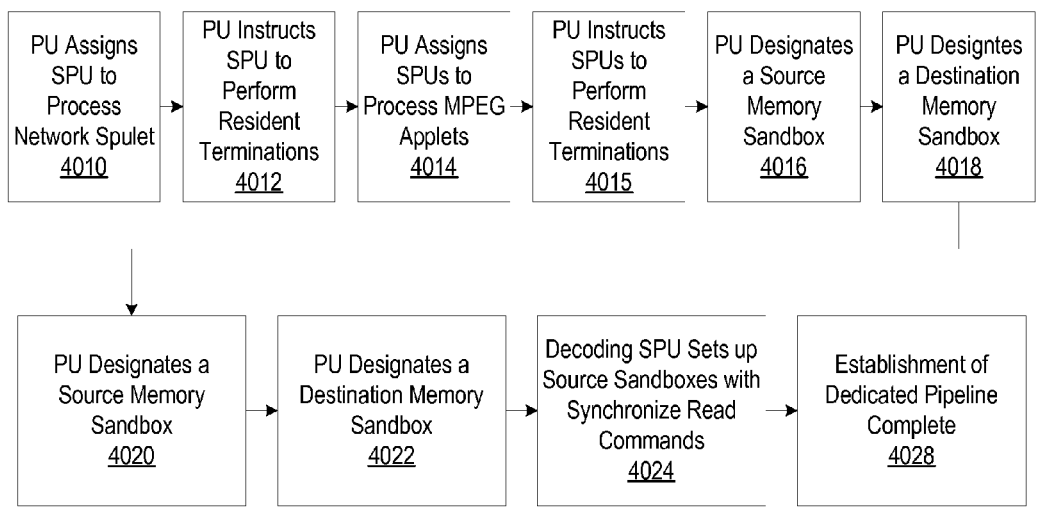
FIG. 40 is a flow diagram of the steps performed by the dedicated pipeline of FIG. 39 in the processing of streaming data in accordance with the present invention.
Figure 40B:
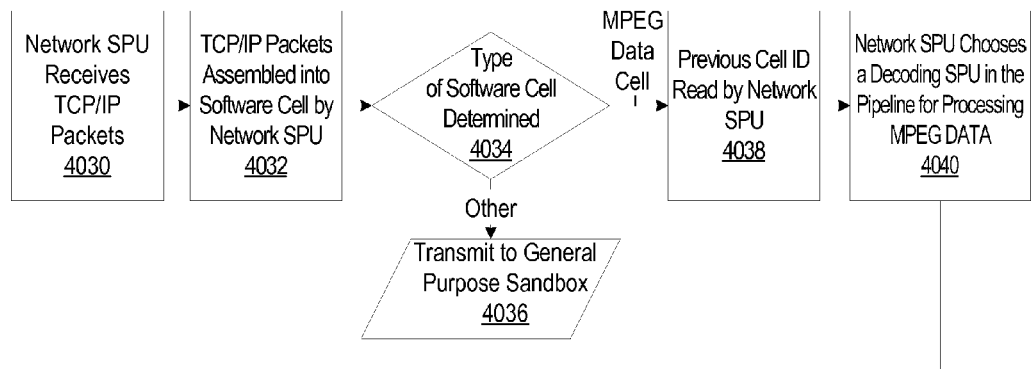
Figure 40B:
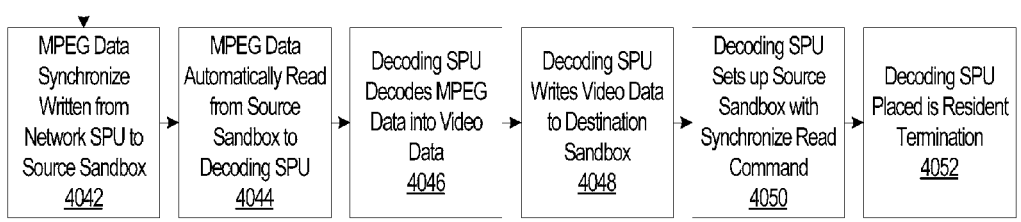

FIGS. 39, 40A and 40B illustrate the establishment of a dedicated pipeline structure comprising a group of SPUs and their associated sandboxes for the processing of streaming data, e.g., streaming MPEG data. As shown in FIG. 39, the components of this pipeline structure include PE 3902 and DRAM 3918. PE 3902 includes PU 3904, DMAC 3906 and a plurality of SPUs, including SPU 3908, SPU 3910 and SPU 3912. Communications among PU 3904, DMAC 3906 and these SPUs occur through PE bus 3914. Wide bandwidth bus 3916 connects DMAC 3906 to DRAM 3918. DRAM 3918 includes a plurality of sandboxes, e.g., sandbox 3920, sandbox 3922, sandbox 3924 and sandbox 3926.

FIG. 40A illustrates the steps for establishing the dedicated pipeline. In step 4010, PU 3904 assigns SPU 3908 to process a network spulet. A network spulet comprises a program for processing the network protocol of network 104. In this case, this protocol is the Transmission Control Protocol/Internet Protocol (TCP/IP). TCP/IP data packets conforming to this protocol are transmitted over network 104. Upon receipt, SPU 3908 processes these packets and assembles the data in the packets into software cells 102. In step 4012, PU 3904 instructs SPU 3908 to perform resident terminations upon the completion of the processing of the network spulet. In step 4014, PU 3904 assigns PUs 3910 and 3912 to process MPEG spulets. In step 4015, PU 3904 instructs SPUs 3910 and 3912 also to perform resident terminations upon the completion of the processing of the MPEG spulets. In step 4016, PU 3904 designates sandbox 3920 as a source sandbox for access by SPU 3908 and SPU 3910. In step 4018, PU 3904 designates sandbox 3922 as a destination sandbox for access by SPU 3910. In step 4020, PU 3904 designates sandbox 3924 as a source sandbox for access by SPU 3908 and SPU 3912. In step 4022, PU 3904 designates sandbox 3926 as a destination sandbox for access by SPU 3912. In step 4024, SPU 3910 and SPU 3912 send synchronize read commands to blocks of memory within, respectively, source sandbox 3920 and source sandbox 3924 to set these blocks of memory into the blocking state. The process finally moves to step 4028 where establishment of the dedicated pipeline is complete and the resources dedicated to the pipeline are reserved. SPUs 3908, 3910 and 3912 and their associated sandboxes 3920, 3922, 3924 and 3926, therefore, enter the reserved state.

FIG. 40B illustrates the steps for processing streaming MPEG data by this dedicated pipeline. In step 4030, SPU 3908, which processes the network spulet, receives in its local storage TCP/IP data packets from network 104. In step 4032, SPU 3908 processes these TCP/IP data packets and assembles the data within these packets into software cells 102. In step 4034, SPU 3908 examines header 3720 (FIG. 37) of the software cells to determine whether the cells contain MPEG data. If a cell does not contain MPEG data, then, in step 4036, SPU 3908 transmits the cell to a general purpose sandbox designated within DRAM 3918 for processing other data by other SPUs not included within the dedicated pipeline. SPU 3908 also notifies PU 3904 of this transmission.

On the other hand, if a software cell contains MPEG data, then, in step 4038, SPU 3908 examines previous cell ID 3730 (FIG. 37) of the cell to identify the MPEG data stream to which the cell belongs. In step 4040, SPU 3908 chooses an SPU of the dedicated pipeline for processing of the cell. In this case, SPU 3908 chooses SPU 3910 to process these data. This choice is based upon previous cell ID 3730 and load balancing factors. For example, if previous cell ID 3730 indicates that the previous software cell of the MPEG data stream to which the software cell belongs was sent to SPU 3910 for processing, then the present software cell normally also will be sent to SPU 3910 for processing. In step 4042, SPU 3908 issues a synchronize write command to write the MPEG data to sandbox 3920. Since this sandbox previously was set to the blocking state, the MPEG data, in step 4044, automatically is read from sandbox 3920 to the local storage of SPU 3910. In step 4046, SPU 3910 processes the MPEG data in its local storage to generate video data. In step 4048, SPU 3910 writes the video data to sandbox 3922. In step 4050, SPU 3910 issues a synchronize read command to sandbox 3920 to prepare this sandbox to receive additional MPEG data. In step 4052, SPU 3910 processes a resident termination. This processing causes this SPU to enter the reserved state during which the SPU waits to process additional MPEG data in the MPEG data stream.

Figure 41:
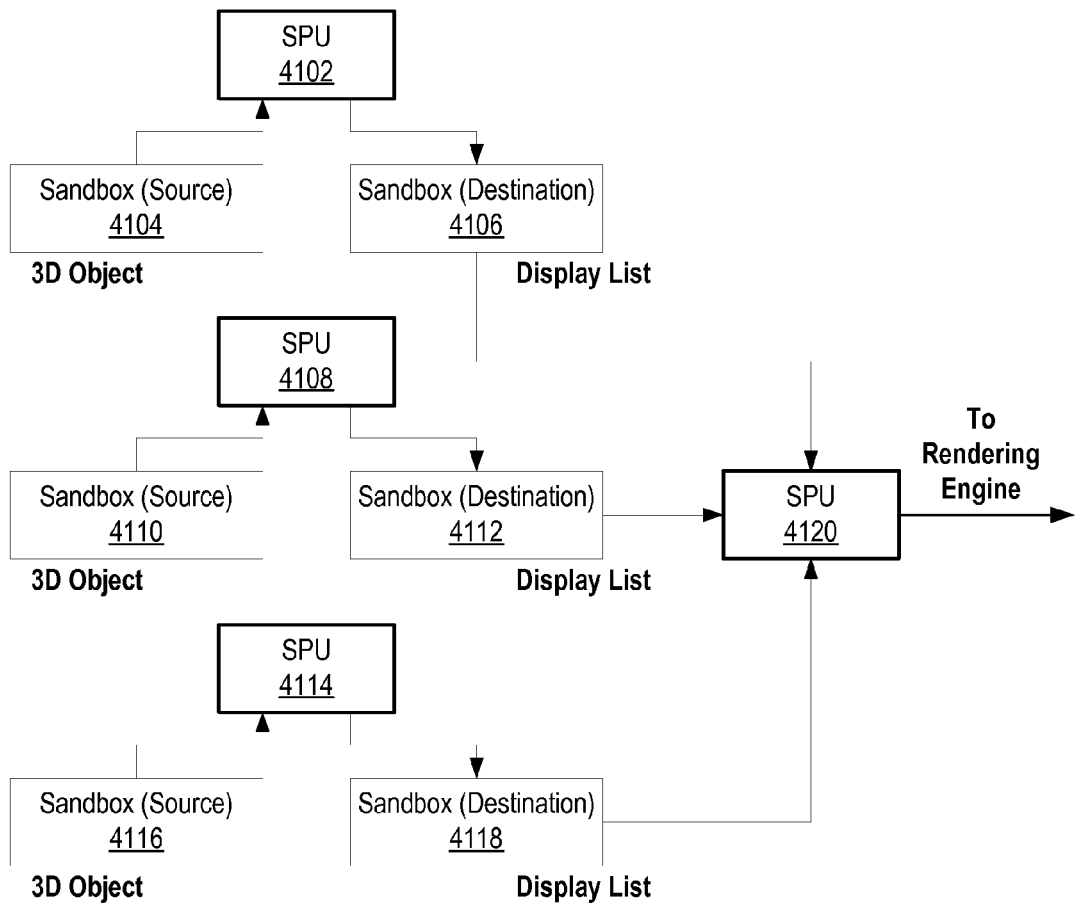
FIG. 41 illustrates an alternative structure for a dedicated pipeline for the processing of streaming data in accordance with the present invention.

Other dedicated structures can be established among a group of SPUs and their associated sandboxes for processing other types of data. For example, as shown in FIG. 41, a dedicated group of SPUs, e.g., SPUs 4102, 4108 and 4114, can be established for performing geometric transformations upon three dimensional objects to generate two dimensional display lists. These two dimensional display lists can be further processed (rendered) by other SPUs to generate pixel data. To perform this processing, sandboxes are dedicated to SPUs 4102, 4108 and 4114 for storing the three dimensional objects and the display lists resulting from the processing of these objects. For example, source sandboxes 4104, 4110 and 4116 are dedicated to storing the three dimensional objects processed by, respectively, SPU 4102, SPU 4108 and SPU 4114. In a similar manner, destination sandboxes 4106, 4112 and 4118 are dedicated to storing the display lists resulting from the processing of these three dimensional objects by, respectively, SPU 4102, SPU 4108 and SPU 4114.

Coordinating SPU 4120 is dedicated to receiving in its local storage the display lists from destination sandboxes 4106, 4112 and 4118. SPU 4120 arbitrates among these display lists and sends them to other SPUs for the rendering of pixel data.

Figure 42:
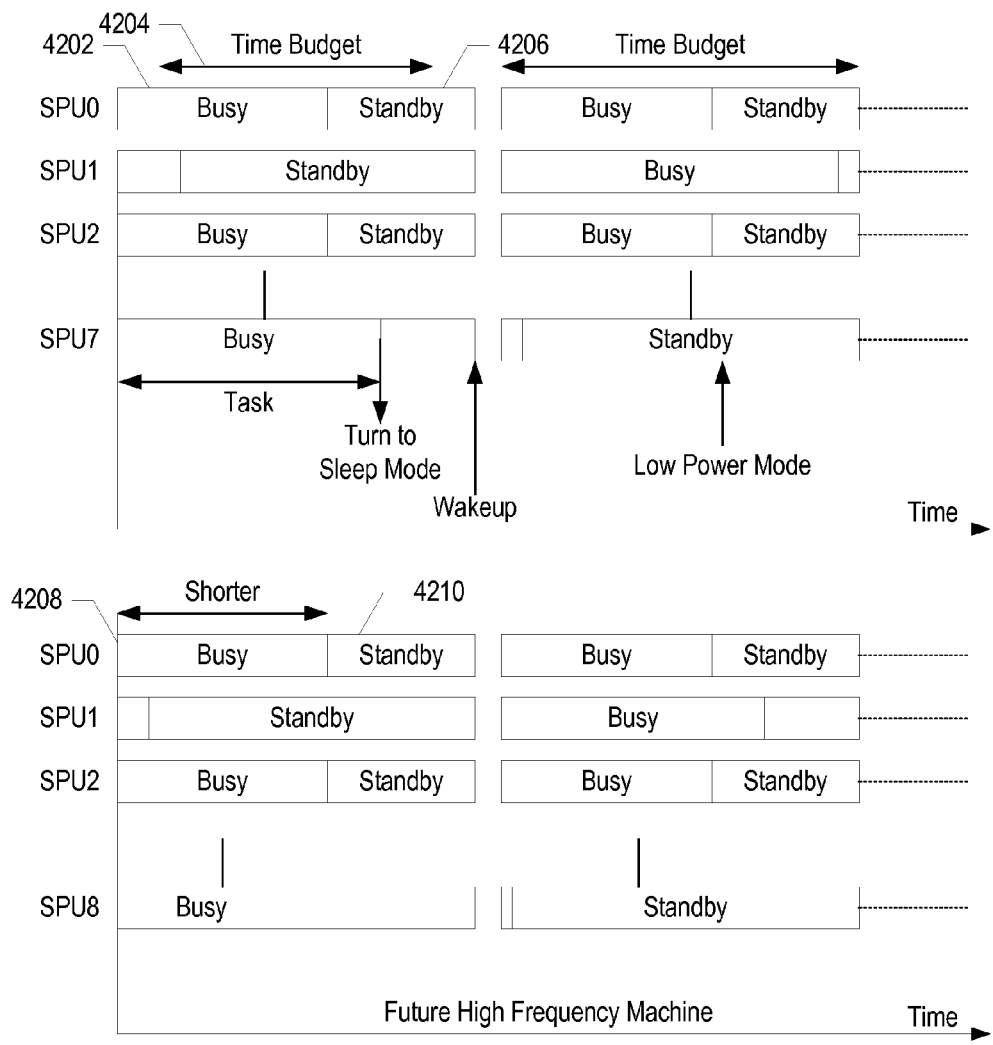
FIG. 42 illustrates a scheme for an absolute timer for coordinating the parallel processing of applications and data by SPUs in accordance with the present invention.

The processors of system 101 also employ an absolute timer. The absolute timer provides a clock signal to the SPUs and other elements of a PU which is both independent of, and faster than, the clock signal driving these elements. The use of this absolute timer is illustrated in FIG. 42.

As shown in this figure, the absolute timer establishes a time budget for the performance of tasks by the SPUs. This time budget provides a time for completing these tasks which is longer than that necessary for the SPUs' processing of the tasks. As a result, for each task, there is, within the time budget, a busy period and a standby period. All spulets are written for processing on the basis of this time budget regardless of the SPUs' actual processing time or speed.

For example, for a particular SPU of a PU, a particular task may be performed during busy period 4202 of time budget 4204. Since busy period 4202 is less than time budget 4204, a standby period 4206 occurs during the time budget. During this standby period, the SPU goes into a sleep mode during which less power is consumed by the SPU.

The results of processing a task are not expected by other SPUs, or other elements of a PU, until a time budget 4204 expires. Using the time budget established by the absolute timer, therefore, the results of the SPUs' processing always are coordinated regardless of the SPUs' actual processing speeds.

In the future, the speed of processing by the SPUs will become faster. The time budget established by the absolute timer, however, will remain the same. For example, as shown in FIG. 42, an SPU in the future will execute a task in a shorter period and, therefore, will have a longer standby period. Busy period 4208, therefore, is shorter than busy period 4202, and standby period 4210 is longer than standby period 4206. However, since programs are written for processing on the basis of the same time budget established by the absolute timer, coordination of the results of processing among the SPUs is maintained. As a result, faster SPUs can process programs written for slower SPUs without causing conflicts in the times at which the results of this processing are expected.

In lieu of an absolute timer to establish coordination among the SPUs, the PU, or one or more designated SPUs, can analyze the particular instructions or microcode being executed by an SPU in processing an spulet for problems in the coordination of the SPUs' parallel processing created by enhanced or different operating speeds. "No operation" ("NOOP") instructions can be inserted into the instructions and executed by some of the SPUs to maintain the proper sequential completion of processing by the SPUs expected by the spulet. By inserting these NOOPs into the instructions, the correct timing for the SPUs' execution of all instructions can be maintained.

Figure 43:
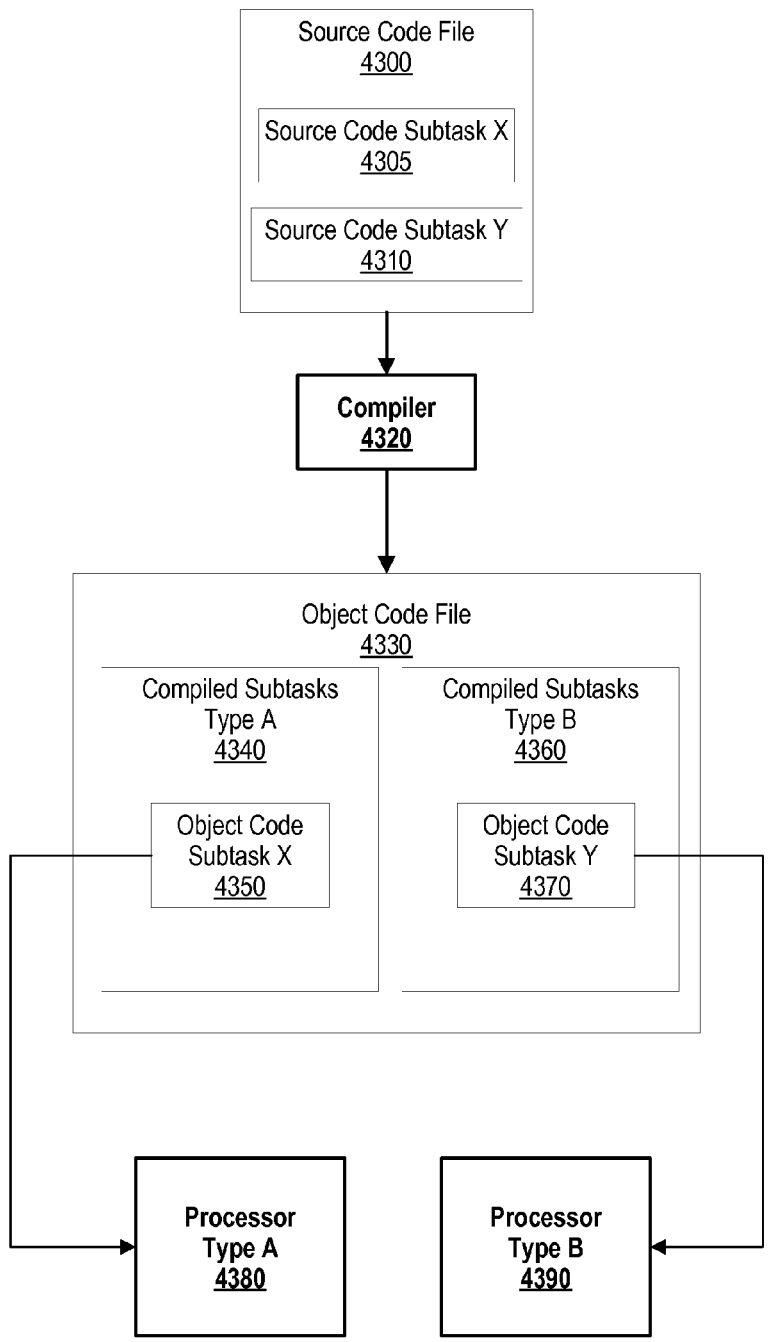
FIG. 43 is a diagram showing a compiler compiling source code subtasks into processor-specific object code subtasks.

FIG. 43 is a diagram showing a compiler compiling source code subtasks into processor-specific object code subtasks. The two processors shown in FIG. 43, processor type A 180 and processor type B 190, may be regarded as a processing unit (PU) and a synergistic processing unit (SPU), respectively, which are described in FIG. 1 through FIG. 42. Compiler 4320 receives source code file 4300 and compiles it into object code file 4330. Source code file 4300 includes subtasks that perform particular functions, such as source code subtask X 4305 and source code subtask Y 4310. During compilation, compiler 4320 compiles each source code subtask (e.g. source code subtask X 4305 and source code subtask Y 4310) into object code subtasks whereby each object code subtask is formatted to run on a particular processor type. Compiler 4320 uses one of three approaches to identify a processor type that is best suited to run each object code subtask.

The first approach that compiler 4320 may use is a lowbrow approach whereby compiler 4320 receives a processor-specific command from a programmer for a particular source code subtask. For example, a programmer may send a command "gcc -m processor A" to compiler 4320 which instructs compiler 4320 to generate an object code subtask that is formatted to run on processor type A 4380.

The second approach that compiler 4320 may use is a brute force approach whereby compiler 4320 identifies one or more operations within a source code subtask and selects a processor type that is best suited to perform the identified operations. For example, compiler 4320 may analyze source code subtask X 4305 and identify a plurality of control operations in which compiler 4320 selects a processor type with a microprocessor-based architecture.

The third approach that compiler 4320 may use is a higher-level approach whereby compiler 4320 identifies a program directive within a function and selects a processor type corresponding to the program directive. For example, "procA" may be a line in source code subtask X 4305 which instructs compiler 4320 to compile source code subtask X 4305 into object code that is formatted to run on processor type A 4380 (see FIG. 47 and corresponding text for further details regarding processor-specific compilation).

Object code file 4330 includes two subtasks groups, which are compiled subtasks type A 4340 and compiled subtasks type B 4360. Each subtask group includes object code subtasks that are formatted for a corresponding processor type. For example, compiled subtasks type B 4360 include object code subtask Y 4370 which is formatted to run on processor type B 4390. During runtime, compiled subtasks type A 4340 are loaded into processor type A 4380 and compiled subtasks type B 4360 are loaded into processor type B 4390.

In one embodiment, a source code subtask may be compiled for a plurality of processor types. For example, a source code subtask may run adequately on both processor type A 4380 and processor type B 4390. In this example, compiler 4320 may compile the source code subtask for both processor types.

Figure 44:
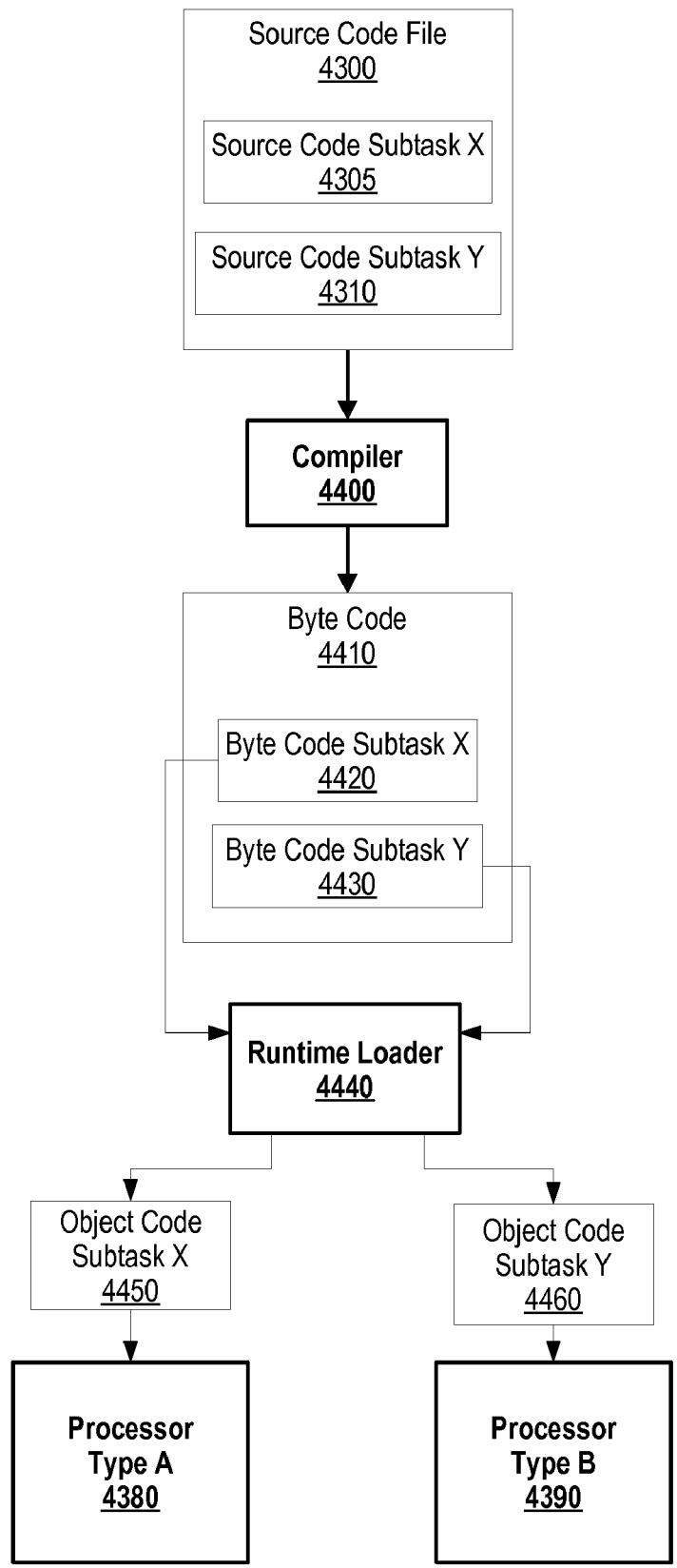
FIG. 44 is a diagram showing a compiler compiling source code subtasks into byte code subtasks and a runtime loader translating the byte code subtasks into processor-specific object code subtasks.

FIG. 44 is a diagram showing a compiler compiling source code subtasks into byte code subtasks and a runtime loader translating the byte code subtasks into processor-specific object code subtasks. Source code file 4300, source code subtask X 4305, and source code subtask Y 4310 are the same as that shown in FIG. 43. The difference between FIG. 43 and FIG. 44 is that a determination as to which processor type to use for a particular function is decided at runtime (e.g. FIG. 44) as opposed to at compile time (e.g. FIG. 43). Compiler 4400 receives source code file 4300 and compiles it into byte code, such as byte code 4410. For example, compiler 4400 may compile source code file 4300 into byte code types such as Java, XML, Shader, or Script.

During compilation, compiler 4400 compiles each source code subtask included in source code file 4300 into byte code subtasks. The example shown in FIG. 44 shows that compiler 4400 compiled source code subtask X 4305 into byte code subtask X 4420 and compiled source code subtask Y 4310 into byte code subtask Y 4430. Each byte code subtask may be of a different byte code type. For example, byte code subtask X 4420 may be Java formatted and byte code subtask Y 4430 may be XML formatted.

In one embodiment, compiler 4400 includes a pointer in byte code 4410 that corresponds to a byte code subtask. In this embodiment, the byte code subtask is stored in a shared library and a processor uses the pointer to reference the location of the byte code subtask (see FIG. 49 and corresponding text for further details regarding pointers).

At runtime, runtime loader 4440 receives a byte code subtask, identifies a particular processor type for the byte code subtask, and translates the byte code subtask into a processor-specific object code subtask. Runtime loader 4440 uses one of three approaches to identify a processor type for byte code subtasks.

The first approach that runtime loader 4440 may use is a brute-force approach whereby runtime loader 4440 identifies one or more operations within the byte code subtask and selects a processor type that is best suited to perform the identified operations. For example, runtime loader 4440 may analyze byte code subtask X 4420 and identify a plurality of control operations. In this example, runtime loader 4440 may select a processor type that incorporates a microprocessor-based architecture.

The second approach that runtime loader 4440 may use is a higher-level approach whereby runtime loader 4440 identifies a program directive within a byte code subtask and selects a processor type corresponding to the program directive. For example, "procA" may be a line in byte code subtask X 4420 that instructs runtime loader to translate byte code subtask X 4420 that is formatted to run on processor type A 4380.

The third approach that runtime loader 4440 may use is based upon processor availability. For example, runtime loader 4440 may analyze loading factors of processor type A 4380 and processor type B 4390 and determine that processor type B 4390 is heavily loaded. In this example, runtime loader 4440 determines that byte code subtask X 4420 is better suited to run on processor type A 4380 (see FIG. 50 and corresponding text for further details regarding runtime loading processor type identification).

The example shown in FIG. 44 shows that runtime loader 4440 translates byte code subtask X 4420 into object code subtask X 4450 to run on processor type A 4380. FIG. 44 also shows that runtime loader 4440 translates byte code subtask 4430 into object code subtask Y 4460 to run on processor type B 4390. Processor type A 4380 and processor type B 4390 are the same processor types that are shown in FIG. 43.

Figure 45:
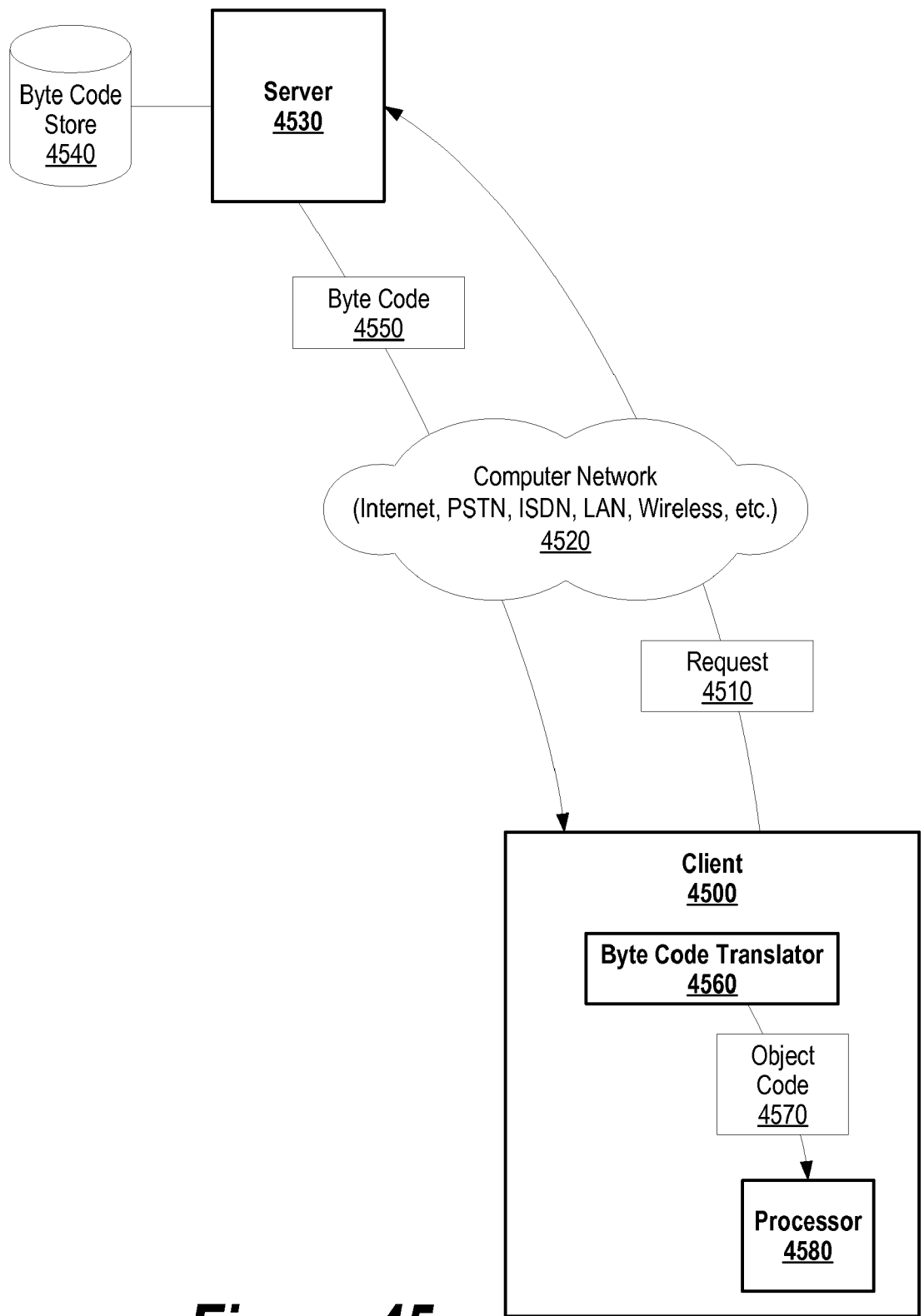
FIG. 45 is a diagram showing a client receiving byte code from a server and the client loading the byte code on a particular processor type loaded at the client using a byte code translator.

FIG. 45 is a diagram showing a client receiving byte code from a server and the client loading the byte code on a particular processor type loaded at the client using a byte code translator. Client 4500 sends request 4510 to server 4530 over computer network 4520, such as the Internet. Request 4510 is a request that corresponds to a file, program, or data that server 4530 manages. For example, server 4530 may be a financial management server and request 4510 may be a request for server 4530 to send a financial analysis program to client 4500.

Server 4530 receives request 4510, and accesses byte code store 4540 to retrieve a program corresponding to request 4510. Server 4530 sends byte code 4550 to client 4500 over computer network 4520. Using the example described above, byte code 4550 is a byte code representation of a financial analysis program that was requested by client 4500. The program is in a "byte code" format because server 4530 receives requests from a plurality of clients and each client may use a different processor type. Therefore, server 4530 sends a program in byte code format to the client and assumes that the client will translate the byte code into client-specific object code that is formatted to run on the client's processor type.

Client 4500 receives byte code 4550, and uses byte code translator 4560 to translate byte code 4550 into client-specific object code (e.g. object code 4570) that is formatted to run on processor 4580. For example, processor 4580 may be a microprocessor type A and object code 4570 is adapted to run on microprocessor type A. Byte code translator 4560 may be a runtime loader that is capable of translating byte code into client-specific object code.

In one embodiment, client 4500 may include a plurality of processor types. In this embodiment, byte code translator 4560 identifies a processor type from the plurality of processor types and translates byte code 4550 into an object code format based upon the identified processor type (see FIGS. 44, 50, and corresponding text for further details regarding processor type identification).

Figure 46:
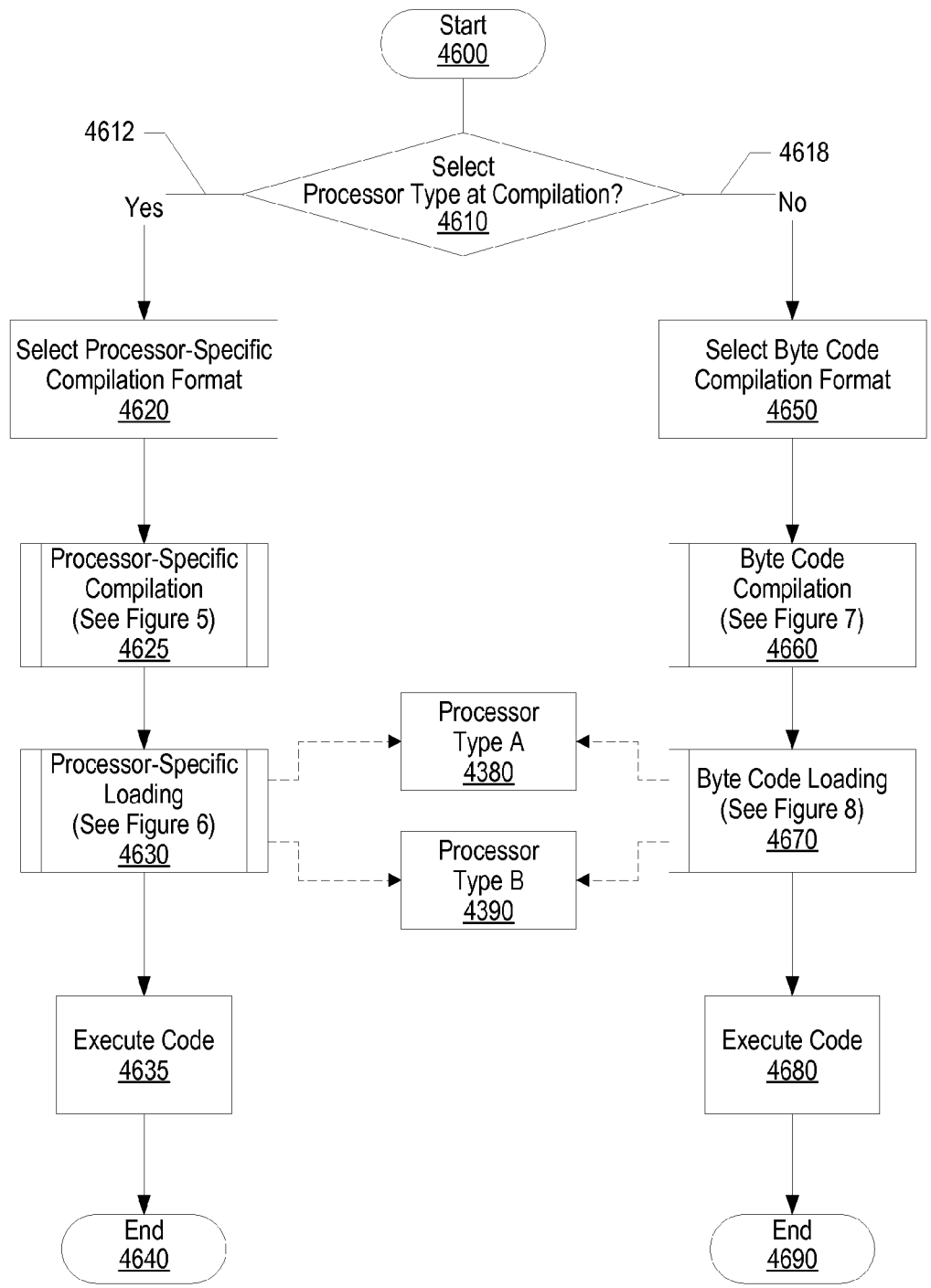
FIG. 46 is a high-level flow chart showing steps taken in compiling source code and executing object code on a plurality of processor types.

FIG. 46 is a high-level flow chart showing steps taken in compiling source code and executing object code on a plurality of processor types. The source code includes a plurality of source code subtasks in which each subtask may run more effectively on a particular processor type. For example, source code subtasks that are predominantly "control-type" subtasks are best suited to run on a microprocessor-based architecture whereas source code subtasks that are predominately "mathematical-type" subtasks are best suited to run on a digital signal processor-based architecture.

Processing commences at 4600, whereupon a determination is made as to whether to select a processor type for each source code subtask at compilation or during runtime (decision 4610). If the processor type selection is during compilation, decision 4610 branches to "Yes" branch 4612 whereupon processing selects a processor-specific format compilation, such as object code (step 4620). Processing selects a processor type for each source code subtask, and creates an object code subtask for each source code subtask (pre-defined process block 4625, see FIG. 5 and corresponding text for further details).

Figure 48:
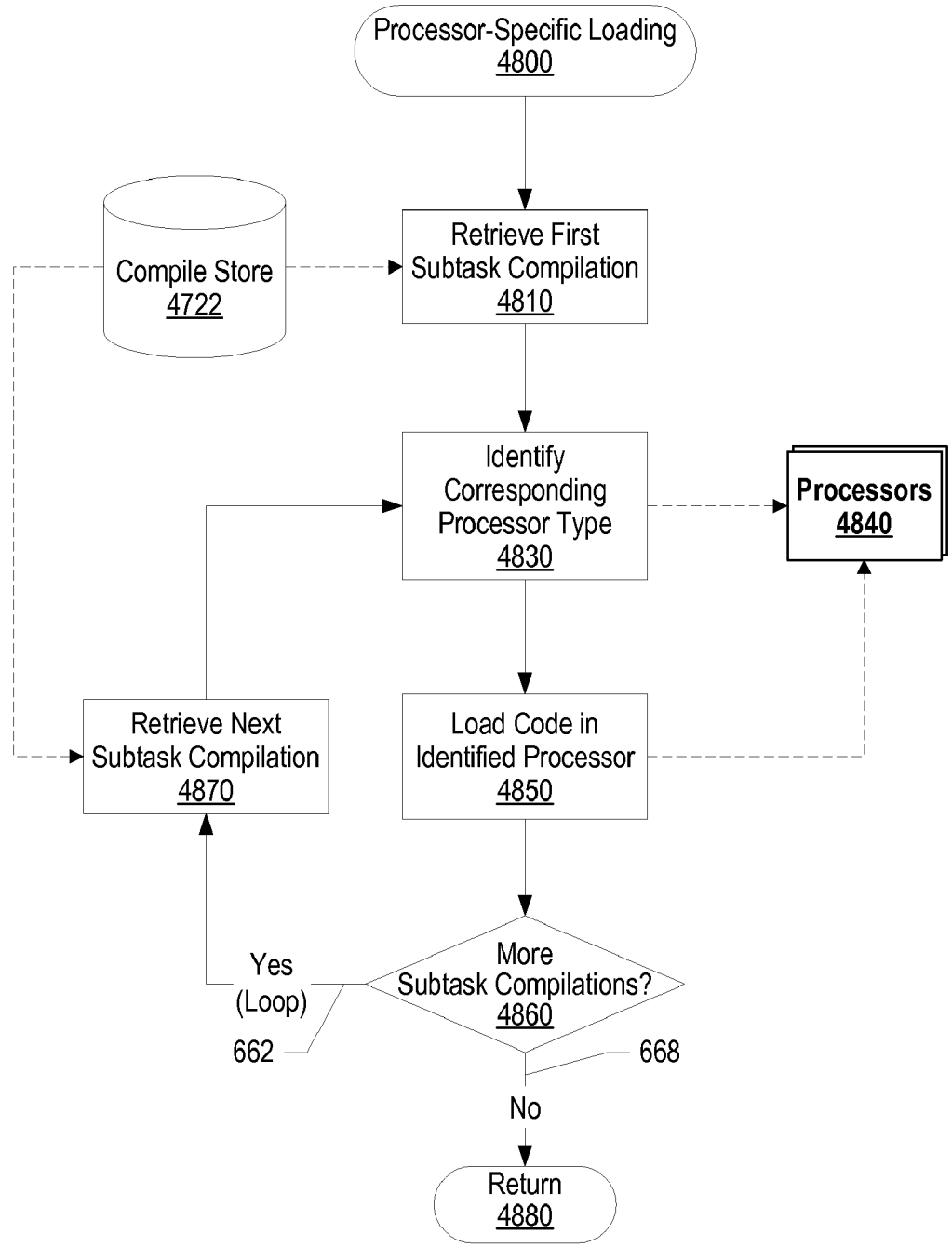
FIG. 48 is a flowchart showing steps taken in loading processor-specific object code into a corresponding processor.

Once processing compiles each source code subtask into object code subtasks, processing loads the object code into corresponding processor types, such as processor type A 4380 and processor type B 4390 (pre-defined process block 4630, see FIG. 48 and corresponding text for further details). Each processor type executes its particular object code subtasks at step 4655, and processing ends at 4640.

If the processor type selection should be determined at runtime, decision 4610 branches to "No" branch 4618 whereupon processing selects a particular byte code format (step 4650). For example, a selected byte code format may be Java, XML, Shader, or Script. Processing creates a byte code subtask for each source code subtask whereby each byte code subtask is translated to object code during runtime (see below) (pre-defined process block, see FIG. 49 and corresponding text for further details). During byte code compilation, processing may choose to include a pointer in a byte code file that references a byte code subtask that is stored in a shared library (see FIG. 49 and corresponding text for further details regarding pointer substitution).

Figure 50:
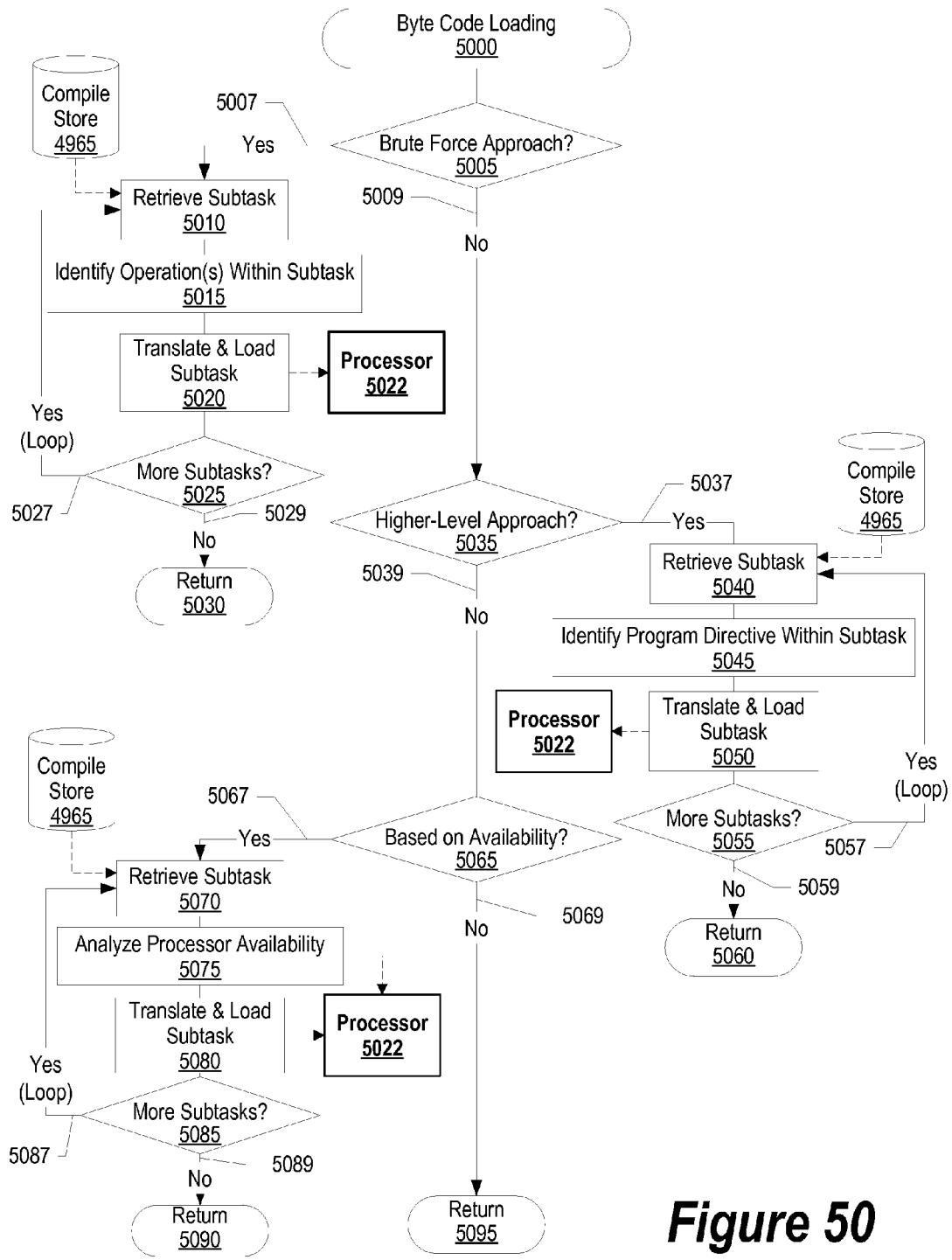
FIG. 50 is a flowchart showing steps taken in translating byte code into processor-specific object code and loading the processor-specific object code into a corresponding processor type.

Processing translates the byte code into processor-specific object code during runtime using one of three processor type selection approaches (pre-defined process block 4670, see FIG. 50 and corresponding text for further details). The object code subtasks are then loaded into a corresponding processor type, such as processor type A 4380 and processor type B 4390. Each processor type executes its particular object code at step 4680, and processing ends at 4690.

Figure 47:
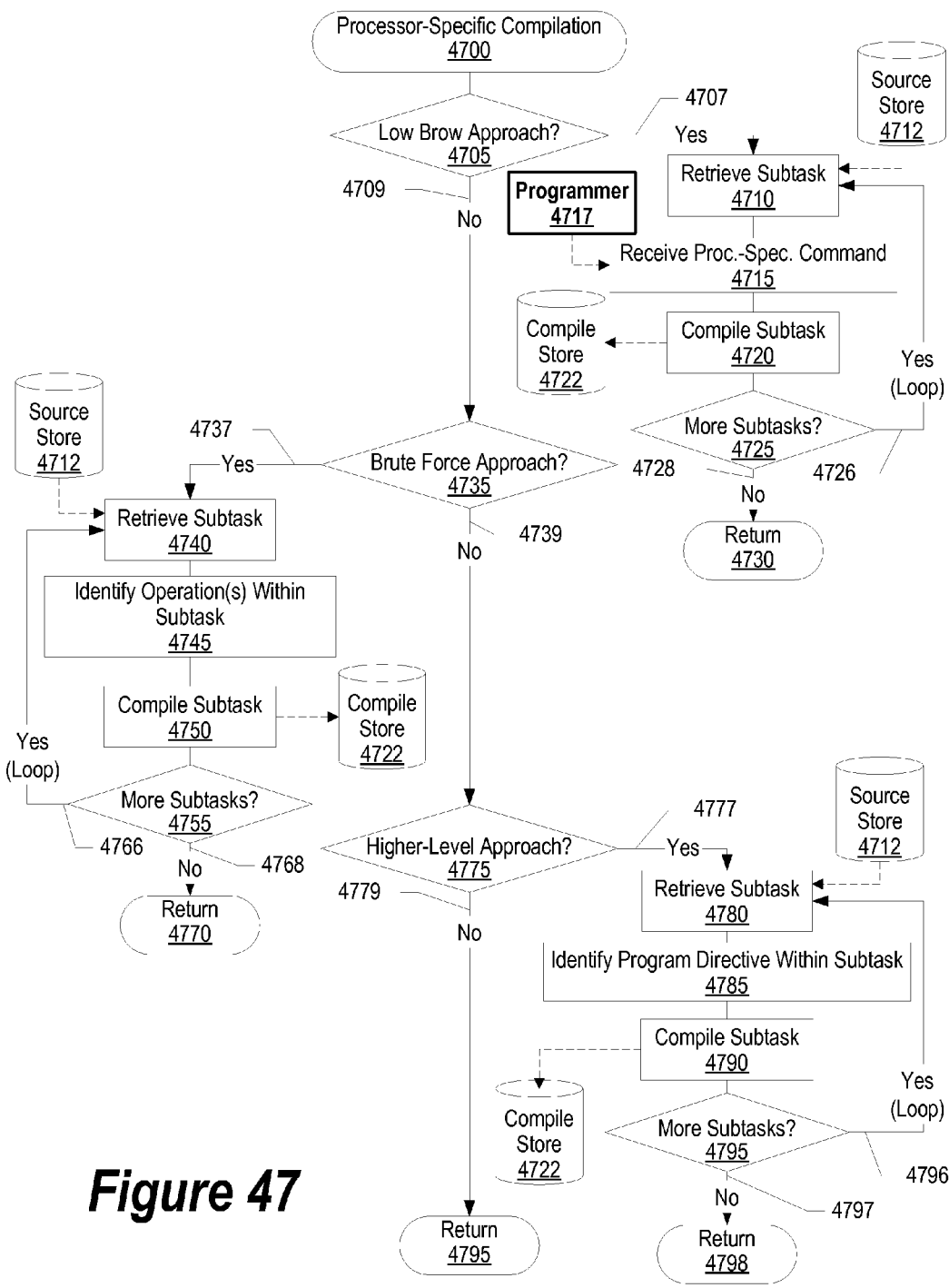
FIG. 47 is a flowchart showing steps taken in compiling source code into processor-specific object code.

FIG. 47 is a flowchart showing steps taken in compiling source code into processor-specific object code. The source code includes source code subtasks whereby each source code subtask is identified to run on a particular processor type based upon its function, such as whether it involves control type instructions or calculation type instructions (i.e. microprocessor, DSP, microcontroller, etc.). For example, one source code subtask may be a task that manages interrupts whereas another source code subtask may be a task that adds vectors. During processor-specific compilation, the source code is compiled into object code using one of three approaches which are a low brow approach, a brute force approach, or a higher level approach (see below). As one skilled in the art can appreciate, other means of selecting processor types may be used than what is listed herein.

Processing commences at 4700, whereupon a determination is made as to whether source code should be compiled using a lowbrow approach (decision 4705). A lowbrow approach is an approach whereby a compiler receives a processor-specific command from a programmer, such as programmer 4717, for a particular source code subtask. For example, a programmer may send a command "gcc -m processorA" to a compiler which instructs the compiler to generate object code for a processor type "A" format. If processing should compile source code using a lowbrow approach, decision 4705 branches to "Yes" branch 4707 whereby processing retrieves a source code subtask from source code store 4712 at step 4710. Source code store 4712 includes a source code file and may be stored on a nonvolatile storage area, such as a computer hard drive.

Processing receives a processor-specific command from programmer 4717 at step 4720 which instructs processing to compile the source code subtask for a particular processor type. Processing compiles the source code subtask into an object code subtask at step 4720, and stores the object code subtask in compile store 4722. Compile store 4722 may be stored on a nonvolatile storage area, such as a computer hard drive.

A determination is made as to whether there are more source code subtasks to compile (decision 4725). If there are more source code subtasks to compile, decision 4725 branches to "Yes" branch 4726 which loops back to retrieve and process the next source code subtask. This looping continues until there are no more source code subtasks to process, at which point decision 4725 branches to "No" branch 4728 and processing returns at 4730.

On the other hand, if processing should not compile source code using a lowbrow approach, decision 4705 branches to "No" branch 4709 bypassing lowbrow compilation steps. A determination is made as to whether processing should compile code using a brute force approach (decision 4735). A brute force approach is when a compiler identifies one or more operations within a source code subtask and selects a processor type that is best suited to perform the identified operations. For example, a compiler may analyze a source code subtask and identify a plurality of control operations whereby the compiler selects a processor type with a microprocessor-based architecture.

If processing should compile source code using a brute force approach, decision 4735 branches to "Yes" branch 4737 whereby processing retrieves a source code subtask from source code store 4712 at step 4740. Processing identifies one or more operations included in the retrieved source code subtask and selects a processor type based upon the identified operations (step 4745). In turn, processing compiles the source code subtask into an object code subtask and stores the object code subtask in compile store 4722 (step 4750).

A determination is made as to whether there are more source code subtasks to compile (decision 4755). If there are more source code subtasks to compile, decision 4755 branches to "Yes" branch 4766 which loops back to retrieve and process the next source code subtask. This looping continues until there are no more source code subtasks to process, at which point decision 4755 branches to "No" branch 4768 and processing returns at 4770.

On the other hand, if processing should not compile source code using a brute force approach, decision 4735 branches to "No" branch 4739 bypassing brute force compilation steps. A determination is made as to whether processing should compile code using a higher-level approach (decision 4775). A higher-level approach is when a compiler identifies a program directive within a source code subtask and selects a processor type corresponding to the program directive. For example, "procA" may be a line in a source code subtask which instructs the compiler to compile the source code subtask into an object code subtask that is suitable to run on a processor that is type "A". If processing should not compile source code using a higher-level approach, decision 4775 branches to "No" branch 4779 bypassing higher level compilation steps, whereupon processing returns at 4795.

On the other hand, if processing should compile source code using a higher-level approach, decision 4775 branches to "Yes" branch 4777 whereby processing retrieves a source code subtask from source code store 4712 at step 4780. Processing identifies one or more program directives included in the retrieved source code subtask and selects a processor type based upon the identified operations (step 4785). In turn, processing compiles the source code subtask into an object code subtask and stores the object code subtask in compile store 4722 (step 4790).

A determination is made as to whether there are more source code subtasks to compile (decision 4795). If there are more source code subtasks to compile, decision 4795 branches to "Yes" branch 4796 which loops back to retrieve and process the next source code subtask. This looping continues until there are no more source code subtasks to process, at which point decision 4795 branches to "No" branch 4797 and processing returns at 4798.

FIG. 48 is a flowchart showing steps taken in loading processor-specific object code into a corresponding processor. A source code file that includes a plurality of source code subtasks was compiled into object code. During the compilation, processing identified a particular processor type for each source code subtask and generated processor-specific object code subtasks (see FIG. 47 and corresponding text for further details regarding processor type selection during compilation).

Processor-specific loading commences at 4800, whereupon processing retrieves an object code subtask from compile store 4722 (step 4810). Compile store 4722 is the same as that shown in FIG. 47 and may be stored on a nonvolatile storage area, such as a computer hard drive. Processing identifies a processor type corresponding to the object code subtask's object code type by analyzing the object code subtask and comparing it with processor types, such as processors 4840 (step 4830). Once identified, processing loads the object code subtask into the identified processor at step 4850. A determination is made as to whether there are more object code subtasks to load (decision 4860). If there are more object code subtasks to load, decision 4860 branches to "Yes" branch 4862 whereupon processing retrieves (step 4870) and processes the next object code subtask. This looping continues until there are no more object code subtasks to load, at which point decision 4860 branches to "No" branch 4868 whereupon processing ends at 4880.

In one embodiment, object code subtasks are stored in object code groups and loaded into a processor as a group. For example, object code subtasks that are for a processor type "A" may be stored in object group "A" whereas object code subtasks that are for a processor type "B" may be stored in object group "B". In this embodiment, processing may load the object groups in its entirety instead of analyzing each object code subtask individually.

Figure 49:
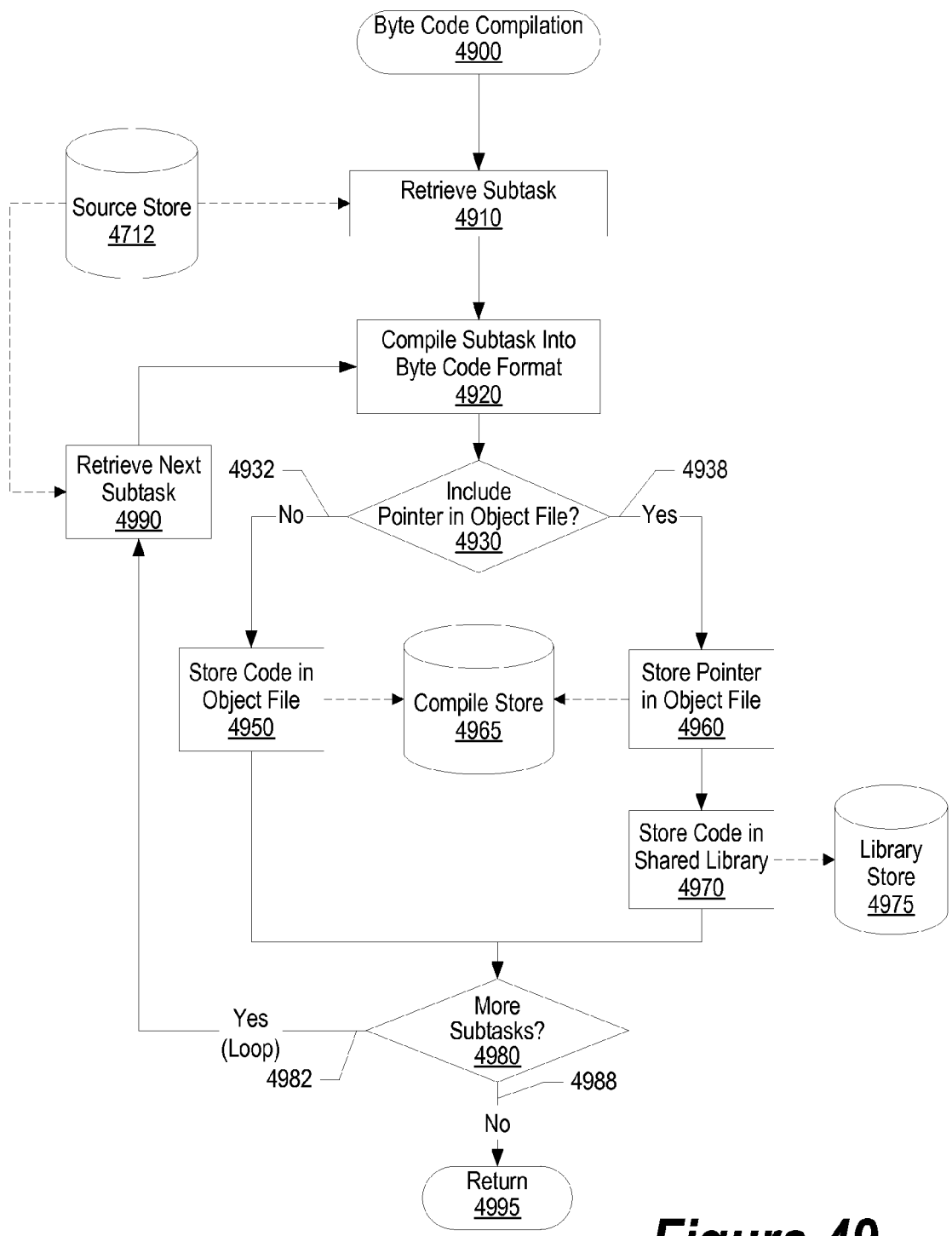
FIG. 49 is a flowchart showing steps taken in compiling source code into byte code.

FIG. 49 is a flowchart showing steps taken in compiling source code into byte code. The source code includes a plurality of source code subtasks, each of which are compiled into byte code subtasks. At runtime, the byte code subtasks are translated into processor-specific object code subtask (see FIG. 50 and corresponding text for further details processor-specific object code subtasks).

Processing commences at 4900, whereupon processing retrieves a first source code subtask from source store 4712 at step 4910. Source store 512 is the same as that shown in FIG. 47 and may be stored on a nonvolatile storage area, such as a computer hard drive. Processing compiles the source code subtask into a byte code subtask using a selected byte code format at step 4930 (i.e. Java, XML, Shader, Script, etc.).

A determination is made as to whether to include the byte code subtask in a compiled file or to store the byte code subtask in a shared library and include a pointer in the compiled file that references the location of the byte code subtask (decision 4930). If the byte code subtask should be included in the compiled file, such as compile store 4965, decision 4930 branches to "No" branch 4932 whereupon the byte code subtask is stored in compile store 4965 at step 4950. Compile store 4965 may be stored on a nonvolatile storage area, such as a computer hard drive. On the other hand, if the byte code subtask should be stored a shared library, decision 4930 branches to "Yes" branch 4938 whereupon processing stores a pointer in compile store 4965 (step 4960), and stores the byte code subtask in library store 4975 (step 4970). Library store 4975 may be stored on a nonvolatile storage area, such as a computer hard drive.

A determination is made as to whether more source code subtasks should be processed (decision 4980). If more source code subtasks should be processed, decision 4980 branches to "Yes" branch 4982 which loops back to retrieve (step 4990) and process the next source code subtask. This looping continues until there are no more source code subtasks to process, at which point decision 4980 branches to "No" branch 4988 whereupon processing returns at 4995.

FIG. 50 is a flowchart showing steps taken in translating byte code into processor-specific object code and loading the processor-specific object code into a corresponding processor type. The byte code includes byte code subtasks that were compiled from source code subtasks (see FIG. 49 and corresponding text for further details regarding byte code subtask compilation). During byte code loading, each byte code subtask is translated into an object code subtask using one of three approaches which are a brute force approach, a higher level approach, or a processor availability approach (see below). As one skilled in the art can appreciate, other means of selecting processor types may be used than what is listed herein.

Processing commences at 5000, whereupon a determination is made as to whether processing should translate byte code subtasks using a brute force approach (decision 5005). A brute force approach is when a runtime loader identifies one or more operations within a byte code subtask and selects a processor type that is best suited to perform the identified operations. For example, a runtime loader may analyze a byte code subtask and identify a plurality of control operations, in which case the runtime loader selects a processor type with a microprocessor-based architecture.

If processing should translate byte code subtasks using a brute force approach, decision 5005 branches to "Yes" branch 5007 whereby processing retrieves byte code subtask from compile store 4965 at step 5010. Compile store 4965 is the same as that shown in FIG. 49 and may be stored on a nonvolatile storage area, such as a computer hard drive. Processing identifies one or more operations included in the retrieved byte code subtask and selects a processor type based upon the identified operations (step 5015). Processing then translates the byte code subtask into an object code subtask and loads the object code subtask into a corresponding processor type, such as processor 5022 (step 5020).

A determination is made as to whether there are more byte code subtasks to translate (decision 5025). If there are more byte code subtasks to translate, decision 5025 branches to "Yes" branch 5027 which loops back to retrieve and process the next byte code subtask. This looping continues until there are no more byte code subtasks to process, at which point decision 5025 branches to "No" branch 5029 whereupon processing returns at 5030.

On the other hand, if processing should not translate byte code using a brute force approach, decision 5005 branches to "No" branch 5009 bypassing brute force translation steps. A determination is made as to whether processing should translate byte code subtasks using a higher-level approach (decision 5035). A higher-level approach is when a runtime loader identifies a program directive within a byte code subtask and selects a processor type corresponding to the program directive. For example, "procA" may be a line in a byte code subtask which instructs the runtime loader to translate the byte code subtask into an object code subtask that is suitable to run on a processor that is type "A".

If processing should translate byte code using a higher-level approach, decision 5035 branches to "Yes" branch 5037 whereby processing retrieves a byte code subtask from compile store 4965 at step 5040. Processing identifies one or more program directives included in the retrieved byte code subtask and selects a processor type based upon the identified operations (step 5045). Processing translates the byte code subtask into an object code subtask, and loads the object code subtask on a processor with the identified processor type, such as processor 5022 (step 5050).

A determination is made as to whether there are more byte code subtasks to translate (decision 5055). If there are more byte code subtasks to translate, decision 5055 branches to "Yes" branch 5057 which loops back to retrieve and process the next byte code subtask. This looping continues until there are no more byte code subtasks to process, at which point decision 5055 branches to "No" branch 5059 and processing returns at 5060.

On the other hand, if processing should not translate byte code using a higher-level approach, decision 5035 branches to "No" branch 5039 bypassing higher-level compilation steps.

A determination is made as to whether to translate byte code subtasks based upon processor availability (decision 5065). For example, processing may dynamically monitor processor loading factors (i.e. performance counters) and select a processor type that is least loaded. If processing should not translate byte code subtasks based upon processor availability, decision 5065 branches to "No" branch 5069 bypassing processor availability steps, whereupon processing returns at 5095.

On the other hand, if processing should translate byte code subtasks based upon processor availability, decision 5065 branches to "Yes" branch 5067 whereupon processing retrieves a byte code subtask from compile store 4965 at step 5070. Processing analyzes processor type loading factors (e.g. processor 5022) at step 5075. Processing then translates the byte code subtask into a processor specific object code subtask based upon processor availability and loads the processor specific object code subtask in processor 5022 (step 5080). A determination is made as to whether there are more byte code subtasks to translate (decision 5085). If there are more byte code subtasks to translate, decision 5085 branches to "Yes" branch 5087 which loops back to retrieve and process the next byte code subtask. This looping continues until there are no more byte code subtasks to process, at which point decision 5085 branches to "No" branch 5089 whereupon processing returns at 5090.

Figure 51:
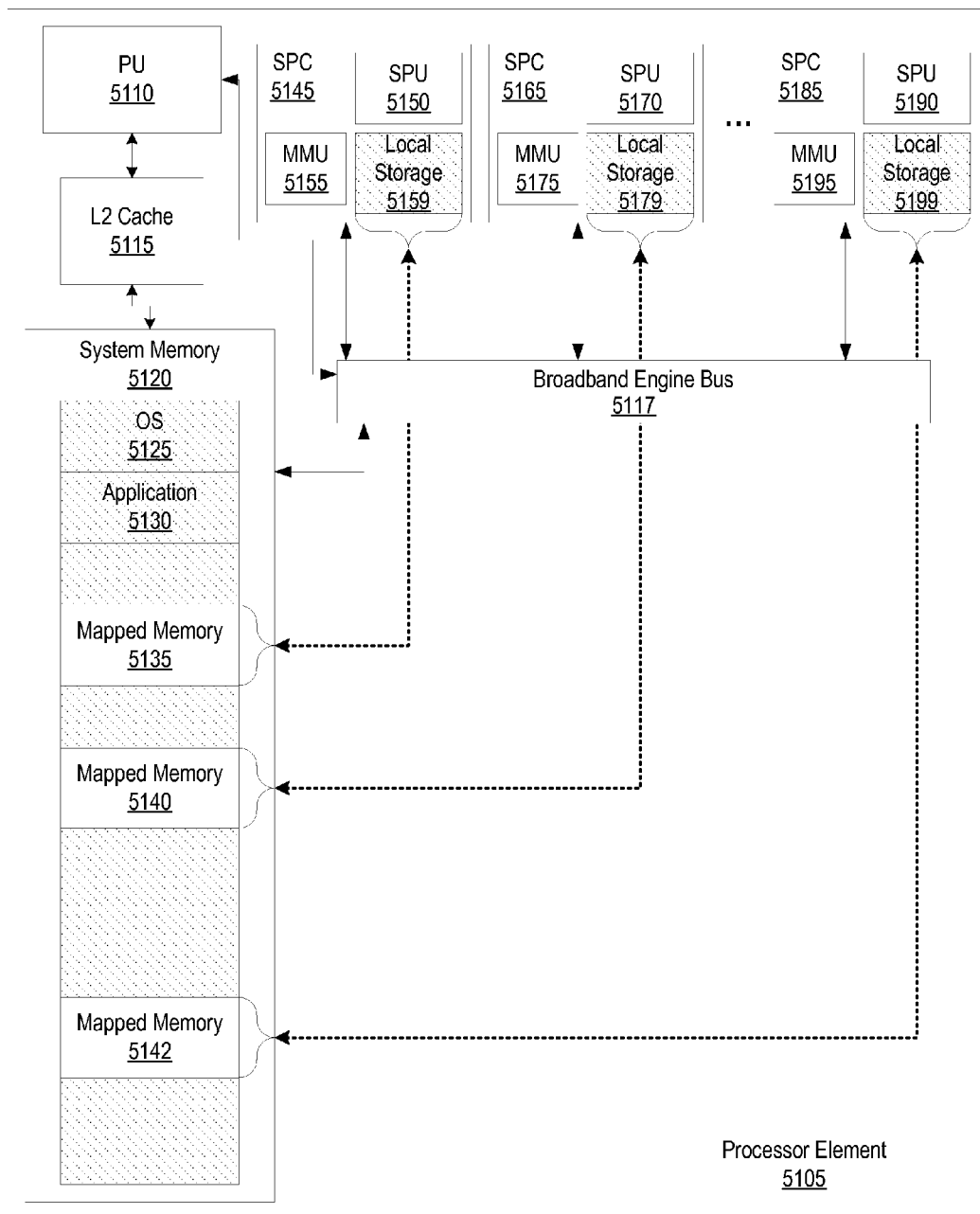
FIG. 51 is a block diagram illustrating a processing element having a main processor and a plurality of secondary processors sharing a system memory.

FIG. 51 is a block diagram illustrating a processing element having a main processor and a plurality of secondary processors sharing a system memory. Processor Element (PE) 5105 includes processing unit (PU) 5110, which, in one embodiment, acts as the main processor and runs an operating system. Processing unit 5110 may be, for example, a Power PC core executing a Linux operating system. PE 5105 also includes a plurality of synergistic processing complex's (SPCs) such as SPCs 5145, 5165, and 5185. The SPCs include synergistic processing units (SPUs) that act as secondary processing units to PU 5110, a memory storage unit, and local storage. For example, SPC 5145 includes SPU 5160, MMU 5155, and local storage 5159; SPC 5165 includes SPU 5170, MMU 5175, and local storage 5179; and SPC 5185 includes SPU 5190, MMU 5195, and local storage 5199.

Each SPC may be configured to perform a different task, and accordingly, in one embodiment, each SPC may be accessed using different instruction sets. If PE 5105 is being used in a wireless communications system, for example, each SPC may be responsible for separate processing tasks, such as modulation, chip rate processing, encoding, network interfacing, etc. In another embodiment, the SPCs may have identical instruction sets and may be used in parallel with each other to perform operations benefiting from parallel processing. PE 5105 may also include level 2 cache, such as L2 cache 5115, for the use of PU 5110. In addition, PE 5105 includes system memory 5120, which is shared between PU 5110 and the SPUs. System memory 5120 may store, for example, an image of the running operating system (which may include the kernel), device drivers, I/O configuration, etc., executing applications, as well as other data. System memory 5120 includes the local storage units of one or more of the SPCs, which are mapped to a region of system memory 5120. For example, local storage 5159 may be mapped to mapped region 5135, local storage 5179 may be mapped to mapped region 5140, and local storage 5199 may be mapped to mapped region 5142. PU 5110 and the SPCs communicate with each other and system memory 5120 through bus 5117 that is configured to pass data between these devices.

The MMUs are responsible for transferring data between an SPU's local store and the system memory. In one embodiment, an MMU includes a direct memory access (DMA) controller configured to perform this function. PU 5110 may program the MMUs to control which memory regions are available to each of the MMUs. By changing the mapping available to each of the MMUs, the PU may control which SPU has access to which region of system memory 5120. In this manner, the PU may, for example, designate regions of the system memory as private for the exclusive use of a particular SPU. In one embodiment, the SPUs' local stores may be accessed by PU 5110 as well as by the other SPUs using the memory map. In one embodiment, PU 5110 manages the memory map for the common system memory 5120 for all the SPUs. The memory map table may include PU 5110's L2 Cache 5115, system memory 5120, as well as the SPUs' shared local stores.

In one embodiment, the SPUs process data under the control of PU 5110. The SPUs may be, for example, digital signal processing cores, microprocessor cores, micro controller cores, etc., or a combination of the above cores. Each one of the local stores is a storage area associated with a particular SPU. In one embodiment, each SPU can configure its local store as a private storage area, a shared storage area, or an SPU may configure its local store as a partly private and partly shared storage.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 5110 and by the other SPUs. An SPU may reserve part of its local store in order for the SPU to have fast, guaranteed memory access when performing tasks that require such fast access. The SPU may also reserve some of its local store as private when processing sensitive data, as is the case, for example, when the SPU is performing encryption/decryption.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
a plurality of heterogeneous processors, each of the heterogeneous processors corresponding to one of a plurality of heterogeneous processor types;
a memory accessible by the heterogeneous processors;
one or more nonvolatile storage devices accessible by the heterogeneous processors; and
a code execution load balancing tool for load balancing code execution, the code execution load balancing tool comprising software code effective to:
compile a first source code subtask and a second source code subtask, the compiling resulting in a first byte code subtask and a second byte code subtask;
determine whether to store a pointer in a byte code file, the pointer including a stored location that corresponds to the second byte code subtask;
store the pointer in the byte code file in response to the determination;
store the second byte code subtask at the stored location in response to the determination;
translate the first byte code subtask to a first object code subtask;
execute the first object code subtask using one of the plurality of heterogeneous processors;
during the execution of the first object code subtask, the software code being further effective to:
retrieve the pointer and analyze the stored location;
in response to analyzing the stored location, retrieve the second byte code subtask using a runtime loader;
in response to retrieving the second byte code subtask, use the runtime loader to identify a selected processor type from the plurality of heterogeneous processor types in which to execute the second byte code subtask, wherein the identifying includes software code effective to retrieve a loading factor for each of the plurality of heterogeneous processor types and determine an availability of each of the plurality of heterogeneous processor types using the loading factors;
in response to identifying the selected processor type, use the runtime loader to translate the second byte code subtask to a second object code subtask; and
load the second object code subtask into a second processor, selected from the plurality of heterogeneous processors, that corresponds to the selected processor type.

2. A computer program product stored on a computer memory, the computer memory containing instructions for execution by a computer, which, when executed by the computer, cause the computer to implement a method for load balancing code execution, said method comprising:
compiling a first source code subtask and a second source code subtask, the compiling resulting in a first byte code subtask and a second byte code subtask;
determining whether to store a pointer in a byte code file, the pointer including a stored location that corresponds to the second byte code subtask;
storing the pointer in the byte code file in response to the determination;
storing the second byte code subtask at the stored location in response to the determination;
translating the first byte code subtask to a first object code subtask;
executing the first object code subtask using one of a plurality of heterogeneous processor types;
during the execution of the first object code subtask, the method further comprising:
retrieving the pointer and analyzing the stored location;
in response to analyzing the stored location, retrieving the second byte code subtask using a runtime loader;
in response to retrieving the second byte code subtask, using the runtime loader to identify a processor type from the plurality of heterogeneous processor types in which to execute the second byte code subtask, wherein the identifying includes retrieving a loading factor for each of the plurality of heterogeneous processor types and determining an availability of each of the plurality of heterogeneous processor types using the loading factors;
in response to identifying the processor type, using the runtime loader to translate the second byte code subtask to a second object code subtask; and
loading the second object code subtask into a processor that corresponds to the identified processor type.

3. A method for load balancing code execution, said method comprising:
compiling a first source code subtask and a second source code subtask, the compiling resulting in a first byte code subtask and a second byte code subtask;
determining whether to store a pointer in a byte code file, the pointer including a stored location that corresponds to the second byte code subtask;
storing the pointer in the byte code file in response to the determination;
storing the second byte code subtask at the stored location in response to the determination;
translating the first byte code subtask to a first object code subtask;
executing the first object code subtask using one of a plurality of heterogeneous processor types;

during the execution of the first object code subtask, the method further comprising:

retrieving the pointer and analyzing the stored location;

in response to analyzing the stored location, retrieving the second byte code subtask using a runtime loader;

in response to retrieving the second byte code subtask, using the runtime loader to identify a processor type from the plurality of heterogeneous processor types in which to execute the second byte code subtask, wherein the identifying includes retrieving a loading factor for each of the plurality of heterogeneous processor types and determining an availability of each of the plurality of heterogeneous processor types using the loading factors;

in response to identifying the processor type, using the runtime loader to translate the second byte code subtask to a second object code subtask; and loading the second object code subtask into a processor that corresponds to the identified processor type.

* * * * *